United States Patent
Baker et al.

(10) Patent No.: US 7,506,256 B2
(45) Date of Patent: Mar. 17, 2009

(54) DEVICE AND METHOD FOR PREVIEWING THEMES AND CATEGORIES OF SEQUENCED SYMBOLS

(75) Inventors: Bruce R. Baker, Pittsburgh, PA (US); Robert V. Conti, Bethel Park, PA (US); Rob Dillon, Pittsburgh, PA (US); Dave H. Hershberger, Millersburg, OH (US); Thomas J. McGrath, III, Pittsburgh, PA (US)

(73) Assignee: Semantic Compaction Systems, Pittsburgh, PA (US)

( * ) Notice: Subject to any disclaimer, the term of this patent is extended or adjusted under 35 U.S.C. 154(b) by 358 days.

(21) Appl. No.: 10/426,692

(22) Filed: May 1, 2003

(65) Prior Publication Data
US 2003/0210280 A1 Nov. 13, 2003

Related U.S. Application Data

(63) Continuation-in-part of application No. 09/797,179, filed on Mar. 2, 2001, now Pat. No. 7,076,738.

(51) Int. Cl.
*G06F 3/048* (2006.01)
(52) U.S. Cl. .......... 715/708; 715/709; 715/711; 715/812; 704/1; 704/7
(58) Field of Classification Search ......... 715/760–765, 715/812–824, 835, 700–715; 704/1, 7, 9, 704/260; 345/172, 173
See application file for complete search history.

(56) References Cited

U.S. PATENT DOCUMENTS
4,661,916 A 4/1987 Baker et al.
(Continued)

FOREIGN PATENT DOCUMENTS
WO WO 92/12491 7/1992

OTHER PUBLICATIONS

Ellen Francik, "Computer- & Screen-based interfaces: Universal design filter," Human Factors Engineering, Pacific Bell, Version 2, Jun. 6, 1996.*

(Continued)

*Primary Examiner*—Tadeese Hailu
(74) *Attorney, Agent, or Firm*—Harness, Dickey & Pierce, P.L.C.

(57) ABSTRACT

A computer device, such as a mobile phone or PDA for example, is able to output a message based upon selection of a corresponding sequence of symbol. Such symbols can be polysemous in nature and thus be associated with a plurality of different meanings depending upon other symbols sequenced therewith. By utilizing polysemous symbols, a relatively large number of sequences can be developed and associated with stored messages in the computer device. To aid a user in accessing a desired sequence or to aid in training the learning of stored sequences, for example, a category relating to at least two symbol sequences is fed back to the user upon pre-selecting a symbol; a theme relating to at least two symbol sequences is fed back to the user upon selecting a symbol and pre-selecting a next symbol; and/or a message associated with a sequence is fed back to the user upon selecting and/or pre-selecting at least one symbol completing a symbol sequence.

181 Claims, 37 Drawing Sheets

U.S. PATENT DOCUMENTS

| | | | |
|---|---|---|---|
| 5,097,425 A | | 3/1992 | Baker et al. |
| 5,153,591 A | * | 10/1992 | Clark .......................... 341/51 |
| 5,169,342 A | | 12/1992 | Steele et al. |
| 5,210,689 A | | 5/1993 | Baker et al. |
| 5,297,041 A | | 3/1994 | Kushler et al. |
| 5,299,125 A | | 3/1994 | Baker et al. |
| 5,309,546 A | | 5/1994 | Baker et al. |
| 5,317,671 A | | 5/1994 | Baker et al. |
| 5,437,007 A | | 7/1995 | Bailey et al. |
| 5,566,291 A | * | 10/1996 | Boulton et al. .............. 715/709 |
| 5,625,783 A | | 4/1997 | Ezekiel et al. |
| 5,661,476 A | * | 8/1997 | Wang et al. .................... 341/22 |
| 5,745,716 A | | 4/1998 | Tchao et al. |
| 5,748,177 A | | 5/1998 | Baker et al. |
| 5,818,437 A | * | 10/1998 | Grover et al. ............... 715/811 |
| 5,841,959 A | | 11/1998 | Guiremand |
| 5,910,009 A | * | 6/1999 | Leff et al. ................... 434/322 |
| 5,920,303 A | | 7/1999 | Baker et al. |
| 6,025,843 A | * | 2/2000 | Sklar .......................... 715/841 |
| 6,061,602 A | * | 5/2000 | Meyer ......................... 700/83 |
| 6,073,136 A | | 6/2000 | Bertram et al. |
| 6,192,343 B1 | | 2/2001 | Morgan et al. |
| 6,219,731 B1 | * | 4/2001 | Gutowitz ..................... 710/67 |
| 6,223,059 B1 | | 4/2001 | Haestrup |
| 6,246,410 B1 | * | 6/2001 | Bergeron et al. ............ 715/854 |
| 6,401,065 B1 | * | 6/2002 | Kanevsky et al. ........ 704/256.4 |
| 6,453,281 B1 | * | 9/2002 | Walters et al. .............. 704/200 |
| 6,496,836 B1 | * | 12/2002 | Ronchi et al. ............ 707/104.1 |
| 6,522,346 B1 | * | 2/2003 | Meyer ......................... 715/771 |
| 6,646,572 B1 | * | 11/2003 | Brand .......................... 341/22 |
| 6,727,917 B1 | * | 4/2004 | Chew et al. ................. 715/765 |
| 6,804,786 B1 | * | 10/2004 | Chamley et al. .............. 726/20 |
| 6,822,585 B1 | * | 11/2004 | Ni et al. ........................ 341/28 |
| 6,990,676 B1 | * | 1/2006 | Proehl et al. .................. 725/40 |
| 2002/0046315 A1 | * | 4/2002 | Miller et al. .................... 711/1 |

OTHER PUBLICATIONS

Ron S. Frantz, "Hands Free Telephone Access," Semantic Compaction System, Jul. 12-13, 1996.*

Paul Nisbet & Patrick Poon, "Special Access Technology," 1998 (chapter 7).*

"An Unofficial History of Advances in Computer Interfaces", pp. 1-4, Mar. 2, 2001.

"Operating Systems.htm", pp. 1-4, Mar. 2, 2001.

"Unwired-Japan has the Future in its Pocket", Daniel Scuka, *Japan Inc.*, pp. 1-3, Jun. 2000.

"Terry Harpold—Publications, Conference Papers & Lectures", *Publications*, pp. 1-4, Mar. 2, 2001.

"Using Small Screen Space More Efficiently", Tomonari Kamba et al., pp. 1-11, 1996.

"Facilitating the Evolution of a User Driven 'Iconotextual' Internet Patois", Leon Cruickshank et al., *Evolution of a User Driven Internet Icons*, pp. 1-2, Mar. 2, 2001.

European Search Report for corresponding application.

"Computer & Screen-Based Interfaces: Universal Design Filter", Ellen Francik, *Pacific Bell*, pp. 1-45, Jun. 6, 1996.

"Spatial Audio in Small Screen Device Displays", Ashley Walker et al., *Department of Computing Science, University of Glasglow*, pp. 1-2, 2000.

"Effective Visual Communication for Graphical User Interfaces", Suzanne Martin, *Designing Effective User Interfaces*, pp. 1-9, 1995.

"Affordances & Design", Don Norman, pp. 1-4, Mar. 2, 2001.

"What are the Advantages and Disadvantages of an Icon Based User-Interface for Computer Users", Harry Brignull, *Neocortex Psychology Essays*, pp. 1-7, Jun. 6, 1999.

"Menu Descriptions", www.sis.duke.edu/SISS/menu.htm, pp. 1-4, Jan. 24, 2000.

"User's Guide Mobile Phone R280LX", *Ericcson*, pp. 1-3.

Examiner's Report in corresponding application dated Apr. 8, 2008.

* cited by examiner

FishKeeper

| Place | Where | Date |
|---|---|---|
| Cross Creek | Lake | 6/10/00 |
| Lake Erie | Lake | 6/11/00 |
| Cross Creek | Lake | 6/11/00 |
| Cross Creek | No Value | 3/27/00 |
| John's Camp | River | 2/26/00 |
| King's Creek | River | 4/26/00 |

[Filters] [Find] [Again] [Sort]
[Done] [New]

Edit Record

- Place: Lake Erid
- Where: Lake
- Date: 6/11/00
- Time From: 10:00 am
- Time To: 4:00 pm
- Species: Large Mouth Bass
- Weight Pound: 2
- Length Inches: 12

[OK] [Cancel] [Delete] [New]

760

770

US 7,506,256 B2

DEVICE AND METHOD FOR PREVIEWING THEMES AND CATEGORIES OF SEQUENCED SYMBOLS

RELATED APPLICATIONS

The present application is a continuation-in-part of application Ser. No. 09/797,179 filed Mar. 2, 2001, now U.S. Pat. No. 7,076,738 entitled: A COMPUTER DEVICE, METHOD AND ARTICLE OF MANUFACTURE FOR UTILIZING SEQUENCED SYMBOLS TO ENABLE PROGRAMMED APPLICATIONS AND COMMANDS, the contents of which are hereby incorporated herein by reference, in their entirety and for all purposes.

FIELD OF INVENTION

The present application is generally directed to a device and method which utilizes sequenced symbols to enable the output of associated messages (which can be words, phrases, etc.), applications programs, commands, etc. This technology is applicable to all areas of computer and electronic devices including but not limited to portable digital assistants (PDAs) mobile telephones, personal computers, internet applications utilizing computers, etc.

BACKGROUND OF THE INVENTION

PDAs, such as the Palm™ devices including the PalmPilot™ for example, allow users to catalog and access a great deal of information utilizing a small portable device. The PalmPilot™ for example, includes an operating system which allows for navigation through many application programs including ones permitting access to internet applications, utilizing a series of pop-up menus which appear on the screen. These application programs include, for example, programs accessible via hardwired keys ("hardwired programs") such as a calendar, address book, to do list, memo pad, etc.; financial programs such as expense information, charts; informational material programs such as dictionaries, thesauruses, white pages, yellow pages; and programs permitting access to information available through the internet such as ABC news, ESPN, Map Quest, etc. Although a plethora of information and programs are provided by and/or accessible through the PDA, accessing desired information through a pull-down menu system can be slow and cumbersome. Further, it can be difficult to locate desired information through the use of pull-down menus.

PDAs such as the PalmPilot™ for example, also include intra-application commands that permit functionality within a particular application program. These can include basic commands such as new (for creating a new file) open (for opening an existing file), quit, cut, undo, copy, paste, etc., for operating within a particular program. Again, however, these operations are typically performed through sequenced pull-down menus. As such, operating these command functions can be tedious and can involve a large amount of time and effort before the operation is fully performed.

Finally, within an application program, various movement-type commands can be performed. These commands, such as page up, up, page down, down, etc., can be difficult to access due to display space restrictions and may take some time and effort to be performed.

Prior art FIG. 1 illustrates a PalmPilot™, as an exemplary type of computer device 10 for example. The portable computer device 10 includes a screen area 20, as well as an additional input area 12. The input area 12 includes a plurality of hardwired keys 14a through 14d, each including a single picture: key 14a designating a calculator keypad; key 14b designating a magnifying glass; key 14c designating a house; and key 14d designating a menu. Each of these keys permits immediate access to one of the calculator, find, home and menu programs, respectively.

With regard to the keys, while they provide quick access to application programs, only a small number of these keys can be included due to the fact that they take up space on the device. Thus, inclusion of these hardwired keys necessarily leads to a decrease in the size of the display 20 as more of a surface area of the PDA is occupied. Display space is a premium in these small devices and thus, while the devices continue to offer more and more functionality, the use of designated hardwired application keys must be restricted in order to maximize display space.

The PDA 10 further includes an input area 16, wherein handwriting information known as Graffiti® can be input. These Graffiti® strokes can be used to enter input characters or symbols, and can be used to input various shortcuts. The Graffiti® language, however, must first be learned, as well as each of the single meaning strokes in order to access any useful shortcuts.

Additionally, an area of the PDA 10 below the input area includes an ON/OFF key 40 for powering the device on or off through an internal power source (not shown) or through an external source such as an AC outlet for example (not shown); as well as additional hardwired keys. Each of these keys includes a single symbol and is used to access a single hardwired program/function as follows: key 43 includes a calendar symbol and is used to access a calendar program; key 45 includes a telephone symbol and is used to access an address book; key 47 includes a "list" symbol and is used for accessing a "to do" list; and key 49 includes a pen and paper symbol and is used for accessing a "memo pad" program. Again, these single application hardwired keys limit the overall size of the display 20 and each key can be used to access only a single one of the many applications/programs of the PDA 10. Additionally, UP/DOWN key 42 can be used for scrolling through various application programs for example.

Display 20 illustrates one example of a screen which could be available on a typical PDA device. The display screen 20 shows six symbols, each of which can be used to access one of a plurality of applications. Again, however, utilizing these single meaning symbols, only a limited number of symbols can be displayed on the screen at any one time to access a limited number of applications, and they do not appear continuously within an application or program to permit switching to another application or program. More symbols can be included and scrolled through, but again, one symbol will access only one application program. For example, the calculator symbol 22a is used to access the calculator program; the date book 22b is used to access the date book program; the diagnostic symbol 22c is used to access wireless diagnostics; the ESPN symbol 22d is used to access the internet site ESPN.com through the internet; the dollar sign symbol 22e is used to access the expense financial application program within the device; and the Fidelity symbol 22f is used to access the Fidelity application program within the device. While these single meaning symbols and associated word messages allow a user to quickly access a particular internal application program of the PDA 10, a desired application must still be located by a user and accessed in some manner. This process can be slow and tedious.

Other exemplary aspects of the display 20 can include an indication of time 24, an indication of available battery power 26, and other related symbols. It should be understood that the display in prior art FIG. 1 is merely an exemplary display of a typical PDA 10.

Finally, prior art FIG. 1 illustrates, generically, various internal components of the PDA 10. For example, the PDA 10 includes a central controller (CPU 30) for controlling various functions of the PDA including the receipt of input information from input area 12 and the various keys 42-49; for receiving input from and outputting display information to the display device 20; for executing the various application programs; for accessing the internet through modem 36 and antenna 39 for example, etc. Connected to the CPU 30 are memory elements, such as random access memory (RAM) 34 and read-only memory (ROM) 34 for example. The device 10 can also include an external port 38 for connection to external components through a modem 36 or directly to CPU 30.

Accordingly, while the PDA provides many applications and various computer command sets available within applications, as well as access to internet applications, locating and particularly using and navigating through a particular application can be tedious and cumbersome. This is true not just with the PDA, described in an exemplary manner above, but is also true with any computer device including personal computers, mobile phones, etc. Further, as more and more functionality is added to the PDA 10, accessing desired application programs and using these application programs in an efficient manner will become more and more difficult. Accordingly, a need exists for a better way to access and use various application programs available in PDAs and other computer devices such as personal computers, mobile telephones, etc. Further, as display screen space is a premium in these portable devices including PDAs, mobile phones, etc., the need exists to maximize display screen availability while minimizing the effort needed to access and use many of the various available commands and applications of these and other computer devices.

Known systems such as those assigned to the present assignee and discussed in each of U.S. Pat. Nos. 4,661,916; 5,097,425; 5,210,689; 5,297,041; 5,299,125; 5,309,546; 5,317,671; and 5,748,177, the contents of each of which is hereby incorporated herein by reference in its entirety and for all purposes, involve sequencing polysemous symbols to output associated messages. The symbols or icons can be part of a keyboard of a speech synthesizer, for example. Due to the polysemous (multi-meaning) nature of the symbols, only a small symbol set is needed to be able to generate thousands of messages (including one or more words, for example), each stored in association with a short (2-3 symbols for example) symbols sequence. Although the polysemous symbols can be rich in meaning, and although the many symbol sequences can be easily learned by someone using the system regularly such as in the speech synthesizing environment for example, the beginner, occasional user, etc. may have some trouble. Thus, a type of training aid is desired, especially for the beginning and occasional user.

SUMMARY OF THE INVENTION

The present application, in a preferred embodiment, is directed to a device or method which, for example, can be used in everyday use, if desired, and/or can aid in training a user how to quickly access appropriate symbol sequences corresponding to desired messages, application programs, commands, etc. Such a system and method, in one embodiment, includes pre-selecting a symbol (as a first symbol or part of a sequence) and providing feedback (including at least one of visual and audio feedback for example) corresponding to a category or theme related to the pre-selected symbol or sequence (including a first selected symbol and the pre-selected symbol). As such, when such symbol sequences and associated messages and/or applications programs, commands, etc. are utilized in conjunction with a PDA, mobile phone, personal computer, etc., wherein the user may be a beginner, occasional user, etc., the user can easily learn and determine a desired category or theme relating to the desired message and/or associated application program, command, etc. to be output. Thus, the user can quickly and easily find and access the symbol sequence necessary to output the message and/or associated application program, command, etc.

BRIEF DESCRIPTION OF THE DRAWINGS

The present invention will become more fully understood from the detailed description given herein below and the accompanying drawings which are given by way of illustration only and which are not intended to limit the present invention in any way, where in like reference numerals represent like elements and wherein:

FIGS. 6a-6b illustrate an aspect of intra-application command navigation using symbol sequencing;

FIGS. 8a-8g illustrate other aspects of intra-application command navigations utilizing symbol sequencing;

FIGS. 9a-9c illustrate inter-application navigation utilizing symbol sequencing;

FIGS. 10a-10h illustrate inter-application navigation utilizing symbol sequencing;

DETAILED DESCRIPTION OF THE PREFERRED EMBODIMENTS

Figure 1:
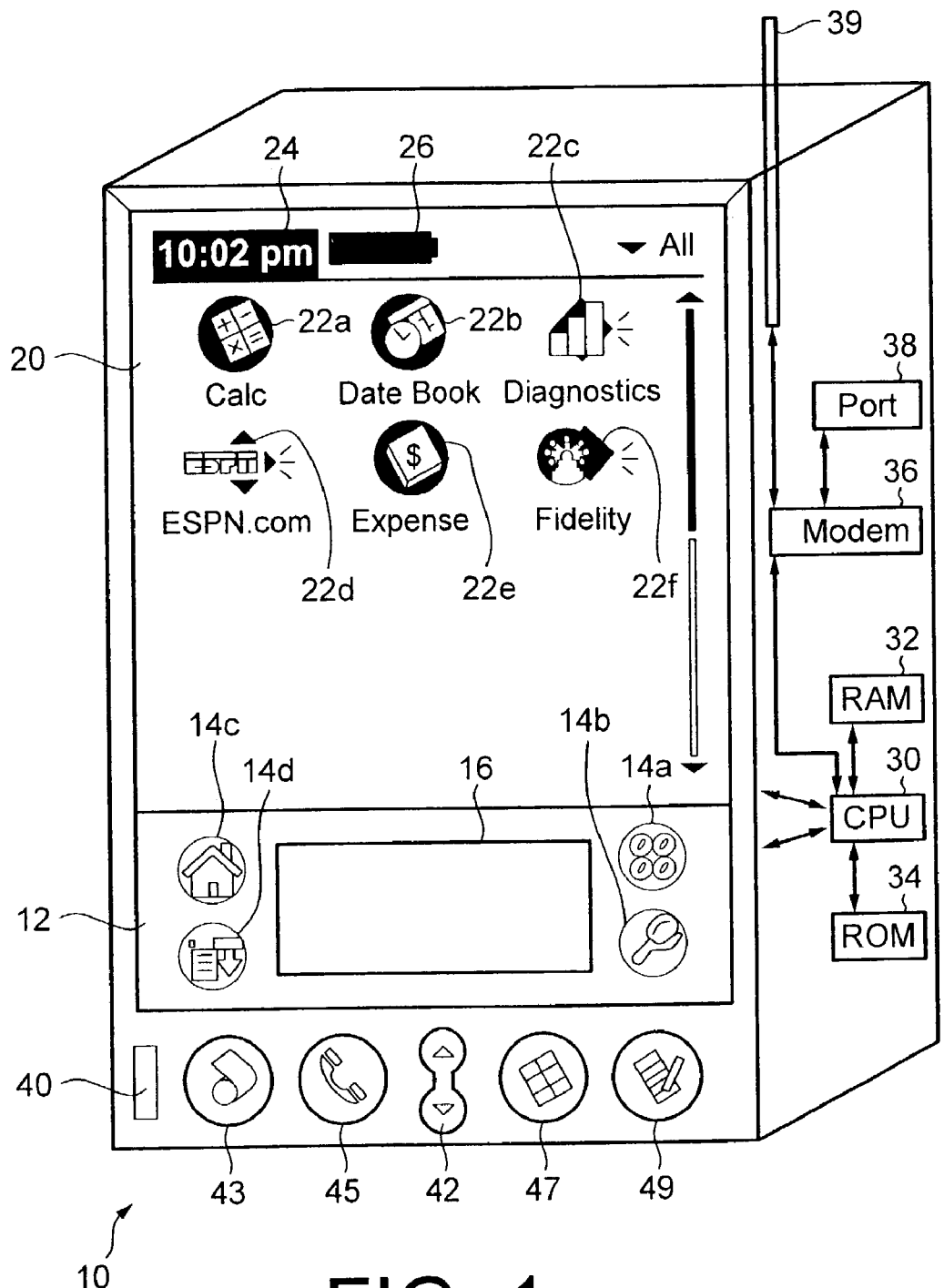
FIG. 1 illustrates a prior art PDA.

The present application, in a preferred embodiment, is directed to a device or method which, for example, can be for everyday use, if desired, and/or can aid in training a user how to quickly access appropriate symbol sequences corresponding to desired messages, application programs, commands, etc. Such a system and method, in one embodiment, includes pre-selecting a symbol (as a first symbol or part of a sequence) and providing feedback (including at least one of visual and audio feedback for example) corresponding to a category or theme related to the pre-selected symbol or sequence (including a first selected symbol and the pre-selected symbol). As such, when such symbol sequences and associated messages and/or applications programs, commands, etc. are utilized in conjunction with a PDA, mobile phone, personal computer, etc., wherein the user may be a beginner, occasional user, etc., the user can easily learn and determine a desired category or theme relating to the desired message and/or associated application program, command, etc. to be output. Thus, the user can quickly and easily find and access the symbol sequence necessary to output the message and/or associated application program, command, etc.

A computer device, such as a mobile phone or PDA for example, is able to output a message based upon selection of a corresponding sequence of symbol. Such symbols can be polysemous in nature and thus be associated with a plurality of different meanings depending upon other symbols sequenced therewith. By utilizing polysemous symbols, a relatively large number of sequences can be developed and associated with stored messages in the computer device. To aid a user in accessing a desired sequence or to aid in training the learning of stored sequences, for example, a category relating to at least two symbol sequences is fed back to the user upon pre-selecting a symbol; a theme relating to at least two symbol sequences is fed back to the user upon selecting a symbol and pre-selecting a next symbol; and/or a message associated with a sequence is fed back to the user upon selecting and/or pre-selecting at least one symbol completing a symbol sequence.

In another preferred embodiment, it is directed to a method, computer device, interface, and article of manufacture permit the enabling of one or more application programs in a computer device such as a PDA, mobile telephone, personal computer, etc., and/or existing commands, based upon associated and selected sequentially sequenced symbols, noting that various aspects of various embodiments can be combined. Preferably, these symbols are polysemous in nature. By storing a plurality of sequences of selectable polysemous symbols in association with a plurality of application programs and/or commands, the various application programs and/or commands can be enabled or executed in response to receiving selection of an associated polysemous symbol sequence. As such, a simple and relatively small interface of multi-meaning symbols can be provided on a relatively small area of a display screen for example, to allow a user to thereby navigate through a plurality of programs, navigate within a program (intra-application navigation such as move up, move down, page up, page down, etc.); and navigate between programs (cross-application navigation such as copy to and paste from as well as providing the ability to build macros such as paste from note pad, etc.). Such a simple symbol interface can thus be used in devices where display space is a premium, such as PDAs, mobile phones, etc.; can be used to quickly access programs in devices with growing capabilities such as PDAs, personal computers (including laptops), mobile phones, etc.; and can be used in internet navigation, as well as provide for efficient use of voice recognition technology. Thus, as capabilities of devices expand, a simple way of accessing and navigating through these capabilities can be utilized, in a manner that is easy to use and easy to quickly comprehend.

Figure 2:
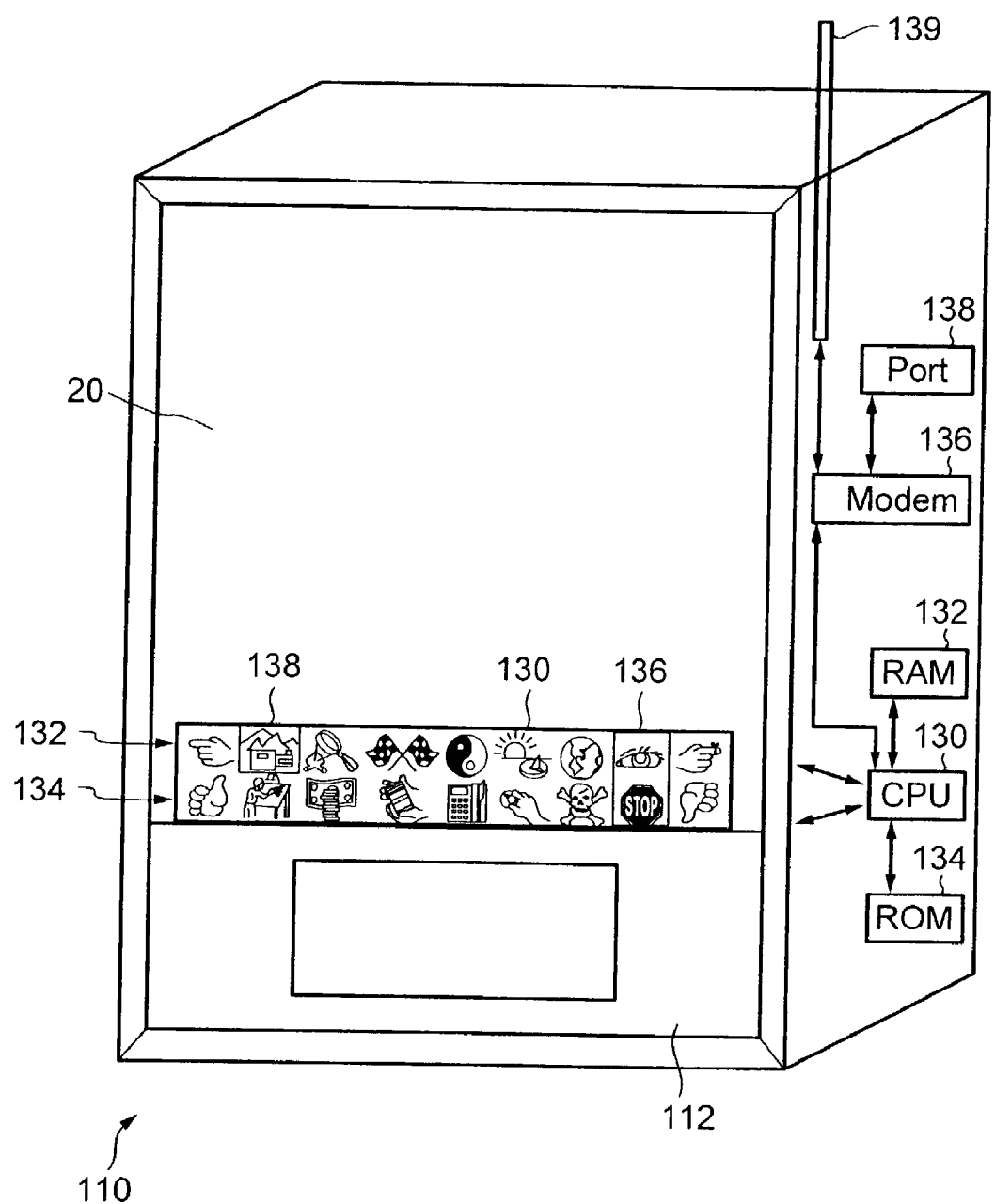
FIG. 2 illustrates the display of a template of polysemous symbols on a computer device of the present application.

FIG. 2 of the present application illustrates an exemplary computer device 110 of the present application including various components somewhat similar to the PDA of prior art FIG. 1. The computer device, which can be any type of device with a CPU and memory (including but not limited to a PDA, personal computer (both desktop and laptop), mobile phone, etc.), a display 120, an optional input area 112 (which can be omitted to increase display size, for example), and internal components including a CPU (controller) 130; memory such as RAM 132 and ROM 134; modem 136; port 138; and antenna 139. These preferably operate in a manner similar to the previously described with regard to PDA of prior art FIG. 1 and will not be further described for the sake of brevity.

The computer device 110 of FIG. 2 of the present application further includes a symbol template 130 which can be displayed on display 120. It should be noted that the display 120, somewhat similar to display 20 of prior art FIG. 1, is preferably an integrated input and display device for providing both input of information and display of information. Thus, the template 130 preferably acts as an interface, and provides a plurality of polysemous symbols for selection by a finger or stylus unit for example, which are then input and processed through CPU 130, RAM 132 and ROM 134 as will be explained hereafter. However, it should be understood that the symbols of template 130 can be selected in any manner such as through corresponding keyboard keys, voice recognition technology, etc.

Preferably, the template 130 includes two rows of polysemous symbols including a first row 132 and a second row 134. The present invention should not be considered to be limited to two rows, and can include more or less rows dependent on the particular use or need. In addition, FIG. 2 includes nine columns of symbols and eighteen symbols in general, which again is merely exemplary and should not be considered to limit the present application.

Finally, eighteen particular symbols are shown in FIG. 2 of the present application. These symbols have been created for accessing various applications and commands of a PDA, but the present application should not be limited to the particular symbols shown in FIG. 2. Any symbols can be chosen which, for this aspect of the present application, are particularly polysemous in nature to thereby allow for the creation of many easily recognizable symbol sequences to allow a user to easily associate and remember a symbol sequence as corresponding to a particular application program, intra/inter-application navigation command, or other associated command or application.

When creating the symbol set or template of FIG. 2 (the eighteen symbols of FIG. 2), the full list of commands and/or application programs of the PalmPilot™ PDA is preferably first examined. The commands and/or application programs are then semantically grouped using a core set of the most common categories. The core set can include commands or programs found under different menus as these programs/commands can be organized differently based on their similar natural semantic structure. Thereafter, they can be associated with symbol sequences involving a similar first or "category" symbol. Then, second "sub-category" symbols can be developed, as well as sequences.

The next step involves creating symbols and symbol sequences. Once "categories" and "sub-categories" are established, symbols can be developed to designate both categories and sub-categories of information. These symbols should be polysemous in nature so as to be useable in various sequences to access various types of programs and/or commands. For example, the "money" symbol can represent the category of financial applications, with the "money", "money" and "move" (crossed starting flags) sequence being associated with and enabling the Quicken® financial application program. Further, the "money" symbol can also be used as a third symbol in a sequence, to designate the "Expense" application program, associated with the symbol sequence of "money", "money" and "money"; and, with the "coins" of the "money" symbol being yellow in color, it can be used as a third symbol to represent and access the "yellow pages" ("find" and "find" and "money"). The same crossed starting flags ("move") symbol as was used in a sequence enabling Quicken® is also polysemous so as to additionally be used to access the ESPN.com internet application ("globe" and "globe" and "move") since the starting flags represent sports (auto racing and thus the sports network of ESPN); as well as the category of "move" commands—since the starting flags represent movement.

Similarly, the globe or "all" symbol is used in sequences which access the internet category of application programs ("globe" and "globe" and "move"=ESPN.com), and is also used as a sub-category symbol in sequences accessing the global or "big" moves such as "move to top" ("move" and "globe" and "thumbs up") or "move to bottom" ("move" and "globe" and "thumbs down") commands. Other exemplary category symbols used in sequences for accessing PDA programs and commands in this exemplary aspect of the present application include but are not limited to: the "move" symbol for move menu sequences such as move left ("move" and "left" symbol), move right ("move" and "right" symbol), etc.; the "find" (magnifying glass) symbol for information programs such as "dictionary" ("find" and "find" and "keypad"), HanDBase ("find" and "find" and "file cabinet"), yellow pages ("find" and "find" and "money"), etc.; the "control" (hand on dial mechanism) symbol for built-in applications such as the calendar program ("control" and "control" and "left"), the calculator program ("control" and "control" and "keypad"), etc.; and the "cards" symbol for page move commands of page up ("cards" and "thumbs up"), page down ("cards" and "thumbs down"), etc. Again, these are merely some examples of the polysemous nature of the chosen symbols and should not be considered to limit the application as other symbols, categories, and symbol sequences can be used.

FIG. 2 illustrates eighteen exemplary symbols. These symbols, starting from the left most symbol in row 132 and moving to the right including the "left" symbol (a hand pointing to the left with a ring on the finger); the "file cabinet" symbol (a hand holding paper in an opened file cabinet); the "find" symbol (a magnifying glass over logs and a fire); the "move" symbol (two starting flags that are crossed); the "Boolean" symbol (the yin-yang symbol); the "new" symbol (a rising sun with a sundial); the "all" symbol (a globe); the "eye" symbol (an symbol of an eyeball); and the "right" symbol (a hand pointing to the right with a ribbon on the finger). Next, in row 134 moving from left to right, the symbols include: the "thumbs up" symbol (a hand with a thumb pointing up); the "draftsman" symbol (a man standing at a draftsman's table with a triangle and a light); the "money" symbol (a dollar and a stack of coins); the "cards" symbol (including two hands with cards); a "key pad" symbol (an electronic card reader with a key pad); the "control" symbol (a hand operating a dial mechanism); the "kill" symbol (a skull and cross bones); the "stop" symbol (an symbol of a stop sign); and the "thumbs down" symbol (a hand with a thumb pointing down). Again, these symbols should not be considered to limit the present application, but have been carefully designed in view of their polysemous nature and in view of their ability to access, in various combinations, application programs, intra-application navigation commands within a program, and inter-application navigation commands across programs, in a typical PDA computer device.

The use of polysemous symbols allows one symbol to have different meanings when sequenced with other symbols. By using sequenced polysemous symbols, a large number of applications and/or commands can be associated with different symbol sequences; with the actual number of symbols in the pallet or template 130 remaining small. Using two or three symbol sequences (preferred) and an eighteen symbol (for example) template 130 as shown in FIG. 2, an interface is created wherein thousands of applications and/or commands can be associated with different sequences.

Further, not only can thousands of applications or commands be recalled using simple symbol sequences, but by using a template 130 of only a small number of symbols, display space (at a premium in most computer devices, especially mobile phones, PDAs, laptop computers, etc.), is conserved. Further, the polysemous nature of the symbols makes it easy to correspond symbol sequences to applications and commands. For example, functionality of the computer devices can be grouped into semantic categories such that the "money" symbol is easily associated with and becomes a first sequenced symbol of the category of financial applications; the globe becomes the first sequenced symbol of the category of internet applications; etc. Thereafter, a second symbol can be used to complete a sequence to enable an application program or execute a command; or a third sequenced symbol can fill that role, with the second symbol corresponding to a sub-category within a category. In addition, by adding symbol prediction, valid symbol choices are even further reduced, and the learnability of symbol sequences is even further enhanced. As such, an interface is created which includes a plurality of polysemous symbols for selection, with a plurality of sequences of polysemous symbols being stored in association with at least one of a command and an application program, wherein an associated one of a command or application program is enabled in response to selection of symbols of a stored polysemous symbol sequence.

FIG. 2 also illustrates another preferred embodiment of Applicant's invention wherein available symbols for selection are identified to the user. This involves symbol prediction. For example, in the template 130 shown in FIG. 2 of the present application, the "file cabinet" symbol 138, as well as the "eye" and "stop sign" symbols 136 are differentiated from the other symbols. Differentiation can occur in the form of highlighting valid symbols for example (and/or darkening an invalid symbol, for example), and can be used in a predictive manner to indicate to the user, symbols which are available for selection (valid) and symbols which are not available for selection, as next or first symbols in a sequence (invalid). This allows the user to quickly and easily access, and also quickly and easily remember various symbol sequences which are associated with various application programs and/or commands. As shown in FIG. 2, a user can easily recognize the differentiated file cabinet, eye and stop sign symbols as valid symbols available for selection.

The highlighting or other types of differentiating (such as darkening invalid symbols for example) of certain symbols from other symbols is determined based upon available "first" or "next" symbols in symbol sequences. In other words, when the system is initially turned on and the template is initially accessed and displayed, only symbols which begin a stored symbol sequence need be highlighted to the user as only these symbols are valid and can be used to access a symbol sequence. Thereafter, once a particular symbol is selected, only symbols which are "second" symbols in a symbol sequence beginning with the selected first symbol are available "next" symbol symbols for selection. Accordingly, only these symbols will be highlighted, or otherwise differentiated from other symbols, in response to selection of the first symbol. The use of symbol or symbol prediction to aid a user in accessing a storage symbol sequence is discussed in detail in U.S. Pat. Nos. 5,097,425 and 5,297,041, the entire contents of which are incorporated herein by reference.

As previously stated, the template of symbols 130 is preferably displayed on an integrated input and display device 120 of the overall computer device 110. Even more preferably, the template of symbols 130 is displayed as a virtual keyboard on less than one-third of the display screen 120. As preferably stated, the display of valid polysemous symbols, occurring as a first symbol in a sequence upon no symbols being selected and occurring as a next symbol in a sequence upon selection of a previous symbol, is differentiated from invalid polysemous symbols. Valid symbols are preferably highlighted and/or invalid symbols are preferably darkened, with respect to the valid symbols.

Figure 3:
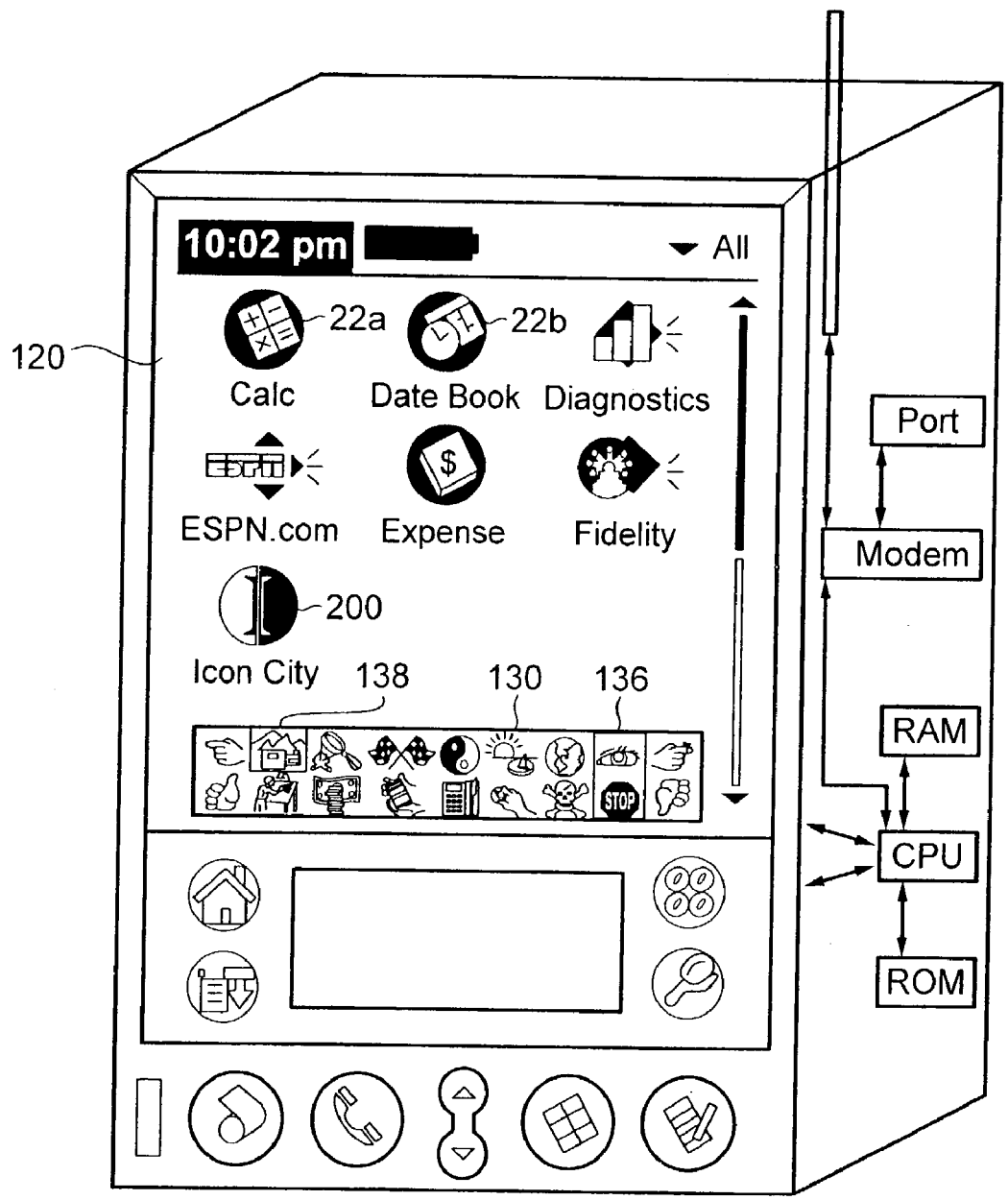
FIG. 3 illustrates the display of a polysemous symbol template in a PDA environment.

FIG. 3 illustrates the template 130 displayed on a PDA, somewhat similar to the PDA of prior art FIG. 1. Accordingly, like elements with regard to prior art FIG. 1 will not be explained again for the sake of brevity. FIG. 3 not only illustrates how the template 130 can be displayed on a small portion (preferably less than ⅓ of the display screen) of an integrated input and display screen 120 (including highlighted symbols 138 and 136 differentiated from other symbols of the template 130), but also illustrates an exemplary additional symbolicity symbol 200 which will be explained as hereafter.

In one preferred embodiment, upon initially activating the PDA device, the symbolicity symbol 200 can be displayed. The symbolicity symbol 200 can be displayed in association with other symbols such as that shown in FIG. 3 for example, or can be displayed alone. In one preferred embodiment, while the symbolicity symbol 200 is displayed, the template 130 is not initially displayed. The symbolicity symbol 200 can be used, for example, to access the display of the template of symbols 130, if not initially displayed when the device is turned on. This will be explained in more detail with regard to FIG. 4 for example. Of course, it should be understood that the present invention is not so limited, since the template 130 can always be displayed (thereby alleviating the need for the symbolicity symbol); another trigger can initiate display of template 130 etc. The use of a symbol 200 to activate a symbol sequence mode display of the template, is merely exemplary.

Figure 4:
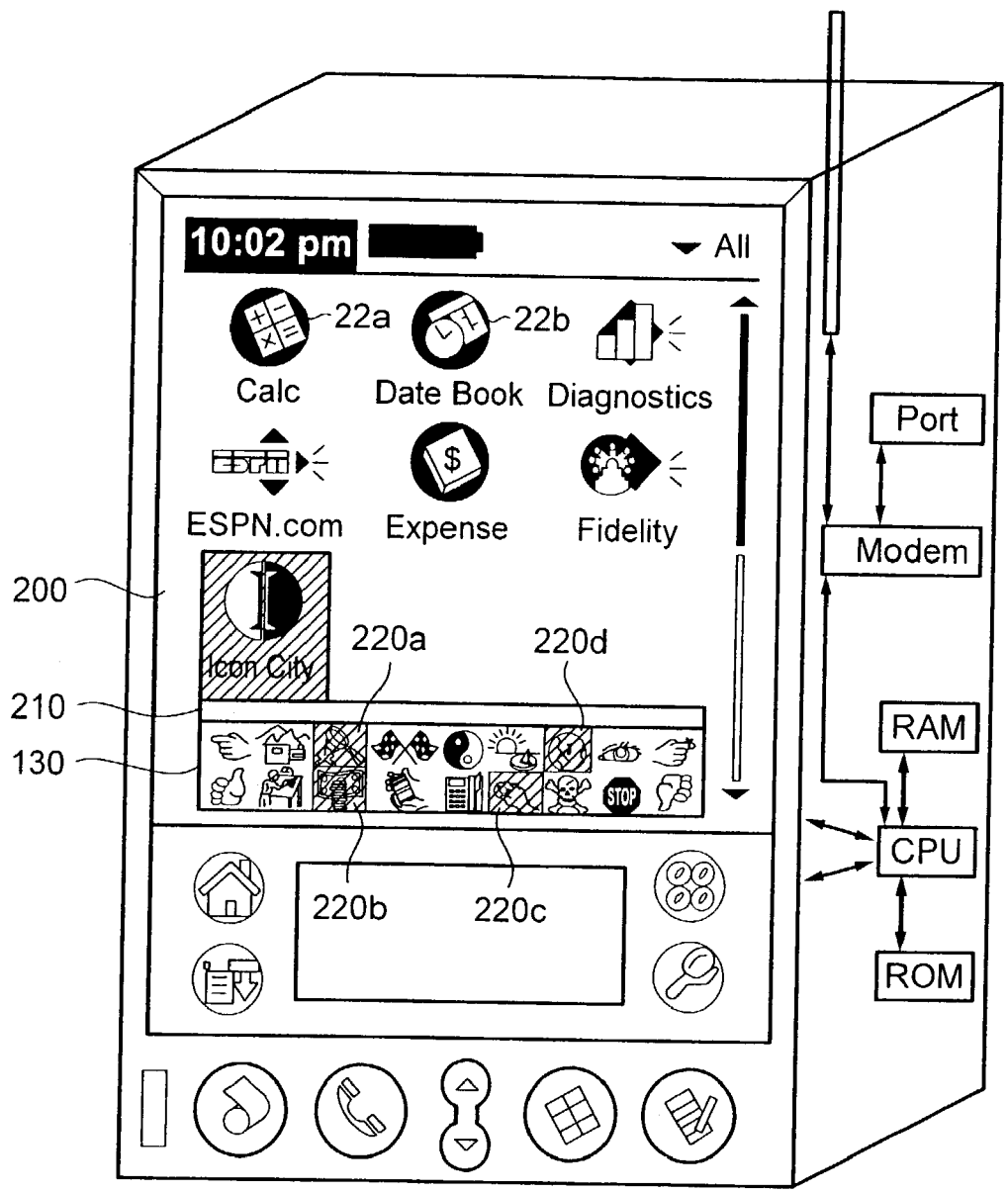
FIG. 4 illustrates the template and an access symbol in a PDA environment.

FIG. 4 illustrates the PDA wherein the symbolicity symbol 200 has been selected. In response thereto, the template of symbols 130 is preferably displayed. Even more preferably, when initially displayed, the template 130 preferably differentiates the display of valid polysemous symbols which occur as a first symbol in a stored sequence for example, from invalid polysemous symbols. This can be done by darkening the invalid symbols, for example; and/or by highlighting the valid symbols; or in some other manner.

For example, as shown in FIG. 4, upon initially selecting the symbolicity symbol 200 and upon displaying the template 130, four symbols are differentiated from the other symbols in the template 130. Each of the "find" symbol 220a, "money" symbol 220b, "control" symbol 220c, and "all" symbol 220d have been highlighted. This is because these symbols have been chosen (in an exemplary format) as first symbols which can be used for enabling or executing exemplary application programs and/or commands of the PDA shown in FIG. 4. The particular symbols selected have been chosen based upon their association with various programs already stored in the PalmPilot™ for example, and should not be limited as such.

Any "first" symbols in stored symbol sequences can be initially differentiated from other symbols upon initially accessing the template 130. Some exemplary symbol sequences, which should not be considered to limit the present application, can include a sequence of the money, money and move symbols to access a "Pocket Quicken" application program in the PDA; the money, money and left symbols to access the "Fidelity" program; the money, money and money symbols to access the "expense" program; the world, world and move symbols to access the "ESPN.com" internet application program/command; and the world, world, and world symbols to access the "ABC news" internet application program/command. Thus, not only can the plurality of symbols be displayed as a virtual keyboard, but the plurality of symbols can be displayed in response to entering a symbol sequence mode, such as by selecting the symbolicity symbol 200 for example.

In one preferred embodiment, each of the stored symbol sequences (stored in a database in association with application programs or commands for example) include at least three symbols, such as the symbols discussed previously related to certain application programs/commands and certain internet applications/commands for example. Even more preferably, in such three symbol sequences, the first symbol in each sequence preferably corresponds to an application program category (such as the "globe" symbol corresponding to an internet application category or the "money" symbol corresponding to a financial application category), the second symbol corresponding to a subcategory within the application program category of the first symbol (wherein the "globe" and "globe" symbols or the "money" and "money" symbols actually enable the subcategory of internet applications or financial applications, respectively); and wherein the third symbol corresponds to an application program within the subcategory of the second symbol such as the specific ESPN.com internet application/command, the ABC news internet application/command, the Pocket Quicken financial application program, or the Fidelity financial application program for example.

Symbol sequences can be associated with various stored or preaccessible programs to allow easy navigation thereof, and can also be associated with various commands such as intra-application navigation commands and inter- or cross application navigation commands. The commands can include intra-application commands for navigating within an enabled application program and/or inter-application commands for navigating between an enabled application program and another application program, for example. In addition, the present application preferably includes a storage mode which, when accessed, enables a user to store newly input a polysemous symbol sequence in association with a macro (such as "paste from note pad", for example), wherein the macro is executable in response to receiving input of this stored associated polysemous symbol sequence. This will be explained in further detail with regard to FIGS. 11a-d for example.

Once one of the application programs is enabled (via a selected symbol sequence or in some other manner), intra/inter-application navigation within that program such as move up, move down, move left, move right, page up, etc., can also be performed. Thus, template 130 of the plurality of polysemous symbols can also be displayed, as a virtual keyboard for example, within an enabled application program; a plurality of sequences of symbols can be stored in association with commands, and one of the commands can be executed in response to receiving selection of an associated polysemous symbol sequence.

Finally, as shown in FIG. 4, the template 130 preferably includes an additional display area 210. This area is preferably used to display each of the plurality of selected polysemous symbols, in sequence of selection. Thus, as each symbol is selected, it is preferably displayed in the small display area 210, so that the user may view each selected symbol. In a preferred embodiment, a selection of a symbol can be canceled, such as by double clicking on the symbol for example. As such, the symbol will preferably disappear from the display 210. Again, it should be noted that each symbol, when selected, will be displayed in the specific sequence as the sequence of symbols can be used to enable one of the plurality of application programs such as any of the presequenced hardwired, financial, info, or internet programs of the computer device, intra-application navigation command programs, or inter-application commands, etc.

In dealing with stored information in a computer device (such as application programs and/or commands for example) which can be associated with a symbol sequence, different types of information is available to be retrieved in different situations encountered in computer programs and interfaces. Operating systems have built-in computer commands that can be accessed. These commands are usually in the form of categories or libraries of commands, functions, routines or subroutines. These commands are encoded into a machine code that the computer then can understand based upon its operating system. Different categories of commands can further be accessed from other programs.

Accordingly, sequences of a plurality of polysemous symbols provided for selection are stored in association with an accessible application program or command, preferably in a database or in some type of memory for example. Thus, by storing these sequences of selectable polysemous symbols in association with an application program or command, the application program or command can be enabled/executed in response to receiving selection of an associated polysemous symbol sequence.

Most operating systems permit access to computer command shortcuts as well as application programs. These shortcuts can be edited and new shortcuts (such as polysemous symbol sequences) can be assigned to various commands. These types of commands are extracted and associated with appropriate symbol sequences. The symbol sequences and their association with commands and/or application programs is then stored, preferably in a database structure. When an associated symbol sequence is selected (via any type of input such as through a stylus or finger selecting a symbol displayed on an integrated input and display apparatus for example, or through the use of other input devices such as a mouse, scroll bar, associated keys on a keypad, etc.), the resulting command and/or application program is then enabled/executed and sent to a new application software or the operating system itself for execution. As such, an alternate method for navigating through application programs such as the hardwired, financial, information, and internet programs of the PalmPilot™ for example, as well as a new method for accessing navigation commands within an application or between applications, is made available.

Each of plurality of methods can be used in the overall storage of information to be retrieved. Any and all such methods are to be encompassed within the scope of the present application. For example, known entities such as various operating system commands and built-in program commands and/or abilities to access these commands if they are already stored, can initially be stored. These can be associated with symbol sequences and stored in memory, within the application software or within a database file, for example.

In an alternative method, which is also encompassed within the scope of the present application, the software application of the present invention can access available computer commands from within another software application and extract them into a database. If a new application is installed in the system, then the present application software can identify it and proceed to extract the expected commands and put them in database storage. This database can then be cross referenced to another database with symbol sequences.

With regard to computer commands, they may be found in different software applications and may be named different, but they may perform the same command. These can be assigned the same symbol sequence (commands like "delete item" and "delete object" which do exactly the same thing but are named differently), for example. Other commands, like "new document" and "new picture" which essentially tell the software to do the same thing (create a new document of a file that the software can understand), may be different in actual structural content. These can be assigned or associated with different symbol sequences to better represent what they are doing.

As another alternative method, commands may be found which were not originally anticipated when designing various symbol sequences to be associated with various commands or application programs. In this instance, an initial database can be created with symbol sequences associated with various application programs and/or commands, and additional symbol sequences can be added at a later time. This will enable the coverage of a much larger area of computer commands and application programs by having an exchangeable storage system for symbol sequences and their associations.

In regular computer programs, macros can be created using normally separate computer commands and then combining them in a logical way. When the macro is executed, it procedurally executes each separate command that was combined and stored within it. This enables the execution of more than one command through the use of just one macro. In the same sense, individual symbol sequences, namely new symbol sequences, can be used and stored in association with new "macros". When this new sequence of symbols is then selected, it can then execute each individual computer command that makes up the macro. For example, a first symbol sequence can be assigned to the command "paste to"; a new symbol sequence can be developed to create the command "paste from"; and a further symbol sequence can be added to create a macro "paste from note pad" or "paste from hand base". This will be discussed in more detail with regard to FIGS. 11a-d but can, in essence, enable the immediate access of a command within an application program, to thereby eliminate the need to first access the application program and then access the particular command. Thus, generally, application programs and/or commands can include macros, with a polysemous symbol sequence being stored in association with the macros and with the macro being enabled in response to receiving selection of an associated polysemous symbol sequence.

Once the available computer commands and available application programs are known, a hierarchical list of logically organized command sets is preferably created. However, this list is not inherently the easiest to remember and does not effectively represent a grammatical structure. "File: new" is not an effective grammatical structure like "create a new window" or "create a new document". The proper grammatical structure is much easier to read, make sense of, and remember over time. The logical set is more cryptic and in most situations looses touch with the intended meaning. By organizing commands and programs in a more semantic and grammatical sense, appropriate symbol sequences can be assigned and associated therewith.

With regard to many of these commands, there is also a common order such as "copy paste". We normally say "copy paste" as one command, but it is actually two commands with totally different meanings, very closely tied to each other in use. The copy occurs first, and then the paste command can be executed. However, using the "macro" concept, the two aspects of "perform a copy" and "perform a paste" can be performed in any order. Thus, new commands such as "paste from an application", which does not change the intended meaning of the individual commands when it is followed by "perform a copy", can be assigned a different symbol sequence than the command involving perform a copy and then perform a paste. This aspect of utilizing a macro to enhance the capabilities of existing systems will be discussed further with regard to FIGS. 10*a*-10*h* for example. This is one example of an inter-application command which is accessed utilizing a symbol sequence.

Figure 5A:
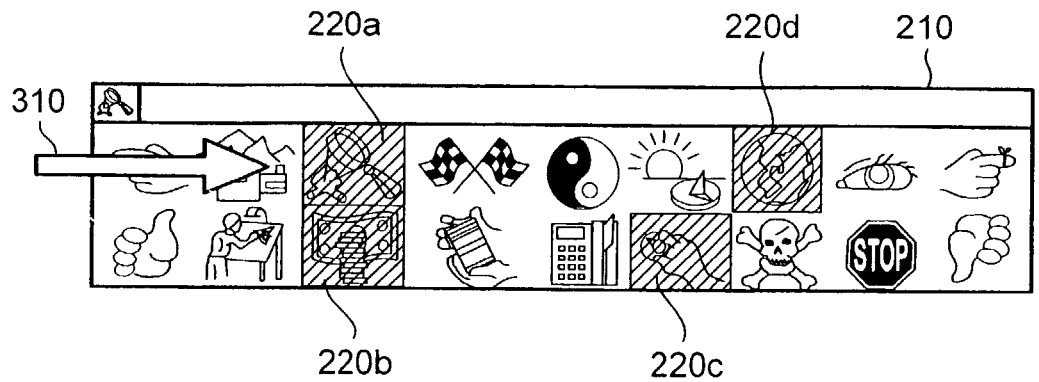
FIGS. 5a-5c illustrate symbol prediction and a symbol sequencing for accessing an application program.
Figure 5B:
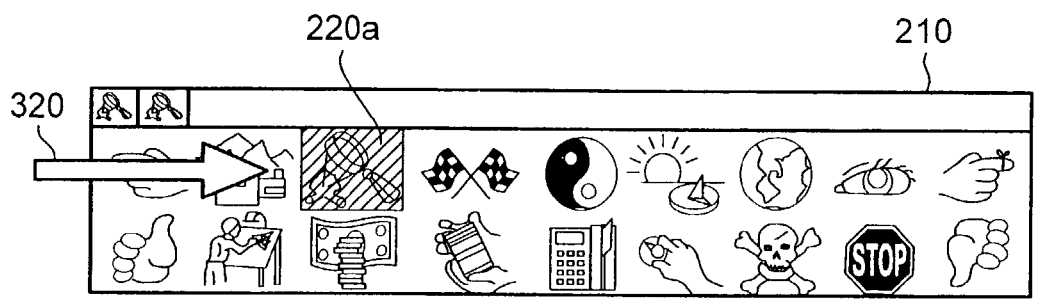
Figure 5C:
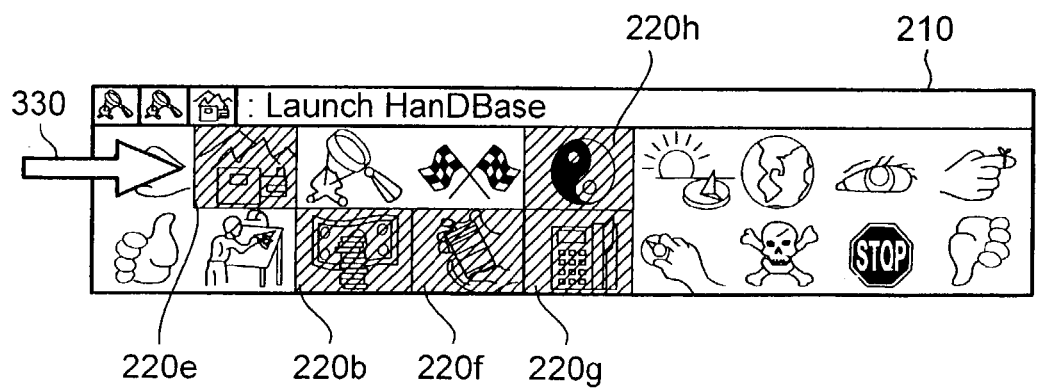

FIGS. 5*a*-5*c* illustrate the use of symbol prediction and illustrate how a symbol sequence is selected and then used to enable an application program for example, such as the HanDBase program of the PalmPilot™ for example. Initially, after selecting the symbolicity symbol as shown in FIG. 4 for example, the two rows of symbols of the symbol template 130 are preferably displayed as shown in FIG. 5*a* for example. The available symbols (as first symbols in stored symbol sequences) are the "find" symbol 220*a*, the "money" symbol 220*b*, the "control" symbol 220*c* and the "all" symbol 220*d* (similar to that shown in FIG. 4). As shown in FIG. 5*a*, out of these available or valid symbols, differentiated from the other symbols shown in FIG. 5*a*, a selection represented by arrow 310 is then made (by a user touching the symbol, by input of the stylus, by selection of a corresponding key on the keyboard, by voice recognition, etc.). As shown in FIG. 5*a*, the selection 310 corresponds to the "find" symbol 220*a*. Upon selection thereof, the find symbol is then preferably displayed in the display area 210 as the first symbol in the symbol sequence.

Moving to FIG. 5*b*, it is noted that only the find symbol 220*a* remains highlighted. This is because, among the available stored symbol sequences, the only available "next" symbol (after selection of the "find" symbol by selection 310) is another "find" symbol. Thus, a next selection, designated by element 320 of FIG. 5*b*, is made and a second "find" symbol is displayed in display area 210, along with the first "find" symbol, in a sequence therewith.

Finally, in response to selecting two "find" symbols in sequence, five symbols remain. The valid "third" symbols in storage symbol sequences as shown in FIG. 5*c* include the money symbol 220*b*, the card symbol 220*f*, the keypad symbol 220*g*, the Boolean symbol 220*h*, and the file cabinet symbol 220*e*. As various three symbol sequences are stored in association with various application programs, selection of any one of these valid "third" symbols in a symbol sequence will enable a particular application program.

As shown in FIG. 5*c*, a selection 330 is made and the third symbol selected is the "file cabinet" symbol. Thus, the file cabinet symbol is displayed in area 210, sequenced with the two "find" symbols. The particular application program enabled based upon that symbol sequence is also preferably displayed in display area 210. Specifically, as shown in FIG. 5*c*, it indicates that the HanDBase program has been launched or otherwise enabled.

Thereafter, the display will preferably (but need not) maintain display of the template 130 to allow for navigational commands within the HanDBase program, and the HanDBase program will then be displayed in the display area 120. Accordingly, the HanDBase application program is easily accessed by input of three symbols and can be easily remembered through an association between first the "find" symbol and all information category application programs stored within the device, as well as a second association between the file cabinet and the particular HanDBase program itself. Similarly, if other information type application programs were to be accessed, the find symbol would be selected twice, as shown in FIGS. 5*a* and 5*b*, and one of the symbols shown in FIG. 5*c* would then be selected as follows: the money symbol (wherein the coins could be yellow for example) to access the Yellow Pages; the card symbol (representing randomness for example) to access the thesaurus; the key pad symbol (representing an electronic card reader) to access a dictionary; or the Boolean (yin-yang) symbol to represent the White Pages (wherein the symbol could be displayed in black and white for example).

As previously stated, the present application applies both to utilizing symbol sequences to enable application programs and to execute commands. Thus, a plurality of polysemous symbols can be provided for selection in a manner similar to that shown by template 130 of FIG. 4 for example; a plurality of sequences of selectable polysemous symbols can be stored, each being stored in association with a command for execution; and one of the commands can be executed in response to a selection of an associated polysemous symbol sequence. These commands can include movement type commands such as move up, move left, move down, move right, page up, page down, etc.; as well as standard computer commands such as new, open, save, quit, undo, etc. Some examples will be discussed regarding FIGS. 6-8.

Initially, before discussing examples of FIGS. 6-8, it should be noted that "commands" can be executed in response to selection of a corresponding polysemous symbol sequence to execute the command within a particular application program. These can include intra-application commands and inter-application commands among several applications. The application program itself can be enabled utilizing a symbol sequence, or can be enabled in any other fashion such as via hardwired key, a selected single meaning symbol, etc.

Figures 6A, 6B:
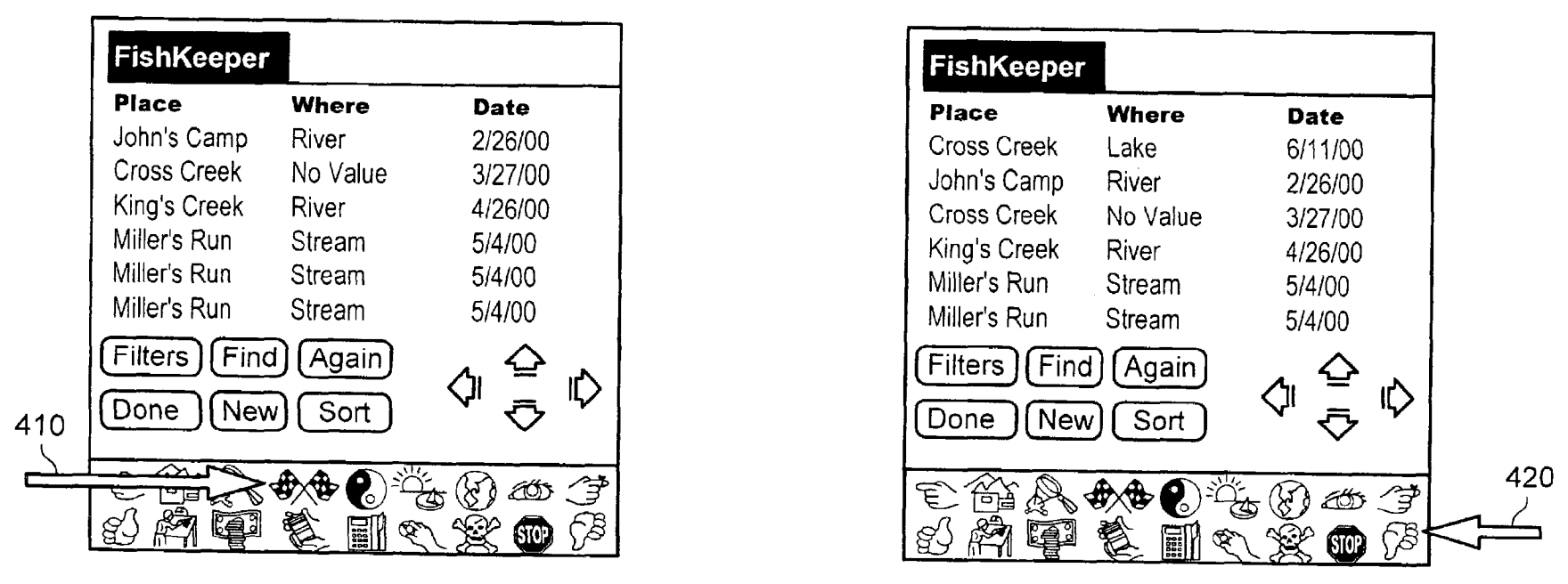

FIGS. 6*a* and 6*b* illustrate how the move down command is executed in response to selecting a sequence of the move symbol and the thumbs down symbol. They are shown, for example, within a "FishKeeper" record of the HanDBase application program. Within this particular application program, many first symbols are shown on the symbol template as being available valid symbols, with only the find symbol, eye symbol and stop sign symbol being deactivated (invalid). Thus, all other symbols are available as a first symbol from a sequence symbol for executing some type of command within the particular HanDBase application program.

In FIG. 6a, as shown by element 410, the move symbol is first selected. Once this symbol is selected, only the available next symbols in a valid symbol sequence are displayed in a differentiated format from the unavailable symbols, or invalid symbols. Accordingly, only five symbols, namely the thumbs up, left, thumbs down, right and all symbols remain valid or active. Thereafter, the "thumbs down" symbol is selected as shown by element 420 and the move down command is executed in response to selection of its associated symbol sequence.

The executed "move down" command can be derived from the FishKeeper screen shown in FIG. 6a as compared to the FishKeeper screen shown in FIG. 6b. Looking at FIG. 6a, the "John's Camp" entry is the first entry, and the three "Miller's Run" entries are the last three entries shown on the screen. In FIG. 6b, the screen has "moved down" by one line, showing the "Cross Creek" entry as the first entry (John's Camp becomes entry number two), with the last two entries being the Miller's Run entries (the third Miller's Run entry has dropped off of the screen). As such, it can be seen how a user can easily navigate within an application program. This type of "move down" command is a navigation command which can be used for example, as an intra-application command.

Figure 7B:
FIGS. 7a and 7b illustrate another aspect of intra-application command navigation using symbol sequencing.
Figure 7B:
Figure 7A:
Figure 7A:

In addition to just moving up and down, for example, by moving one line as shown in FIGS. 6a and 6b, a "page down" command can similarly be accomplished utilizing an associated symbol sequence of the present application. As shown in FIG. 7a, by element 510 for example, at the same first position as shown in FIG. 6b within the FishKeeper HanDBase application, a new symbol "cards" can be first selected. Thereafter, only available or valid second symbols are shown in FIG. 7b, and the user can then select the "thumbs down" symbol as shown by element 520. Upon making this selection, the page down command is executed based upon its association with the symbol sequence of "cards" plus "thumbs down". Using such a command, an entire page of the display can be navigated through. Thus, the first page began with the John's Camp entry (FIG. 7a), and the next page will end with the John's Camp entry and include five new entries (FIG. 7b). Thus, a whole page of information has been provided to the user in an easy accessible form. Thus, simple commands such as move down are not sacrificed, and advanced commands such as page up and page down are easily executed. Of course, it should be understood that execution of the aforementioned commands is merely exemplary, and the present application should not be limited to these commands.

With regard to specific application programs, it is preferred that at least three symbols are used (however, the present application is not limited as such, as any number of symbols greater or less than three can be used) to thereby expand the number of application programs that can be accessed by a symbol sequence. This is because an indefinite number of application programs could be made available, depending on the particular device itself. However, of course, two symbols can be used if only a few application programs are present (or four or more if many application programs are present).

With regard to the command sets, however, since most command sets are pretty well defined, most of these command sets can be associated with only two symbols in a sequence. This allows for simple movement through execution of the two symbol commands such as the "page down" sequence and the somewhat similar two symbol "page up" sequence (using the thumbs up symbol instead of the thumbs down); a simple page left and page right sequence (the card symbol along with the left or right symbol, respectively); a simple two symbol sequence for moving down and moving right (with the right symbol instead of the thumbs down); and two similar symbol sequences for moving up and moving down. In addition, printing a record can be a simple two symbol sequence (such as the draftsman and file cabinet symbol sequence for example); new records can be a simple two symbol sequence, including the new symbol and the file cabinet symbol in sequence for example, etc. Other more advanced but less used commands can include three symbols such as go to the top of the page (move+all+thumbs up) or go to the bottom of the page (move+all+thumbs down). Further, in the command sequence, similar to the application program sequences, a sequence can include one symbol repeated a plurality of times (for example, the "about" command can include the eye symbol repeated twice).

In addition, similar to the sequences associated with application programs, a sequence associated with a command can be newly entered. For example, upon entering a storage mode, a newly input polysemous symbol sequence can be stored in association with a macro, wherein the macro is executable in response to receiving input of an associated polysemous symbol sequence. In this case, the macro can be a new command for example.

Figures 8A, 8B:
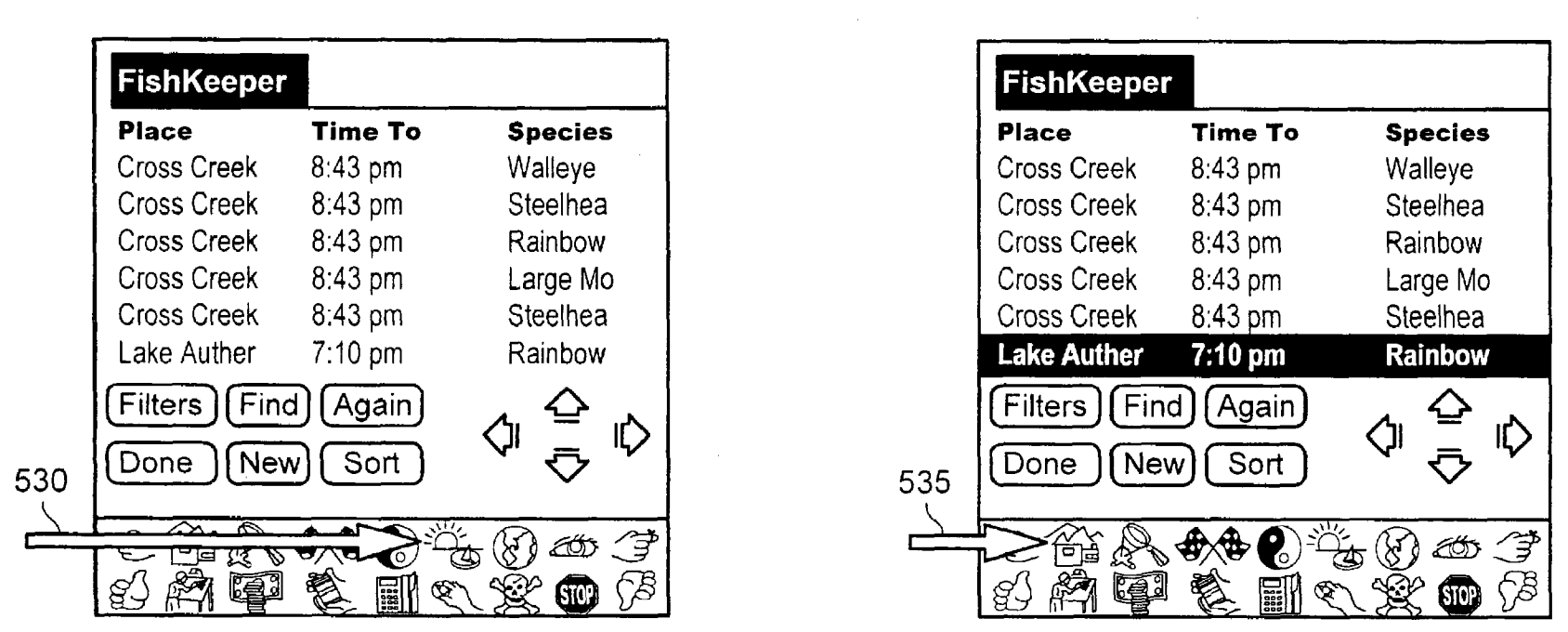

As previously stated, existing commands within a computer device, which can be enabled or executed in response to a selection of an associated polysemous symbol sequence, need not only be navigation commands for moving around within a particular application program. They can also include standard commands such as save (the key pad symbol+the file cabinet symbol, for example); open (the key pad symbol+the move symbol, for example, etc.). Another such example is the "new record" command. As shown in FIG. 8a, two records can initially be available in the FishKeeper program, and when the "new" symbol is first selected as shown by 530 in FIG. 8a and the "file cabinet" symbol is then selected as shown by 535 in FIG. 8b, a new record such as the "Lake Arthur" record as shown in FIG. 8b can be entered.

In addition, while the FishKeeper database could be one database available in the HanDBase application, a new database can be created utilizing the symbol sequence new+all+file cabinet. As shown by 540 of FIG. 8c, the "new" symbol is first selected; then as shown by 545 in FIG. 8d, the "all" symbol is selected next; and finally as shown by 550 in FIG. 8e, the "file cabinet" is selected to complete the sequence. As such, the "new database" instruction is executed and the FishKeeper database is then be replaced with a new database as shown in FIG. 8e, prompting the user to input a name for the database, fields for the database, etc.

Figures 8C, 8D:
Figure 8F:
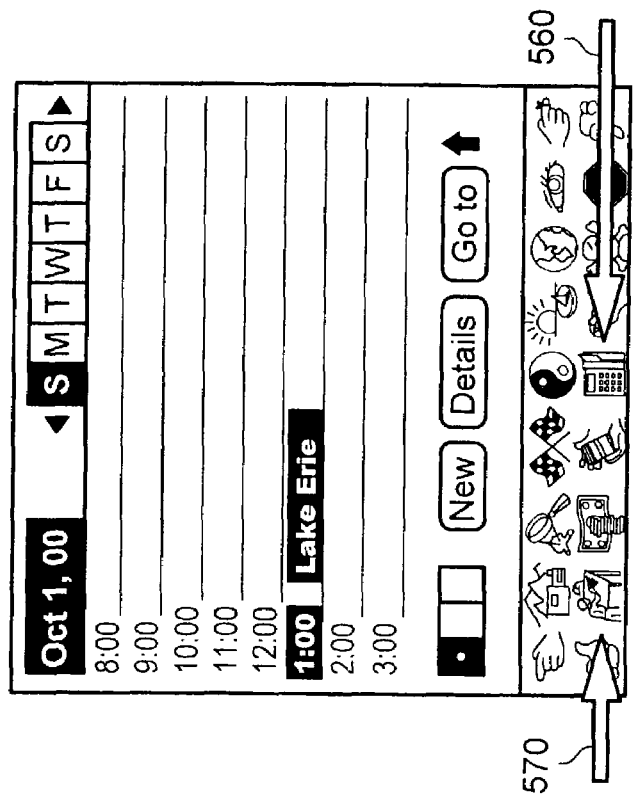
Figure 8E:
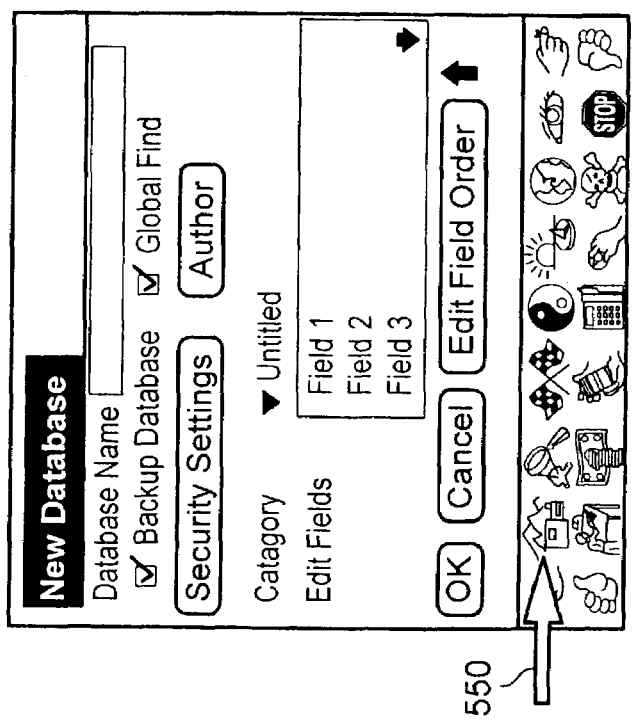
Figure 8G:
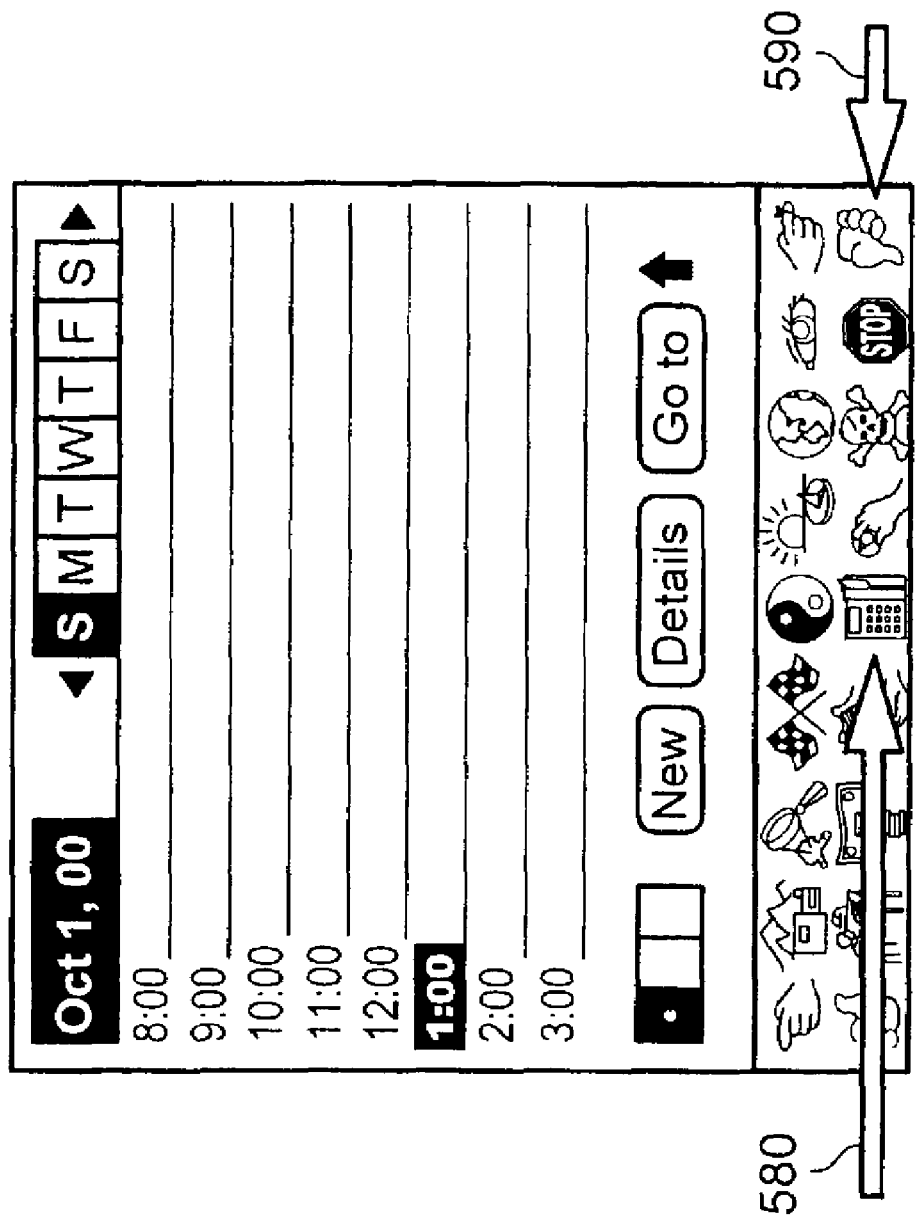

A further example of a command being executed in response to a selected corresponding symbol sequence is shown in FIGS. 8f and 8g regarding the "undo" command. FIG. 8f shows a prior paste being performed in response to the sequence of the "keypad" symbol as shown by 560 and "draftsman" symbol as shown by 570 being selected. FIG. 8g then shows the execution of the "undo" command in response to selection of the corresponding symbol sequence of "keypad" as shown by 580 and "thumbs down" as shown by 590. In response thereto, the pasted entry of "Lake Erie" of FIG. 8f is "undone" and no longer appears in FIG. 8g.

Accordingly, "commands" as used through the present application need not include merely navigational or movement type commands, but can also include standard commands available within an application program (intra-application commands), as well as commands utilizable between application programs (inter-application commands). These inter-application commands can transfer information from one application program to another, as will be explained as follows.

Figures 9A, 9B:
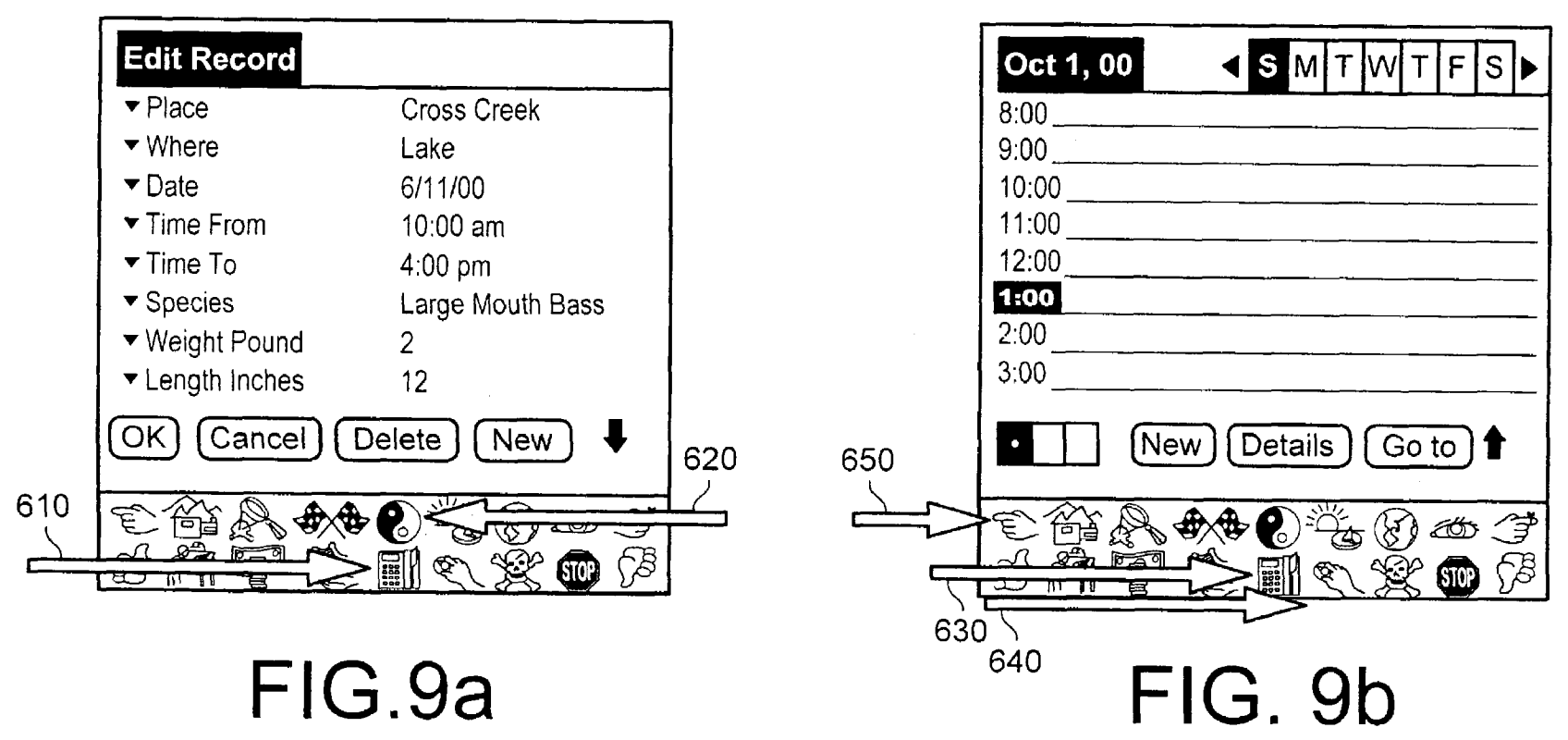
Figure 9C:
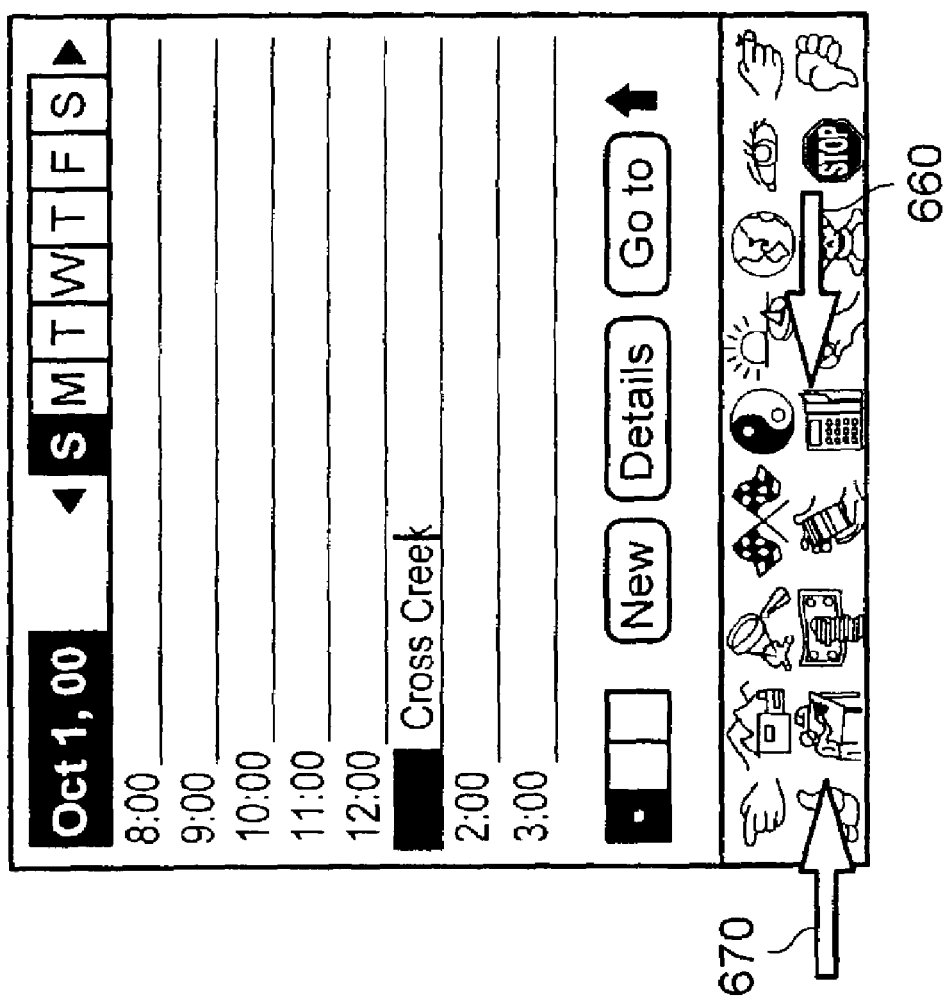

FIGS. 9a-9c illustrate a method for executing an inter-application command, namely a command which operates between two application programs. That particular command being executed in FIGS. 9a-9c is the copy/paste command, an inter-application command which transfers information from one application program to another. The copy/paste command is executed in response to selection of an associated polysemous symbol sequence, wherein a plurality of sequences of selectable polysemous symbols are stored, each being stored in association with a command for execution.

Initially, as shown in FIG. 9a, the copy is performed. Thus, a record such as that shown in FIG. 9a is opened and an entry is highlighted. Thereafter, the "key pad" symbol is first selected as indicated by arrow 610, followed by the "Boolean" symbol in step 620. This essentially copies the highlighted entry as shown FIG. 9a.

Thereafter, as shown in FIG. 9b, another application program is selected, such as the calendar, for example. First, the "control" symbol is selected as indicated by arrow 630; the "control" symbol is again selected as shown by arrow 640; and the "left" symbol is finally selected as shown by the arrow 650 in FIG. 9b. As such, the calendar application is enabled and can thus be pasted into. Finally, as shown in FIG. 9c, the paste command is executed in response to selecting the "key pad" symbol as shown by arrow 660 followed by the "draftsman" symbol as shown by arrow 670. Once this paste command is performed after selecting a particular calendar entry, the pasting of the copied entry into the calendar application is then complete. As such, the paste command is an inter-application command which operates between two application programs, namely between an initial record as shown in FIG. 9a and the calendar application shown in FIGS. 9b and 9c. When a copy and then a paste command is performed in this way, the operating system stores the object of the copy command in its memory within an internal clipboard (for example). It is then referred to and deposited through the paste command at the point of entry when and where the paste command is performed. Thus, the symbol sequence acts to initiate the built-in commands of the operating system.

FIGS. 10a-10h illustrate how the methodology of the present application can be used to access commands which essentially create operations not previously accessible. FIGS. 10a-10h illustrate a new type of "paste from" operation, which is essentially the inverse of the copy/paste command.

Figures 10A, 10B:
Figure 10D:
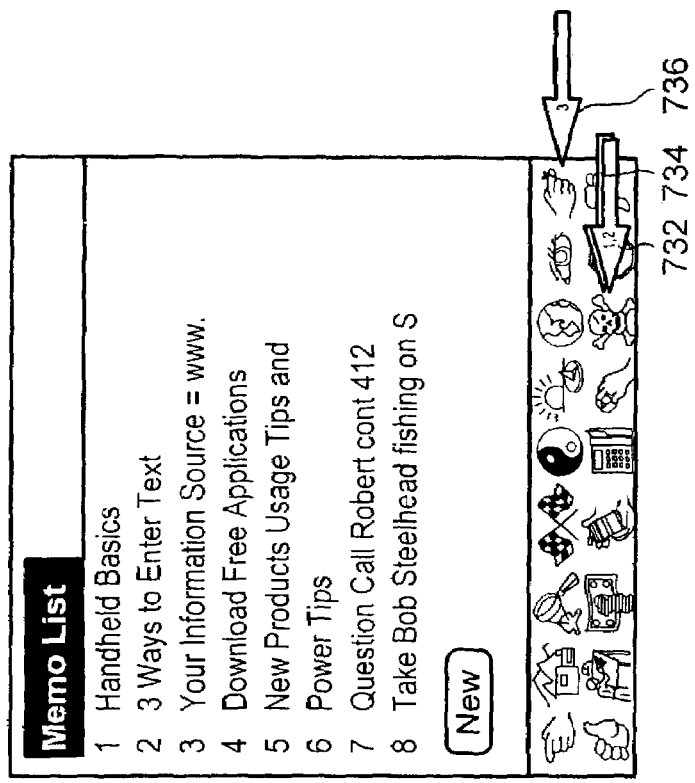
Figure 10C:
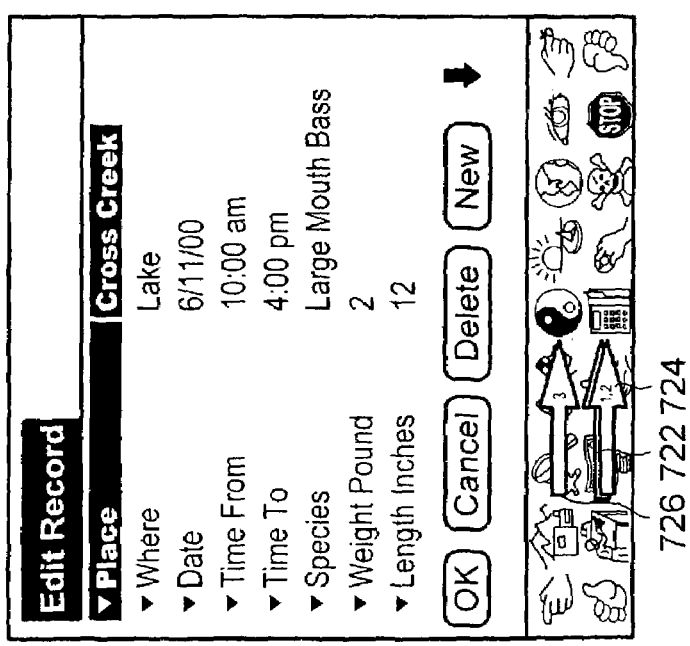

Initially, as shown in FIG. 10a, an entry in an existing application is selected as shown by arrow 700. The entry is selected and then highlighted as shown by the arrow 710 in FIG. 10b. Thus, the field text "Cross Creek" has been highlighted as shown in FIG. 10c. Thereafter, as shown by arrow 722, 724 and 726, the "paste from" command is executed selecting the "key pad", "key pad", and "Boolean" symbols, respectively. Thus, the entry "Cross Creek" will be replaced by another entry placed from another application. Thereafter, as shown in FIG. 10d, a second application program is accessed by selecting the symbol sequence of "control", "control", and "right" as shown by elements 732, 734, and 736, respectively. As such, the memo pad application program is enabled as shown in FIG. 10d.

Figure 10F:
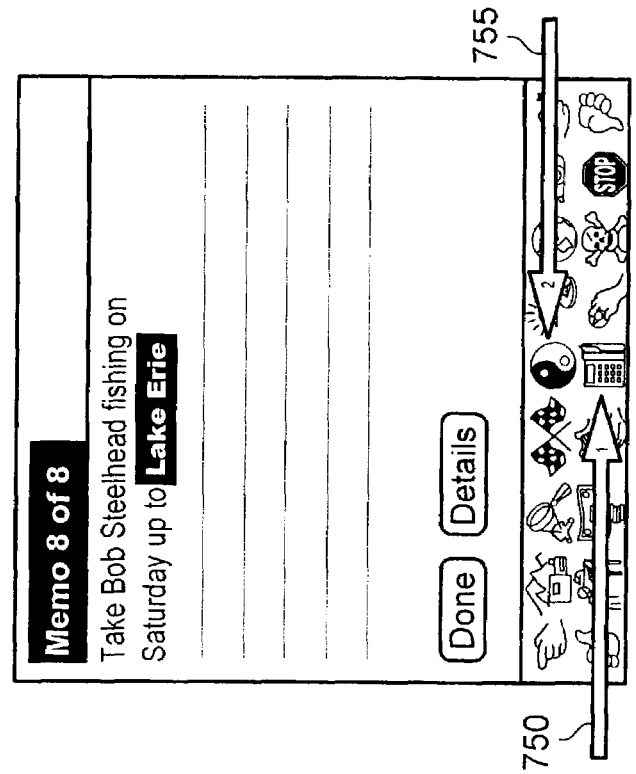
Figure 10E:
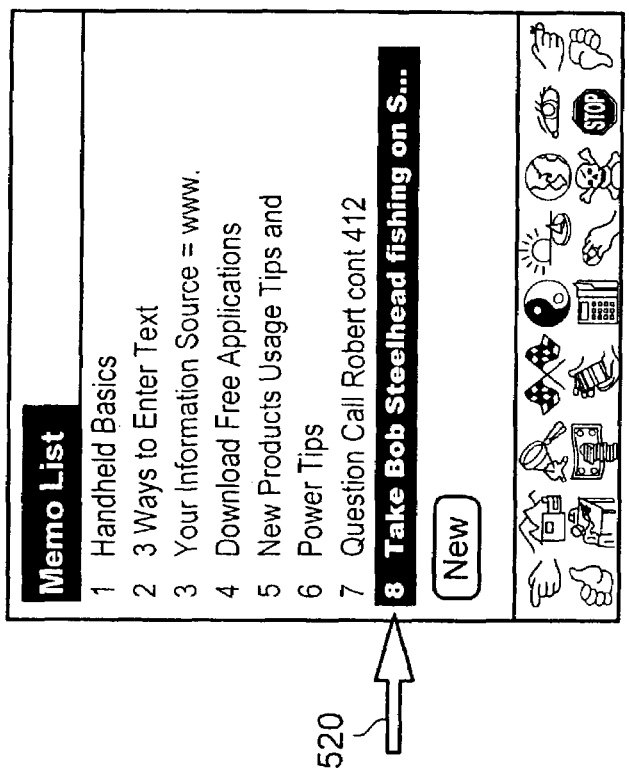

Within this program, an area or line is then highlighted as shown by the arrow 740 in FIG. 10d, and a specific part of that highlighted material is further highlighted as shown in FIG. 10f. Thereafter, as also shown in FIG. 10f by the arrows 750 and 755, the sequence corresponding to the "copy" operation is selected. However, the copy operation is not performed and instead, the "paste from" command is executed wherein "Lake Erie" is pasted from the memo pad application and into the initial FishKeeper application as shown by arrow 760 in FIG. 10g. If this is acceptable, the user then hits the okay button as shown by arrow 770, and the Lake Erie entry replaces the Cross Creek entry in the FishKeeper application as shown by element 780 in FIG. 10h.

As such, when the macro command "paste from" is accessed, the software can store an internal marker, for example, in a built-in storage database that references the area that was selected when the "paste from" command was executed. Later, when a copy (any copy) is performed, the macro can intercept the copy command after the selected item is copied into the built-in clipboard storage area of the operating system (OS). The macro can then retrieve the aforementioned marker and open up the page or record. It can then paste the item located in the OS clipboard storage area into the area defined by the marker, thus completing the macro and clearing any marker set by the macro. Accordingly, such macros can make use of internal computer commands by storing them in an internal database program, retrieving them, and then executing them in a predefined order as set by the program that is storing and building the macro.

FIGS. 11a-d illustrate a macro command of "paste from memo pad", corresponding to the symbol sequence of "draftsman, control+control+right". This macro is essentially created from the "paste from" command and is one which, in this example, is stored in association with a sequence of four symbols. Similar to the scenario previously discussed with regard to FIGS. 10a-h, when the macro command "paste from memo pad" is accessed, the software can store an internal marker, for example, in a built-in storage database that references the area that was selected when the "paste from memo pad" command was executed. Later, when a copy (any copy) is performed, the macro can similarly intercept the copy command after the selected item is copied into the built-in clipboard of the operating system. The macro can then retrieve the aforementioned marker and open up the page or record. It can then paste the item located in the OS clipboard storage area into the area defined by the marker, thus completing the macro and clearing any marker set by the macro. This will be explained, for example, in association with FIGS. 11a-d.

Figure 11B:
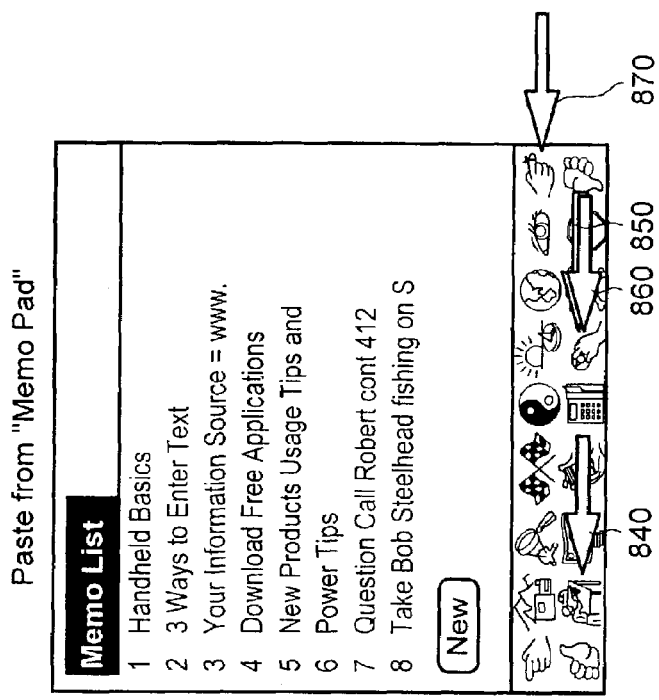
FIGS. 11a-d illustrate an association of a macro and symbol sequencing.
Figure 11A:
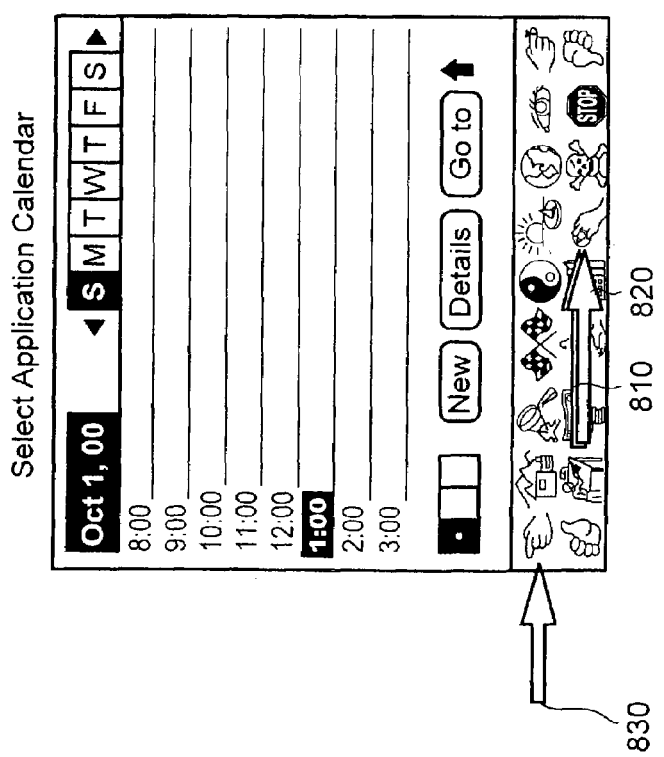
Figures 11C, 11D:

As shown in FIG. 11a, an application program which will receive information pasted from the memo pad is initially accessed. As shown in FIG. 11a, the calendar application is accessed or selected by selecting its associated symbol sequence of "control+control+left" as shown by arrows 810, 820 and 830 in FIG. 11a for example. Thereafter, as shown by FIG. 11b, the command "paste from memo pad" is accessed by selecting its associated symbol sequence of "draftsperson, control+control+right" as shown by the arrows 840, 850, 860, and 870, respectively, of FIG. 11b. Thereafter, when a copy is performed as shown in FIG. 11c, by selecting the symbol sequence of "keypad+copy" as shown by arrows 880 and 890 of FIG. 11c, and when an item is selected as shown in FIG. 11c, the selected item is then automatically pasted within the calendar application (at a selected area as shown in FIG. 11d for example), with the pasted information being from the memo pad application. As such, a macro is created and utilized wherein a new command "paste from memo pad" is developed and assigned to a new symbol sequence. As such, these types of macros make use of internal computer commands by storing them in an internal database program, retrieving them, and executing them in a predefined order as set by the program that is storing and building the macro.

The computer device of the present application may be a PDA such as that shown in FIGS. 2-4 of the present application, or may be any other type of computer device. For example, the computer device may be any type of hand held computer, and can also be a mobile phone. An aspect of the present application, in the context of its use in conjunction with a mobile phone, will be discussed hereafter with regard to FIG. 12 of the present application.

Figure 12:
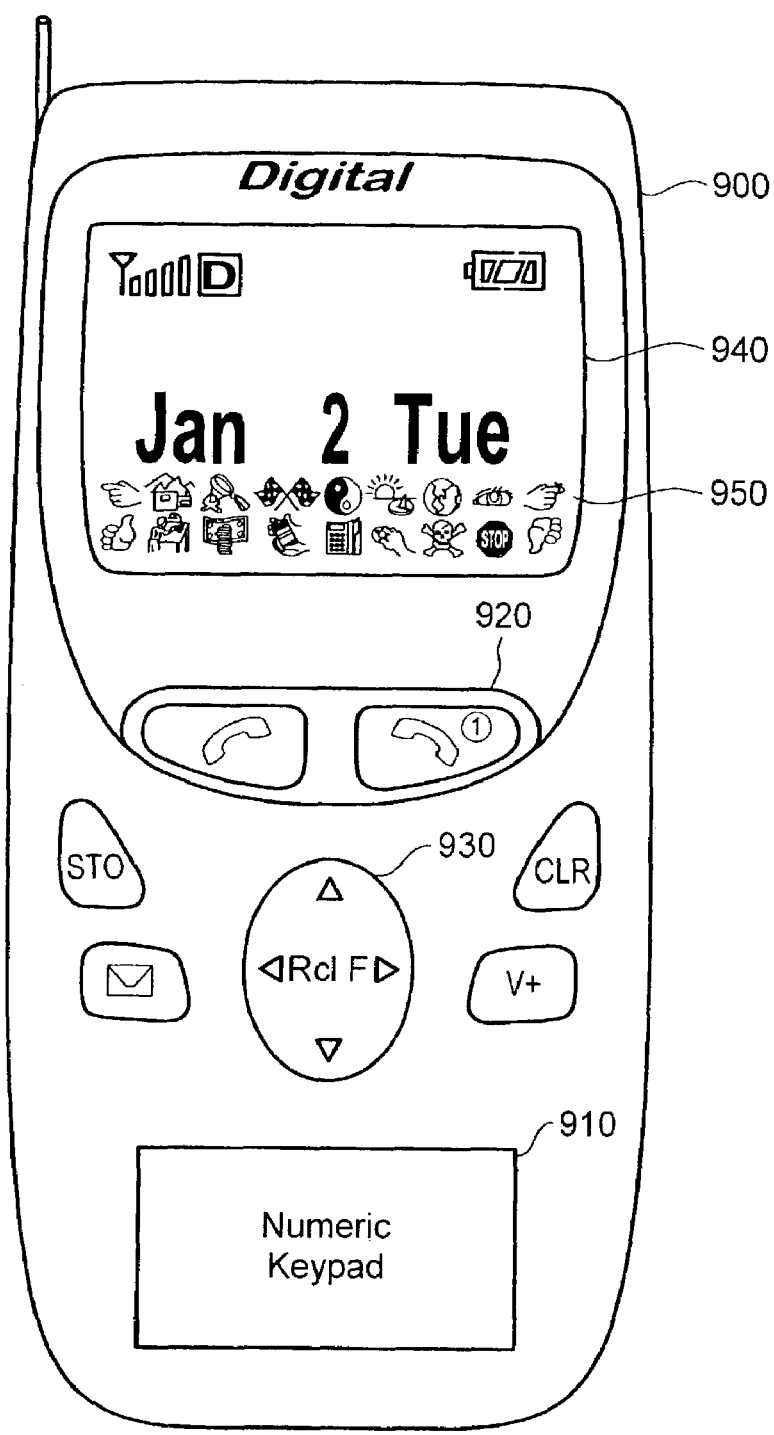
FIG. 12 illustrates a mobile telephone application of symbol sequencing.

FIG. 12 provides one application of a template of polysemous symbols applied in the context of a mobile phone. A mobile phone application, somewhat similar to a PDA and even more extreme than a PDA, includes a small display area where display space is a premium. Thus, instead of difficult to use and visually obtrusive pull down menus, sequenced symbols can provide easy access and enablement of various application programs and commands.

As shown in FIG. 12, a mobile phone 900 includes a numeric keypad area 910, an area 920 including start (enter) and stop (cancel) buttons for beginning and ending a telephone call; another key area including scrolling arrow key pad 930; and a display 940. The display 940 may be a normal display screen, or may be an integrated input and display device. In the case where the display 940 is an integrated input and display device, a finger or stylus can be used to select various ones of the symbols shown in template 950 displayed on a portion of the display screen 940, and preferably on less than one-third of the display screen. If these symbols are directly selectable based upon the display 940 being an integrated input and display device, the scrolling arrow keypad 930 need not be included.

However, if the scrolling arrow keypad 930 is included, it can be used to sequentially select various ones of the symbols. The symbols can be selected and entered through the use of the scrolling arrow keypad 930 and through the use of one of the buttons 920 for example. Alternatively, the numeric keypad 910 can include keys associated with various ones of the symbols for selection thereof; can include an overlay corresponding various ones of the symbols to various keys of the numeric keypad 910 (wherein in such an instance, the symbols need not be displayed on display device 940); or other techniques such as voice recognition technology, for example, can be used to select the symbols.

In order to adapt the symbol template and the basic symbol sequence aspects of the present application to mobile telephone technology, as with any type of computer device, one need only acquire a list of available command sets and applications from the device. The commands and applications can be retrieved and can be associated with one of a plurality of polysemous symbol sequences in a manner somewhat similar to that previously described generically in the PDA environment with regard to FIGS. 2-11 of the present application. In addition, if desired, a particular template of symbols can be designed based on the commands and programs of the device.

More specifically, commands can be initially retrieved in their inherent logical order. For example, the command "one; LOCK" can be found as a main category within the first menu of the device for example. Then, a secondary or subcategory and a final command are compiled (such as "1; LOCKED" and "1; KEY LOCK" and "Yes" or "No" being compiled to "1; LOCK: 1; KEY LOCK: Yes"; or "1; LOCK: 1; KEY LOCK: NO"), or just a final command ("2; DISPLAY; 1; MY NUMBER").

The aforementioned examples provide two situations: the first of which are two position command sequences like "2; DISPLAY: 1; MY NUMBER"; and the second situation involves three position command sequences like "1; LOCK: 1; KEY LOCK: Yes".

After collecting all of the available computer commands, a hierarchical list of logically organized command sets can then be uncovered. However, this list is probably not inherently the easiest to remember and probably does not effectively represent a natural structure; thus it should be changed to a more natural structure from which categories and sub-categories (and associated symbols can be created). "1; LOCK: 1; KEY LOCK: Yes" is not as grammatically easy to remember as "Set Key Lock Yes". The second phrase is much easier to read, make sense of, and remember over time. The logical set is much more cryptic, and in most situations looses touch with its intended meaning. By changing commands to a more natural structure, it is much easier to evaluating symbols and symbol sequences for associating therewith.

In producing a symbol set or template such as that shown by element 950 of FIG. 12, one should preferably first evaluate the full list of command sets (and/or application programs) looking for semantic groupings, using a core set of the most commonly used categories. This was the process that was followed in designing a symbol template 130 shown and discussed throughout FIGS. 2-11 of the present application, in conjunction with a PDA device. Thus, although the symbol shown as element 950 in FIG. 12 essentially corresponds to the symbols of the template 130 of FIGS. 2-11, they need not so correspond, and could be redesigned to produce better semantic groupings when used for different types of computer devices, like the mobile phone for example. Thus, in the PDA, mobile phone or any environment, the particular symbols discussed in the present application are merely exemplary and should not be considered to limit the present application.

Further, it should be noted that the template 950 shown in FIG. 12 includes the thumbs up, thumbs down, left and right symbols of the template 130 of FIG. 4 for example. Some of the functions of these symbols can optionally be performed by the controller 930 on the telephone. Because it may be desired to reduce the number of symbols for display on a mobile phone, as opposed to a PDA, since the display itself may be smaller, these symbols can be removed leaving only 14 symbols. However, the template 950, as shown in FIG. 12 of the present application, should not be considered to limit the present application in any way and could easily be completely from the template 130 of FIG. 4 for example.

Once the full list of command sets (and/or application programs) are identified, semantic groupings can be established using a core set of the most commonly used categories. This core set, for the mobile phone for example, may contain semantic groups like "view number", "view settings", "view back light", "view version", etc. Although most of these are found under various different menus, they can be organized differently based on their similar natural semantic structure and can therefore be associated with symbol sequences involving a similar first symbol or category symbol.

A set of symbols themselves are preferably displayed horizontally across the bottom third of the screen 940 of the mobile phone 900 as shown by element 950 of FIG. 12 for example. Preferably, the template 950 includes eight to eighteen symbols in two rows and nine columns (of course, if fourteen symbols are used, two rows of seven columns can be used and this aspect, as previously discussed, is merely preferred and should not limit the present application in any way). Although not shown in the display 940 of FIG. 12, there are preferably two text fields for displaying text above the template of symbols 950. The first field preferably displays the appropriate phone information (i.e., phone number, time, date, call length, etc.); with the second field preferably displaying selected symbols of symbol sequences, even more preferably in combination with a particular application being launched by the particular symbol sequence, similar to that corresponding to display area 210 as discussed previous with regard to FIGS. 4 and 5 of the present application.

In the embodiment shown in FIG. 12, navigation of the symbol template 950 can include use of the four-way navigation scroll button 930, for example, along with the enter and cancel buttons 920, found below the display screen 940. Again, this is only one preferred embodiment, and if desired, display 940 can be an integrated input and display device and a finger or stylus command can be used to select the symbols; numeric keys on the keypad 910 can correspond to displayed symbols of the template 950; or any other type of input device can be used such as a connected external input device such as a mouse, for example, or even voice recognition technology as will be discussed in more detail hereafter.

When using the four-way navigation scroll button 930 (or some type of left-right navigation scroll button for example) and the enter and cancel keys 920, when the scroll button is pushed in any direction, a default symbol in the template 950 is then preferably highlighted. A next push on the four-way navigation scroll button 930 then moves the highlight to the next appropriate symbol that falls in the direction that the scroll button 930 is pushed. When a desired symbol is highlighted, or otherwise differentiated from other symbols in some way, then the entered key (one of the two keys 920 for example) can be pushed to select this symbol as a first symbol in a symbol sequence. This will preferably start a symbol prediction mode as well, wherein only available symbols can be selected at a next symbol in the sequence (with unavailable symbols being differentiated in some way from the available symbols through the use of highlighting valid symbols or even more preferably darkening the invalid symbols). Of course, symbol prediction can alternately begin immediately by highlighting only valid first symbols, if desired.

A second push on the four-way navigation scroll button 930 then preferably highlights another default symbol (preferably only a valid symbol and not an invalid symbol). Of course, symbol prediction need not be used if desired, but the use of symbol prediction is preferred.

Even more preferably, after one symbol in a sequence has been selected, this symbol is displayed. In addition, each time a new symbol is highlighted for potential selection (by moving the four-way navigation scroll button 930 to the symbol), a corresponding program or command corresponding to the first symbol and the highlighted symbol is preferably displayed in the second field of the display 940. For example, if the second symbol would complete a symbol sequence associated with a particular command, that command is preferably displayed so that the user knows that if that particular symbol is selected, then the command will be executed; and/or if it corresponds to an application program, then the particular application program will be enabled.

When the second and/or final symbol in the symbol sequence is highlighted, and the enter key 920 is thereafter pushed, the command or application program associated with the symbol sequence (with the text of the program or command preferably being displayed in the display area 940) is then executed or enabled. Thereafter, the template 950 preferably resets to a default state and is then again ready for navigation via the four-way navigation scroll button 930 or other input selection device. If a particular choice or selection of the symbol is not acceptable, then the other of the two buttons 920 is preferably selected to cancel this symbol and thus revert back to a previous state in the symbol sequence, nullifying any symbols previously chosen. Further, similar to that described previously, the template 950 can remain displayed or can be displayed upon entering a mode such as the symbolicity mode (via symbol selection or key selection for example).

As such, a comprehensive package can be designed for controlling and accessing the various commands and application programs of the mobile phone, in a very similar manner to that previous described in the PDA environment with regard to FIGS. 2-11 of the present application. A particular application program can easily be enabled in response to receiving selection of an associated polysemous symbol sequence. Further, within an associated program, the plurality of polysemous symbols (such as those shown in the template 950 for example) can again be displayed; a plurality of sequences of the displayed polysemous symbols, each stored in association with a command, can be stored; and one of the commands within the application program can be executed in response to receiving selection of an associated polysemous symbol sequence. Accordingly, virtually any of the functions previously discussed with regard to FIGS. 2-11 can be easily applied to other computer devices such as a mobile phone for example.

In the mobile phone environment, for example, association of polysemous symbol sequences with application programs or commands can also be used to access remote networks, such as the Internet for example. Known methods used to navigate web pages (that have been previously filtered through WAP-like protocols for example) are similar to those used in the navigational techniques previously discussed with regard to FIGS. 2-11 of the present application in the PDA environment. The WAP (or other) protocol may severely limit the amount of content downloaded to these phone systems and thus, may limit the amount that is to be navigated. With the introduction of a system and method associating polysemous symbol sequences with application programs and commands, and allowing for the creation of macros, new protocols can be developed for more extensive content to be made available by associating polysemous symbol sequences with application programs, thereby making it easy to "look up a stock quote", "search a dictionary", etc.

Application of the present invention to a network, such as the Internet for example, will be discussed in more detail hereafter. However, it should be understood that such techniques may be used to access the Internet in any way, through a PDA, through a mobile phone, or through a personal computer for example, and thus the present invention equally applies to any type of computer device.

Figure 13:
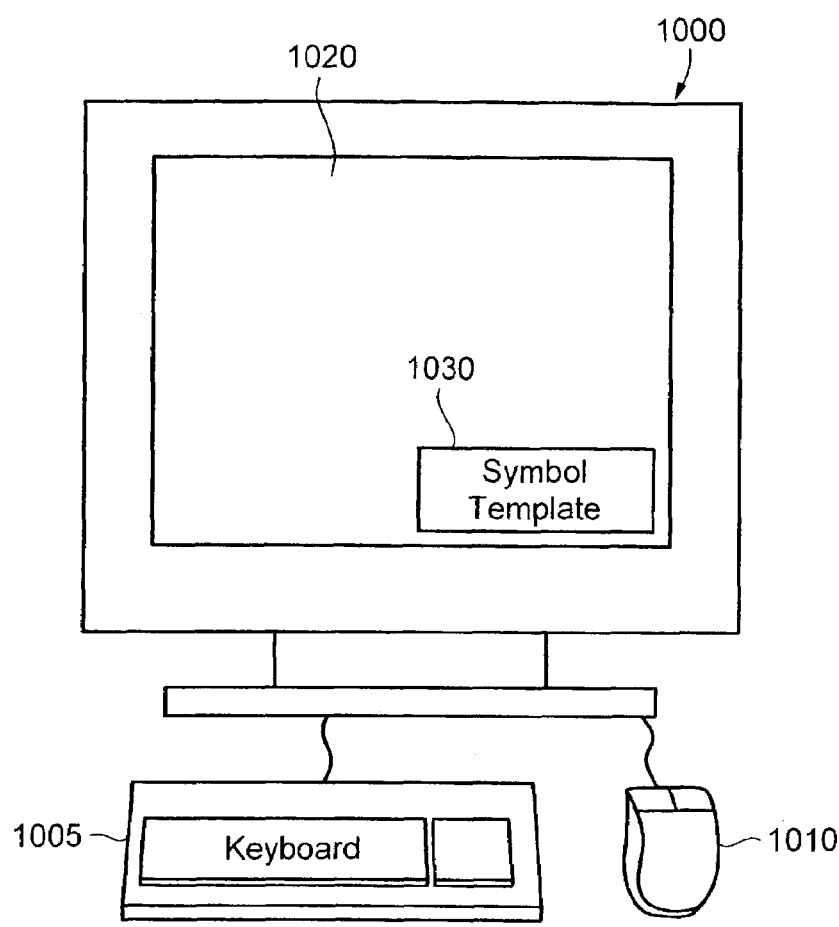
FIG. 13 illustrates an application of the present invention techniques to a personal computer.

In the context of a personal computer such as that shown in FIG. 13 for example, or in the context of any computer device which can access a network such as the Internet for example (these devices including but not limited to PDAs, mobile phones, etc.), the use of polysemous symbol sequences can not only be used in the context of accessing general computer commands and application programs for example, in a manner similar to that previously described with regard to FIGS. 2-12 of the present application, but can also be used in a search context in combination with an Internet browser such as the Microsoft Internet Explorer for example.

Similar to establishing polysemous symbol sequences for association with application programs and commands in the PDA or mobile phone environment, when used in connection with an Internet browser, a list of available command sets from the program application must first be obtained. When retrieved, they can then be placed in their inherent logical order, using "file" as a main category as found within the application for example. Then, either a final command can be compiled ("file" and "new" become "file: new"), or secondary or subcategories as in "favorites: organized favorites: new folder" can be established, with "organized favorites" being a secondary category with no real inherent command attached thereto and "new folder" being the final command producing the program action, for example. Again, each of these commands/categories are merely exemplary and used only to illustrate the application of the present application techniques to the Internet browser environment.

By performing the above-mentioned operations, two position command sequences like "file: new" can be established as well as three position command sequences like "view: browser: bondi". In some situations, instead of executing a final command which produces an action from a two position command sequence or a three position command sequence, it may end with a special command that transports the user to a dialog window or model dialog window with further command sets like "edit: preferences . . . " for example (with the . . . indicating the transport). With model dialog windows, more sets are available like "browser display: show tool tips" for example, thereby producing a final logical order of "edit: preferences . . . : browser display: show tool tips", for example.

Other situations may occur involving buttons, default buttons, radio buttons, etc., where a button may be associated with a final command and therefore, become part of a command set. For example "edit: find . . . cancel" or "edit: find . . . find", where "cancel" and "find" are buttons and are available choices resulting in the model dialog window produced by the "edit: find . . . " transport, produce a final command set of "edit: find . . . cancel" or "edit: find . . . find". Another situation may be where a button or a symbol, usually contained within the tool bar or floating window, represents the command or is a transport to another set of symbols or symbol buttons like "paintbrush" (a symbol); "brush size" (available brush size symbols). These buttons and symbols usually do not contain text (some do), but do usually have an associated name like selection tool, fill tool, align left, align right, etc. These symbols may produce two distinct types of commands, the transports and then the final command, or just a final command.

Finally, another situation may occur when an item or a window has a pop-up menu with available final commands and transports to further command sets and final commands. A pop-up menu usually does not have text (some do), but does usually have a name associated with it like "draw", where the superscript "^" is the arrow designating the pop-up. The command set looks something like draw^: order^: bring to front".

After collecting all of the available computer commands/application programs, a hierarchical list of logically organized command sets is established. However, this list may not inherently be the easiest to remember and does not effectively represent a grammatical structure. "File: new" is not as grammatically easy to remember as "create a new window" or "create a new document". The grammatical set is much easier to read, make sense of, and remember over time. The logical set is much more cryptic and in most situations loses touch with the intended meaning. Accordingly, various command sets are preferably changed into grammatical phrases and then compiled into categories, subcategories, etc., and thereafter associated with symbols and symbol sequences in a manner similar to that previously set forth with regard to FIGS. 2-12 of the present application.

Some commands have taken on a more universal meaning, especially with some keyboard-shortcut commands. For example, "edit: copy" has taken on the meaning of "copy" or an alternative meaning like "command copy" or "alt copy". These special commands have the effect of becoming a core set of commands which are found on approximately 90 percent of all computer programs. The primary list starts with New, Open, Quit, Close, Cut, Undo, Copy, Paste, Undo, Select, Select All, Find, Save, Save As, Import, Export, Page Set Up, Print and Print. The best known of this corset, of course, are NEW, OPEN, QUIT, CUT, UNDO, COPY, PASTE.

There is also an order to these commands where copy is normally first, with paste occurring thereafter, with the phrase "copy, paste" being normally associated with one command. However, it is actually two commands, with two totally different meanings but they are very closely tied to each other in use. This is due to the hierarchical nature of programming languages, but is not an obstacle when used in association with symbol sequences for controlling command sets. "Perform a copy" can occur with "perform a paste" occurring in the same order as the hierarchical method. The grammatical nature can also be changed to create "paste from application", and then "perform a copy", which does not change the intended meaning of the individual commands but which profoundly changes the way and order in which these command sets are performed.

The change is very effective in increasing productivity and providing for a completely different means for performing common commands in a more grammatical way but also makes much more sense. New methods or concepts can now change the way computer programs are used by changing the grammatical order of command sets within a pre-determined set of rules.

The next step in producing a symbol set or symbol template, is to evaluate the full list of command sets looking for semantic groupings, using a corset of the most commonly used categories. Using semantic groupings rather than hierarchical groupings resolves a lot of problems that programs have encountered like whether "preferences" should fall under the "file" menu or the "edit" menu. In creating semantic groupings, "preferences" fall most likely after "change", i.e., "change references", and could fall within a group containing "change font", "change font size", "change formatting", etc.

A core set, for example, can contain semantic groups like "new", "new window", "new document", "new address", etc. Although most of these are found under the "file" menu, some can be found in buttons, pop-up menus and in dialog menus. Therefore, the category "file" is not preferably used, but rather the more grammatical "new" and "window" are used to better organize available commands under their more grammatical, semantic nature. From this, symbols and symbol sequences can be created and can be associated with application programs and/or command sets in the PDA environment, mobile phone environment, etc.

Figure 14:
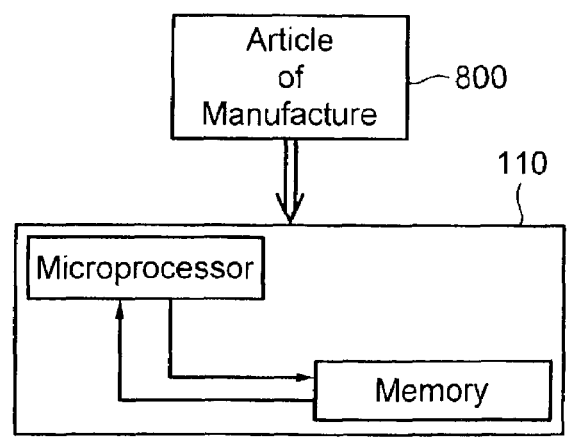
FIG. 14 illustrates an article of manufacture of the present application.

As shown in FIG. 14, a personal computer 1,000 includes various standard components such as a display screen 120, keyboard 105, and a mouse 110. In connection with the present application, a symbol template 1030, such as the symbol template 130 of FIGS. 2-11 or template 950 of FIG. 12 can be used. These symbols can be associated with various commands and application programs applicable to the personal computer and can be used to access and/or navigate previous programs in a manner similar to that previously described with regard to FIGS. 2-12 of the present application. Once command sets and application programs are identified, they can be appropriately categorized and associated with polysemous symbol sequences.

In the case of an Internet browser, a core set (as is found in other applications), as well as a very specific command set unique to the operation of the browser, such as the Internet Explorer for example, can be uncovered. Also, the actual navigation involved in the browsing a web page, as in navigating the content, can also be uncovered. The actual methods used in browsing can include buttons and shortcuts including "back", "forward" and "home", as well as elements such as "add page to favorites", "refresh", "find", along with scroll bars, tab bars, etc.

The navigation of web page content can include the use of hyperlinks and/or image maps, as well as text entry fields; and/or the more obscure use of java and its own use of buttons and graphics. Since the content of web pages is ever changing and unpredictable, this situation should probably be approached differently than that of accessing more predictable command sets found within the Internet browser program itself.

First, the most popular hyperlinks found on a web page, that the user is attempting to navigate, are preferably extracted via the source code, for example, and associated a corresponding "F Key" which is found on standard 101 Keyboards. Then a corresponding symbol representing that "F Key" is inserted (via. the source code for example) in front of the actual hypertext link on the page as it is loaded into the browser as a web page.

This method makes use of a separate plug-in or filter. The plug-in extracts the source code of a web page, at the point right before it starts to load, and then scans the source code and cross references it to a pre-determined list of the top 10-100 most commonly found HTML commands.

When a match is found, the hyperlink is then associated with a symbol sequence in the plug-in data base which, only then, is made available (via symbol prediction, for example). After an association is made, another technique can be applied to navigate the web page content.

One such technique is to continue to load the page. When the user passes over the sequenced symbols associated with the hypertext, the associated text from the hypertext link is then displayed within the symbol prediction display area. Thereby, what the sequenced symbols relate to on the web page itself can be displayed. When the use selects this symbol sequence, the command is sent to web browser representing the appropriate command from the hypertext link, usually a link to another page or area on the web site.

Another technique, for example, can be the inserting of a link, into the source code of the found associated hypertext link, into the symbol sequence, which can be found in a separate database consisting of the symbols. This database can reside either locally (on the computer navigating web pages) or remotely from a web resource page. This link can then load the symbols along with the regular source code (that was previously extracted) and the symbols will preferably be displayed along side of the original hypertext link text. Thereby a visual feedback of both the symbol sequences, and correspondence to what actual sequences have been found and associated, from within the database, which are now available for use (via symbol prediction, for example) from within symbol template.

An example of this method is:
Sample snippet of source code as it is retrieved in tact;

```
<tr>
<td width=33% align=center valign=top>
<A HREF="http://home.mindspring.com/~mcgrath3/_wsn/page2.html">
<IMG
SRC="http://home.mindspring.com/clicknbuild/images/user/
english/el_art/painting/link
s.gif" border="0" hspace="0" vspace="0">
</A>
<BR>
<A HREF="http://home.mindspring.com/~mcgrath3/_wsn/
page2.html">New
```

-continued

```
Pictures</A>
<BR>
<P>
</td>
</tr>
```

Source code after match has been found and it has been altered;
Original source code:

```
<tr>
<td width=33% align=center valign=top>
<A HREF="http://home.mindspring.com/~mcgrath3/_wsn/page2.html">
<IMG
SRC="http://home.mindspring.com/clicknbuild/images/user/
english/el_art/painting/link
s.gif" border="0" hspace="0" vspace="0">
</A>
<BR>
```

First symbol text inserted:

```
<IMG SRC="http://home.Symbolicity.com/images/english/
New.gif" border="0" hspace="0" vspace="">
```

Second symbol text inserted:

```
<IMG SRC="http://home.Symbolicity.com/images/
english/ Draftsman.gif"
border="0" hspace="0" vspace="">
<BR>
```

Original source code continued:

```
<A HREF="http://home.mindspring.com/~mcgrath3/_wsn/
page2.html">New
Pictures</A>
<BR>
<P>
</td>
</tr>
```

Source code that is inserted into database and associated with the symbol sequence of "New:Picture" (the "New" symbol and the "Draftsman" symbol), and to be executed when the symbol sequence is chosen:

<A HREF="http://home.mindspring.com/~mcgrath3/_wsn/ page2.html">New Pictures</A>

Thereby, a new hypertext link is produced, preferably including the associated polysemous symbol sequence for visual reference, and also preferably showing which links have been associated. A running database can thus be created associating symbol sequences to actual text links to thereafter execute the hypertext link when the associated symbol sequence is selected. As such, computer network commands: including but not limited to hypertext links, navigation commands for navigating through the internet, world wide web address links, and search engine links; are executed in response to selection of an associated polysemous symbol sequence.

Thus, the methods and situations of the various the preferred embodiments of the present application as discussed with regard to FIGS. 2-13 for example, provide a very comprehensive package for controlling an Internet browser, such as the Microsoft Internet Explorer for example, as well as a system for general network (e.g. internet) navigation. In addition, a list of favorite web sites can also be associated with symbol sequences, as well as lists of favorite search engines associated with symbol sequences, and can be stored in a database in a manner similar to that previously described with regard to FIGS. 2-13 of the present application. Thus, a command to be executed by a computer device in response to receiving selection of an associated polysemous symbol sequence, can correspond to accessing a website via a hypertext link, accessing a favorite website, or even accessing a particular search engine. Accordingly, for the sake of brevity, further description will be omitted.

In addition, by allowing the user to constantly create entries for the database, user customizability is increased. The user can create different symbols, each with their own look and feel, producing various themes. Adding pre-compiled sets of new or upgraded symbols to the template 1030, for example, can change the number of symbols or can add additional rows or columns of symbols. Associated symbol sequences can be added when downloading a set of business links, music, graphic links, etc.

One other approach is to have symbols in the entire program done in a more java-like setting, using a technique involving frames accessed from within the browser at the web page level. A frame can hold the symbol template 1030, and a plug-in for gaining access to the actual program and corresponding operating system, which is normally achieved from the operating system level and not from the web page level, can be downloaded.

In summation, in adapting the symbol sequence association to commands and/or application programs of the present application, to the browser environment, the following steps may be followed: computer commands of the particular computer device can first be listed. Thereafter, these commands can be converted to some type of grammatical structure. Thereafter, a set of symbols (look and number), can be designed to correspond to the resulting command set. Categories and sub-categories can be created and associated with various symbols. Thereafter, the symbol sequences can be stored in association with the various commands/application programs (including computer network commands). Thus, for example, a top 10-100 HTML commands can be listed, and symbol sequences can also be assigned thereto, such that a selection of associated polysemous symbol sequences can enable execution of a particular command and/or a particular HTML link.

With regard to favorite or most common search engine links or other favorite links, these can also be listed. Thereafter, symbol sequences can be stored in association therewith and can be used to enable or execute a link to a favorite website or favorite search engine. A simple program can then be written for interaction between the symbol template and the browser software as well as a program for customizing and associating web links and the most common search engine links. Further, the system can be designed to provide for downloading and upgrading of symbol themes and software changes to deal with other aspects such as dead links, etc.

Additionally, customizability can include changing the behavior of the symbol template or interface 1030 for example, or any other of the templates or interfaces 950 or 130 described in FIGS. 2-13 of the present application, to be either vertical or horizontal; include larger or smaller symbols; include an anchor, floating or moveable template; pop-up/pop-down templates; use of different fonts, different sizes, different colors, etc. Thus, the interface of the present application should not be considered to be limited to that displayed in FIGS. 2-13 and can be varied in many ways.

Additionally, in another preferred embodiment of the present application, symbols of any of the templates or interfaces 1030, 950, 130, etc. of FIGS. 2-13 can be varied to facilitate learning of the association between the symbol sequences and the application programs and commands. This will be explained as follows.

In another preferred embodiment of the present application, symbols of any of the templates or interfaces 1030, 950, 130, etc., FIGS. 2-13 can be varied by displaying a name or a symbol (or both) corresponding to a command or application program associated with a symbol sequence, to help a user learn and associate the symbol sequence with the command or application program. This could be done by activating a type of learning mode, for example, wherein this learning mode could alternately automatically be activated when the device is initially purchased and activated, with the learning mode being able to be disabled after the sequences have been learned and associated with the application programs or commands. For example, when learning the sequence corresponding to the command "page down", after the user selects the "card shuffling" symbol as shown in FIG. 7*a* for example, and prior to selection of the "thumbs down" symbol, the name or symbol (or both) corresponding to this command can be displayed in association with the thumbs down symbol. Accordingly, underneath or above the "thumbs down" symbol, for example, the phrase "page down" could appear. Alternatively, display of the words "page down" could replace the display of the "thumbs down" symbol; the replacement could be temporary wherein the "page down" name and "thumbs down" symbol are alternately displayed; and/or the replacement could be gradual wherein the display essentially morphs between the "page down" name and the "thumbs down" symbol; etc.

Similarly, when learning a category of sequences and corresponding commands or applications, such as the category of "move" commands, a name or a symbol (or both) can be displayed in association with each of a plurality of selectable last symbols in a sequence. Thus, utilizing the "move" commands as an example, upon selecting the "starting flags" (the move symbol and first symbol in move command sequences), the phrase "move down" can be displayed (in any of the aforementioned matters as expressed above regarding the "page down" example) in association with the "thumbs down" symbol (last symbol in a sequence); the "move right" command can be displayed in association with the "right" symbol; the phrase "move left" can be displayed in association with the "left" symbol; and the phrase "move up" can be displayed in association with the "thumbs up" symbol.

Thereafter, once the last symbol and/or name and/or symbol corresponding to the command or application program is selected, one of the application programs or commands is enabled in response to receiving selection of the entire associated polysemous symbol sequence (wherein the displayed name and/or symbol displayed in association with a selectable last symbol in a sequence can be recognized as the last symbol in a sequence when selected, to thereby enable the associated application program or command). Such a system can operate in association with any of the other aspects of the present application as previously discussed, including but not limited to the display of the polysemous symbols as a virtual keyboard, the display of valid symbols and the differentiation of valid symbols from invalid symbols; the highlighting of valid symbols or the darkening of invalid symbols; the enabling of application programs or commands for a mobile telephone, personal digital assistance, personal computer, or any other computer device; etc. As such, an interface is created wherein, prior to selection of a last symbol in a sequence, at least one of a name and a symbol corresponding to at least one of a command in an application program, is displayed in association with the last symbol in a sequence, to thereby facilitate learning of the correspondence between the symbol sequence and the command or application program.

Further, in connection with the PDA example illustrated in FIGS. 2-4 of the present application for example, and in association with the various sequences discussed in conjunction with FIGS. 6-11 of the present application, in a Palm™ system, a single hardwired key or non-polysemous symbol may correspond to a single application program such as the calculator key 14a of FIG. 1 corresponding to the calculator application program of the Palm™ PDA for example. In these situations, in order to facilitate learning of the symbol sequence corresponding to such application programs, the "symbol" of the hardwired key or the symbol of the soft key (such as calculator symbol 22a of FIG. 1 for example) can be displayed in association with the last symbol in a sequence. Thus, after the user selects the "control" symbol and then selects the "control" symbol again, the calculator symbol 22a of FIG. 1 can be displayed in association with the "keypad" symbol, which is the last symbol in the calculator application program sequence in connection with the present application. The calculator symbol can replace the "keypad" symbol; the replacement can be temporary; the replacement can be gradual, etc. As such, the user will be able to associate the calculator function with the "keypad" symbol of the present application. Further, the word "calculator" can alternately be displayed in association with the "keypad" symbol, and/or in association with the calculator symbol itself. Thus, a user can easily associate any of the various hardwired application programs of the Palm™ PDA with the corresponding polysemous symbol sequence of the present application in an efficient manner. Thus, for example, once the "control" symbol is selected twice, each of the calendar, address, to do, memo pad, calculator and find symbols of the Palm™ PDA can replace (for example) each of the respective "left", "globe", "thumbs up", "right", "keypad", "magnifying glass" symbols of the present application (which correspond to last symbols in a sequence for accessing each of the calendar, address, to do, memo pad, calculator and find application programs, respectively).

As such, a method is developed by providing a plurality of polysemous symbols for selection; storing a plurality of sequences of the selectable polysemous symbols, each stored in association with at least one of a command in an application program; and displaying, prior to selection of a last symbol in a sequence, at least one of a name and a symbol corresponding to at least one of a command and an application program, in association with the last symbol in the sequence. This thereby facilitates learning of the symbol sequence corresponding to the command or application program. Again, this can apply to any of the various aspects of the present application as previously discussed in connection with any of FIGS. 2-13 of the present application.

FIG. 14 illustrates another embodiment of the application wherein the application software operations of storing sequences of selectable polysemous symbols in association with application programs and/or commands for execution; and the enabling of the application programs or executing the commands in response to receiving selection of an associated polysemous symbol sequence as discussed in FIGS. 2-13 of the present application, are housed within a single article of manufacture itself. The article of manufacture 800 can include any type of storage element which can be associated and used in conjunction with a computer device 110, such as the PDA shown in FIG. 2 for example, a mobile telephone of FIG. 12 for example, a personal computer of FIG. 13 for example, etc. (and specifically microprocessor 130 therein), including but not limited to a floppy disc, zip drive, memory chip, compact disc, optical disc, magneto-optical disc, etc. The article of manufacture 800 includes code segments for causing a computer device (and more specifically a microprocessor 130 therein) to perform various functions as previously described with regard to FIGS. 2-13 of the present application, and to interact with information stored in memory 133 (which encompasses RAM 132 and ROM 134 and any other type of database or storage for example). A first code segment generally causes the computer device to display a virtual keyboard including a plurality of polysemous symbols; a second code segment causes the computer device to store a plurality of sequences of the display polysemous symbols, each stored in association with an application program or command; and a third code segment causes the computer device to execute a command in response to selection of an associate polysemous symbol sequence.

With regard to the article of manufacture 800, the article of manufacture itself can be a computer useable medium such as any of the storage elements listed above, or can include a computer usable medium containing each of the first, second and third code segments (or other code segments) referred to above. In addition, the article of manufacture 800 can include a fourth code segment for causing the computer device to display the plurality of polysemous symbols within an accessed application program; a fifth code segment for causing the computer device to store a plurality of sequences of the displayed polysemous symbols, each stored in association with a command; and a sixth code segment for causing the computer to execute one of the commands in response to receiving selection of an associated polysemous symbols sequence.

Accordingly, the computer device, method and article of manufacture of the present application as discussed in FIGS. 2-14 of the present application provides symbols for selection; stores symbols sequences in association with application programs and/or commands; and enables application programs or execution of commands in response to a selection of an associated polysemous symbols sequence. The computer device itself, such as that shown in FIGS. 2-14 of the present application, preferably includes a keyboard, including keys associated with a plurality of polysemous symbols, adapted to provide symbol input; a memory, adapted to store a plurality of sequences of the polysemous symbols in association with at least one a program and a command; and a controller adapted to execute at least one of a program and command in response to receiving input of an associated polysemous symbol sequence. The keyboard is preferably a virtual keyboard, and the computer device preferably includes a display, with the keyboard being displayed on the display. Even more preferably, the computer device includes an integrated input and display device with the keyboard being displayed as a virtual keyboard on the integrated input and display device. The displayed keyboard is preferably displayed on less than one-third of the display or less than one-third of the integrated input and display device.

Regarding the specific configuration of the keyboard, the keyboard preferably includes no more than two rows of polysemous symbols, and more preferably includes no more than eighteen polysemous symbols. The various symbols should be chosen so as to represent, in some semantic way, multiple meanings which can be recognized when associated with other symbols in a symbol sequence. Further, regarding the display itself, the display preferably is adapted to also display input polysemous symbols in an area 210 for example, as shown in FIG. 4 for example. Even more preferably, upon inputting a sequence of polysemous symbols matching a storage sequence, the display displays both the polysemous symbol sequence and a name of the associated program or command.

In conjunction with each of the various embodiments of the present application discussed with regard to FIGS. 2-14, it should be noted that selection of the various symbols of the templates 130, 950, and 1030 are not restricted to a stylus or finger input, input through the four-way navigation scroll button 930, or even through input of keyboard keys associated with various ones of the displayed symbols or through the use of a mouse. In view of Applicant's creation of fairly simple symbols with multiple meanings, and creation of a relatively small template of symbols (such as the eighteen or fourteen symbols with regard to FIGS. 2-14), input of the various symbols in various different sequences can be easily achieved utilizing voice recognition technology.

While voice recognition technology is currently used in a word processing environment, such voice recognition technology has problems in dealing with different inflections of the speakers and mainly in dealing with continuous speech or connected prose (namely words or phrases running together). An endless amount of training is normally needed for these systems and accuracy is not always reflected in the effort applied. Multiple users creates problems, as does use in a noisy environment.

However, utilizing semantically connected symbol sequences to enable application program, execute commands, or enable various functions connected with Internet use, only a finite number of words (one or two corresponding to each symbol) need be spoken by user and recognized by the voice recognition device/software. Assuming that the sequences include two or three symbols, any user need merely utter a simple command from two to six words to provide selection of the various symbols in a symbol sequence via voice recognition technology to eventually enable an application program, execute a command, execute a function related to the Internet, etc. As such, extensive training will not be necessary and errors will be reduced considerably. Such a methodology can easily be applied to existing speech recognition technology, such as that discussed in U.S. Pat. No. 6,192,343, the entire contents of which are hereby incorporated by reference.

Accordingly, Applicant's simple template, while providing for a way to easily access and execute programs and commands utilizing a minimal amount of screen space and device, can also provide for an extremely efficient and accurate use of voice recognition technology. The plurality of polysemous symbols are stored for selection via voice input, with each symbol being stored in memory in association with a single name (such as "globe" for the world symbol, "money" for the dollars and coins symbol, etc.). Then, a plurality of sequences of selectable polysemous symbols are stored in memory, each stored in association with at least one of an application program and a command. Thereafter, in response to receiving voice input selection of names of an associated sequence of polysemous symbols, an associated one of the applications or commands is enabled. Optionally, the symbols can be displayed in sequence, in response to its associated name being selected via voice input. The associated commands and/or programs can include any of those discussed previously with regard to FIGS. 2-14. Further, other aspects of the present invention as discussed with regard to FIGS. 2-14, including displaying symbols as a virtual keyboard, differentiating valid symbols, etc. are encompassed herein.

Thus, utilizing this voice recognition technology, each of the various optional functions previously addressed with regard to the present application equally applies. The technology can be applied to enable application programs or commands of any type of computer device such as a mobile telephone, personal digital assistant, personal computer, etc. For example, such a computer device includes a memory, adapted to store a plurality of polysemous symbols for selection via voice input, each symbol being stored in association with a name, and adapted to store a plurality of sequences of the selectable polysemous symbols, each sequence stored in association with at least one of a program and a command; and a controller, adapted to execute at least one of a program and command in response to receiving voice input selection of names of symbols of an associated polysemous symbol sequence.

Further, other optional aspects of the present application, discussed with regard to FIGS. 2-14, can apply. For example, symbol prediction technology can be used where valid symbols remain highlighted and/or invalid symbols are darkened, so as to differentiate valid symbols from invalid symbols in the symbol sequence based upon an initial symbol in the sequence to be selected, or based upon a previously selected symbol. Further, utilizing voice recognition technology, display of the entire template could be avoided all together to thereby maximize the available amount of screen display space. This could be particularly important in the PDA or mobile telephone environments wherein display space is a premium. In such an environment, the symbols could merely be memorized by a user or prepared on a separate sheet of paper or card, and then the symbols could be displayed, for example in sequence, once they have been selected by a user's voice recognition command. Accordingly, additional functionality could be added to the present application when utilizing voice recognition technology.

In another preferred embodiment of the preferred application, symbols could be sequenced which are not necessarily polysemous in nature. For example, a template of a plurality of single meaning symbols could be created, wherein each single meaning symbol provides access to a plurality of other meaning symbols to essentially execute or enable an application program or command when two or more symbols are selected.

Figure 15A:
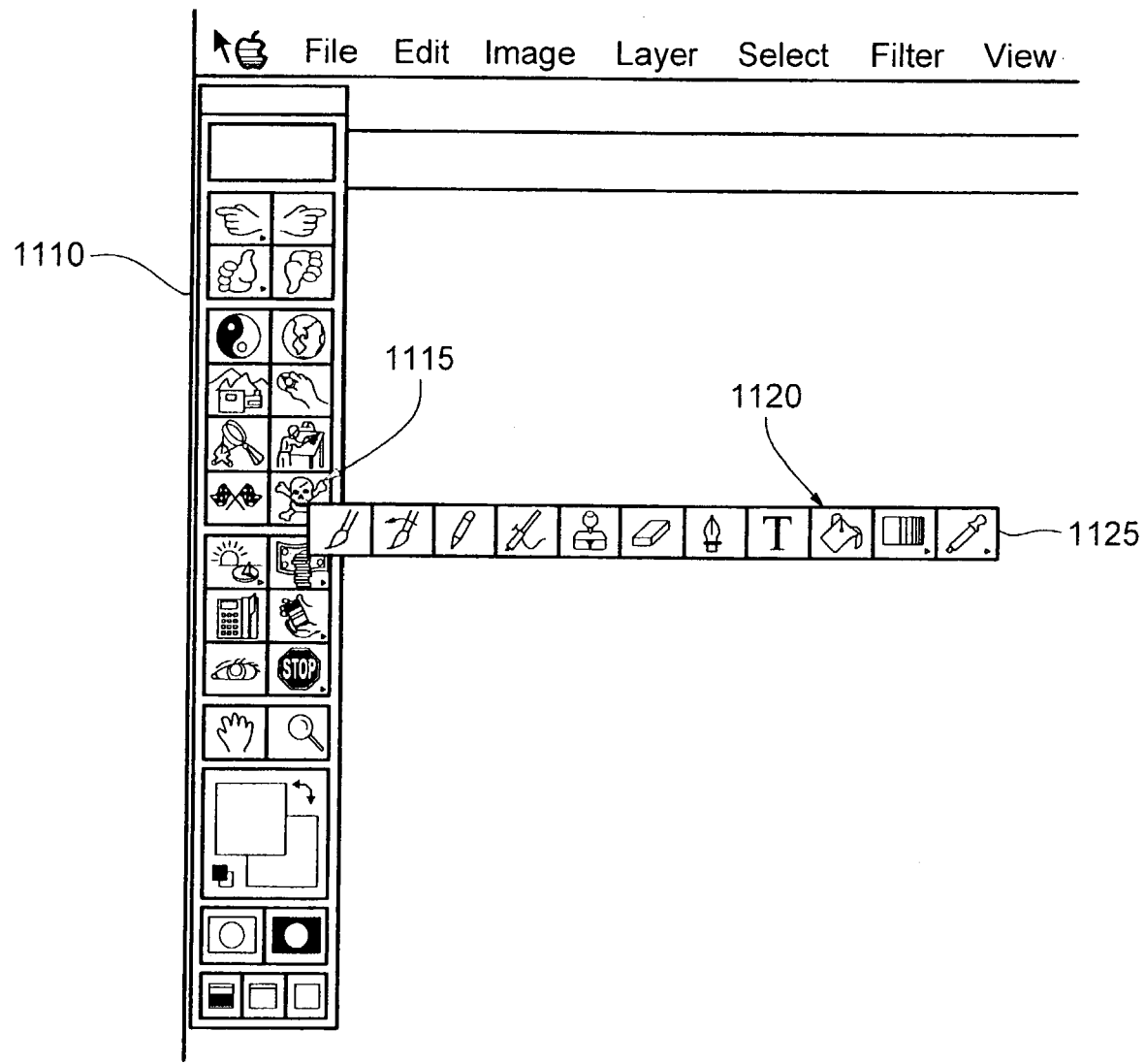
FIGS. 15a-15d illustrate an application of sequenced single meaning symbols.

One example of this use of sequenced single meaning symbols is shown in FIG. 15*a* of the present application. Here, an initial template of symbols, each essentially assigned only a single meaning, can be displayed. For exemplary purposes only, this is shown as template 110, including various ones of the symbols utilized in connection with the present application, wherein these symbols are only associated with a single meaning in this embodiment. For example, a skull symbol 1115 can be associated with a single meaning "delete", wherein selection of the skull symbol results in the display of another template of single meaning symbols. When the "paintfill" symbol 1120 is selected, this forms a symbol sequence which is stored in association with a command "delete paintfill". Thus, when the symbol sequence is completed, the command "delete paintfill" is executed in response to receiving selection of the associated symbol sequence.

In addition, not all of the symbols of the template need be displayed. For example, when the "delete" (skull) symbol is first selected, the ten most popular symbols for completing a symbol sequence can be displayed. If a user does not want to select one of these ten most popular symbols, he could then hit a symbol connected at the end of the new template being displayed, thereby providing access to additional less popular symbols which could create additional less popular symbol sequences.

Still further, it should be noted that the use of sequenced single meaning symbols is not limited to just two symbol sequences, and could involve sequences of three or more symbols. In such a case, if one symbol is selected, a toolbar of new symbols 1125 can be displayed as shown in FIG. 15a. Thereafter, if some of those symbols correspond to second symbols in a three symbol sequence, and upon one of those symbols being selected, another drop down toolbar (not shown) could be displayed with a plurality of single meaning symbols which each complete a three symbol sequence.

Figure 15B:
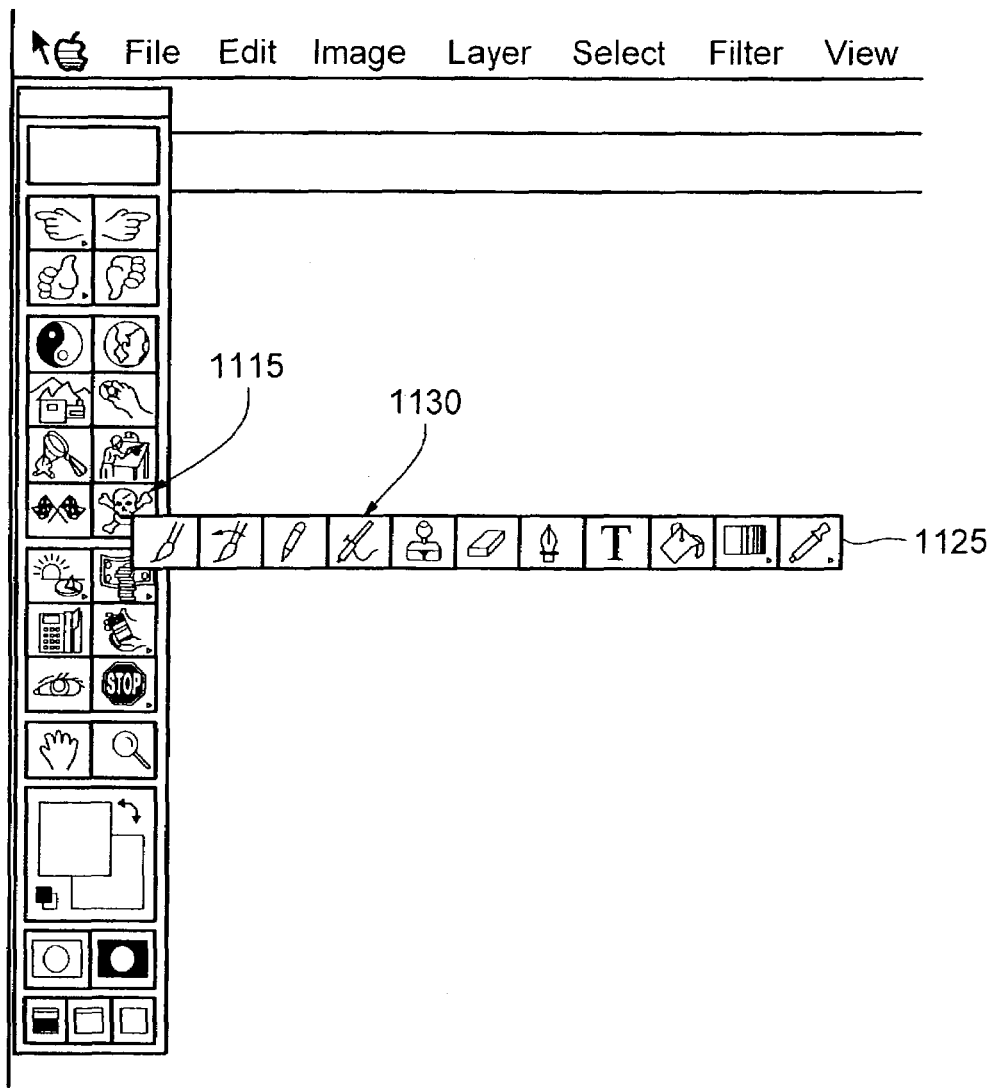

FIG. 15b provides another illustration wherein the delete symbol 1115 is first selected, and thereafter a toolbar 1125 is displayed, from which symbol 1130 corresponding to spray painting is selected. At this point, the spray painting that was previously done, will be undone based upon such a command being associated with the single meaning sequence of the "delete"+"spray paint" symbols.

Figure 15C:
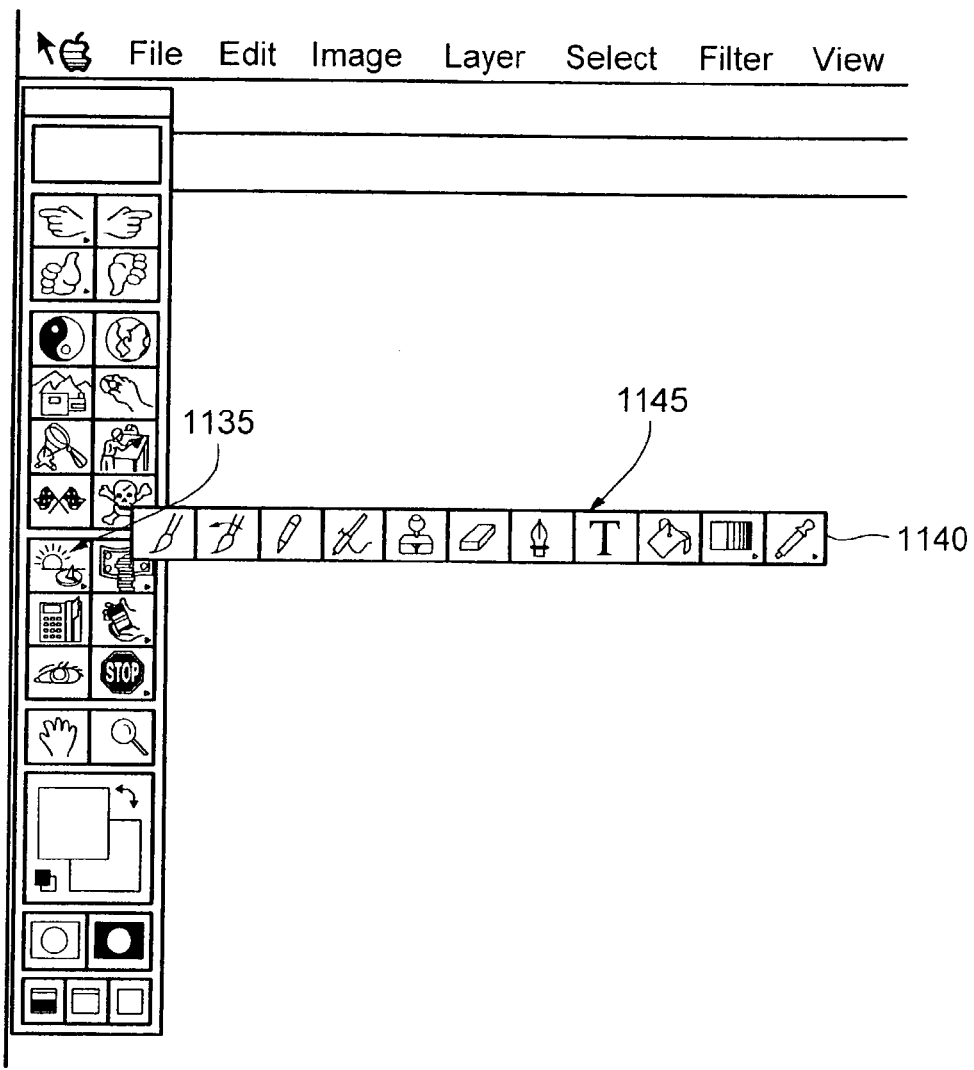

FIG. 15c shows another example of the use of these single meaning symbols being sequenced together. In this example, the "sun" symbol is associated with the category "new" (its single meaning). When selected, another toolbar 1140 is then displayed, corresponding to single meaning symbols which could continue or could complete a symbol sequence. Thereafter, if the text symbol 1145 is selected, the command "new text" is executed based upon the symbol sequence "sun"+ "text" being stored in association with the command "new text". It should be noted that the same additional template of symbols 1140 and 1125 can be used for multiple sequences and can be displayed in response to selection of different category or first symbols, and can be used to execute different commands when sequenced with different first "category" symbols. Alternatively, a different template of symbols can be displayed in response to selection of some or all of the first "category" symbols.

Figure 15D:
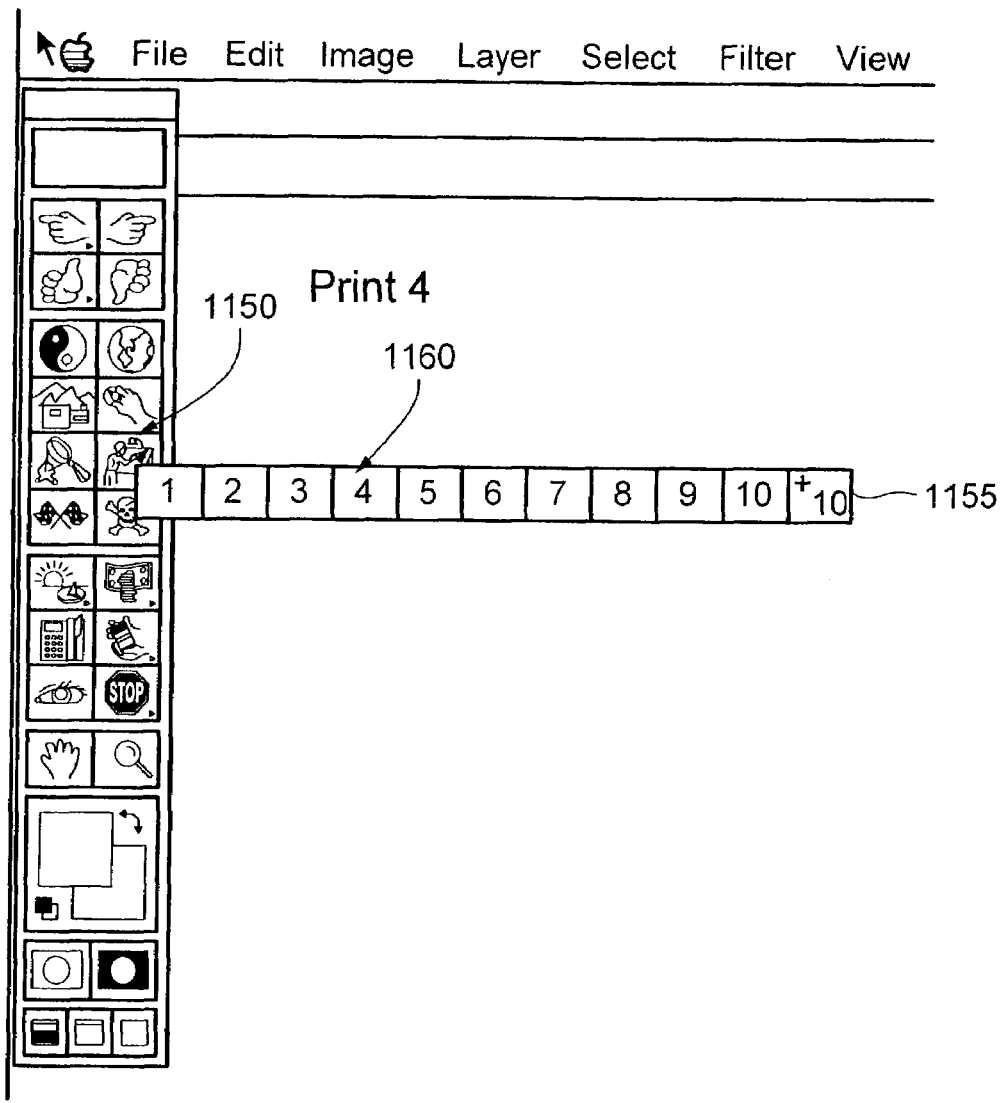

Finally, FIG. 15d has been provided in an exemplary format, illustrating symbols which are numerical in nature, for example. Thus, when the print key 1150 is initially selected, numbers 1-10 or even 10+ in a template 1155 can be displayed. By selecting the number 4, (element 1160 in FIG. 15d), the symbol sequence "print"+"4" is selected and the command "print four copies" will then be executed in response thereto. Thus, by sequencing these two single meaning symbols, the ability to print four copies of a document can easily be executed.

Accordingly, in this preferred embodiment of the present application, a first plurality of symbols, such as template 1110 for example, is provided for selection; a plurality of sequences including the selectable symbols and additional symbols are stored, each stored in association with a command; a second set of symbols is displayed for selection in response to selection of a symbol of the first set, such as templates 1125 or 1155 for example; and a command is executed, such as "new text" of FIG. 15c for example, in response to receiving selection of a second symbol completing an associated stored symbol sequence.

Another preferred embodiment, usable in conjunction with various ones of the other preferred embodiments of FIGS. 2-15 or taken alone, is directed to a device and method which, for example, can be used in everyday use, if desired; and/or can aid in training a user how to quickly access appropriate symbol sequences corresponding to desired messages, application programs, commands, etc. Such a device and method, in one embodiment, includes pre-selecting a symbol of at least two symbol sequences (as a first symbol or part of a sequence including one or more selected symbols) and providing feedback (including at least one of visual and audio feedback for example) corresponding to a category or theme related to at least two symbol sequences including the pre-selected symbol and any selected symbol, in sequence; or corresponding to a message stored in association with the pre-selected symbol or symbol sequence including at least one selected symbol(s) and the pre-selected symbol. This is will be referred to hereinafter as, for example, Symbol preview. As such, when such symbol sequences and associated messages and/or applications programs, commands, etc. may be utilized in conjunction with a computer device including but not limited to a PDA, mobile phone, personal computer, etc., wherein the user may be a beginner, occasional user, etc., the user can easily determine a desired category or theme using Symbol preview, relating to the desired message and/or associated application program, command, etc. to be output. Thus, the user can quickly and easily find and access, and eventually learn, the symbol sequence necessary to output the message and/or associated application program, command, etc. An exemplary description is as follows.

Initially, before discussing Symbol preview in more detail, symbol prediction will be discussed, as the various examples of Symbol preview discussed hereafter also include symbol prediction. However, it should be understood that symbol preview is preferably, but need not be and is not in any way limited use in conjunction with symbol prediction. In symbol prediction, when the system is initially activated, only valid symbols of the virtual keyboard, in the case of a touch panel display for example, are displayed for activation or selection on the screen. Symbol prediction is described in detail in each of U.S. Pat. Nos. 5,297,041 and 5,097,425, the entire contents of each of which are incorporated by reference. Symbol prediction basically operates as follows.

Prior to selecting a symbol, all valid first symbols, corresponding to a first symbol in at least one stored symbol sequence, are "available" for selection and are displayed in a manner which differentiates them from those symbols that are not first symbols of a valid sequence; after selection of a first symbol, all valid second symbols corresponding to a second symbol in at least one stored sequence including the selected first symbol, are made "available" for selection and are displayed in a manner which differentiates them from those symbols that are not second symbols of a valid sequence; after selection of a second symbol, all valid third symbols corresponding to a third symbol in at least one stored sequence including the selected first and second symbols, are made "available" for selection and are displayed in a manner which differentiates them from those symbols that are not third symbols of a valid sequence; etc. The differentiation may include, but is not limited to highlighting valid symbols, darkening or graying out invalid symbols, a combination of both, or any other way of differentiating between valid and invalid symbols.

Thus, when a user selects a valid available symbol, the system uses symbol prediction to determine which other symbols are valid second choices associated with that symbol as part of a valid symbol sequence. When the user selects a second available symbol, the system uses symbol prediction to determine which symbols are valid third choices associated with the two-symbol sequence selected and makes them available for selection. When the user selects a third valid symbol to complete the sequence, the message, application program, command, etc. that is associated with that complete three-symbol sequence is processed and the system may automatically reset itself to its default state.

Symbol prediction can be used in conjunction with symbol preview to de-select a symbol as follows. When an incorrect or unwanted symbol is inadvertently selected, the system may be set up to permit the user to, for example, select any invalid or unavailable symbol to reset the system back to its default state (or to its previous state), which is the same state at which it starts up. If the user has selected the first symbol in a sequence and determines that it is not the symbol desired for selection, then the user may select any unavailable key to reset the system, for example. If the user has already selected the first symbol in a sequence and continues to select a second valid symbol that is not the symbol desired, then the user may select any invalid symbol to reset the system, thereby negating both the first and second selections. If the user has already selected the first and second symbols in a valid sequence and continues to select a third valid symbol which then processes the message associated with the complete symbol sequence, then the system may automatically reset itself as intended, and the user may then select the sequence for "delete last sequence" or "delete last word", for example, in order to negate the completed sequence and its associated message.

The Symbol Preview methodology includes, in a system for providing a message, application program, command, etc. in response to the selection of an associated symbol sequence, pre-selecting (via highlighting, holding a corresponding key or mouse button down without releasing the button, etc.) a symbol which is a first symbol of at least two symbol sequences; and then providing feedback (via audible or visual display, for example) corresponding to a category related to the at least two symbol sequences (stored in a database, look-up table, etc. for example, in association with the one pre-selected symbol). Such a database of associated symbols and categories can be, for example, the same or a separate database from the associated message/symbol sequence database; and can be accessed, for example, based upon symbol being pre-selected, buffered, and used to access a corresponding category in a database.

Therefore, when such a "category" symbol is pre-selected, the user will view, hear, etc. the related information category and as such, will know whether or not to actually select that symbol as a first symbol in a desired sequence. For example, the user can pre-select the "EYE" symbol and the category "interactive communication" can be accessed and displayed (or otherwise fed back to the user). As such, if the user desires a message relating to an interactive communication such as a greeting ("hello", "what's up", "Hey! How's it going?"), a parting or sign-off ("goodbye", "see you later", "be right back"), etc., then the user can select the "EYE" symbol as the first symbol in the sequence. The user can thus begin to associate the EYE symbol with interactive communications and thus can be trained to learn interactive communication sequences, or can still enter a desired interactive communication sequence based on the feedback received, even if the user is an infrequent user of the device (PDA, mobile phone, computer device, etc.) and thus cannot remember the desired sequences.

In addition or in alternative thereto (or as a way of using Symbol Preview without displaying the "category", i.e. skipping such a step), Symbol Preview can be used to display two (or more) sequenced symbol "themes". For example, a first symbol in a sequence can be selected and then a second symbol can be pre-selected, corresponding to a next symbol in at least two symbol sequences (corresponding to at least two symbol sequences including the selected symbol as a first symbol and the pre-selected symbol as a second or "next" symbol in each of the at least two sequences). In response to the pre-selection of the second symbol, feedback can be provided corresponding to a "theme" related to the at least two related symbol sequences (stored in a look-up table or database, for example, in association with the two symbol sequence including the selected symbol as a first symbol and the pre-selected symbol as a second symbol). Such a database of associated symbol sequences and themes can be, for example, the same or a separate database from the associated message/symbol sequence database; and can be accessed, for example, based upon symbol being pre-selected, buffered with a previously selected symbol to form a sequence, and used to access a corresponding theme in a database.

For example, the user can select the "EYE" symbol and then pre-select the "FLAGS" symbol, and the theme "greetings" can be displayed. Further, if the EYE symbol is pre-selected and the "STOP SIGN" symbol is pre-selected, then the theme "partings" or "sign-offs" can be accessed and displayed or otherwise fed back to the user. Thus, in conjunction with the feedback of a "category", or taken alone, the feedback of a theme can aid the user in beginning to associate the EYE and FLAGS symbol sequence with "greetings" and thus can aid in training the user to learn three or more symbol "greetings" sequences. Alternatively or in addition thereto, the user can easily be lead (spoon fed) through the process of entering a desired "greeting" sequence based on the feedback received, even if the user is an infrequent user of the device (PDA, mobile phone, computer device, etc.) and thus cannot remember the desired sequences.

Finally, in addition to or as an alternative to that expressed above, Symbol Preview can be used to provide feedback in the form of an actual stored message itself. For example, a first and second symbol in a sequence can be selected and then a third symbol can be pre-selected, corresponding to a last symbol in a three symbol sequence, for example. In response to the pre-selection of the third symbol, feedback can be provided corresponding to the actual message associated with the three symbol sequence (stored in a look-up table or database, for example, including the selected symbols as first and second symbols and the pre-selected symbol as a third and last symbol in a sequence). Such a database of associated symbol sequences (including two elected symbols and a pre-selected symbol) and messages can be, for example, the same or a separate database from the associated message/symbol sequence (of three selected symbols, for example) database; and can be accessed, for example, based upon symbol being pre-selected, buffered with previously selected symbols to form a sequence, and used to access a corresponding message in a database.

For example, the user can select the "EYE" and then the "FLAGS" symbol, and then pre-select the "FLAGS" symbol. In response thereto, the stored message of "Hello" (stored in association with the symbol sequence of "EYE", "FLAGS", "FLAGS") can be displayed. Thus, if the user wants to output the message of "Hello", the user can select the "FLAGS" symbol, completing the sequence, and outputting the associated message. Further, if the message "Hello" is not desired, the user can pre-select a different symbol, such as the "THUMBS UP" symbol, to provide feedback corresponding to a different stored message "What's up?".

Thus, in conjunction with this message feedback taken alone, or in conjunction with the feedback of a category and/or a theme, the user can thus begin to associate the EYE, FLAGS, FLAGS symbol sequence with "Hello", for example. The user can be trained to learn three or more symbol sequences; or the user can still easily be lead (spoon fed) through the process of searching for a desired sequence based on the feedback received, even if the user is an infrequent user of the device (PDA, mobile phone, computer device, etc.) and thus cannot remember the desired sequences. Of course, it should be understood that such use of Symbol Preview to display a message is not limited to display of messages associated with three symbol sequences (based upon selection of two symbols and pre-selection of a third symbol), but may be used in conjunction with messages associated with more than three symbols (selection of other symbols and pre-selection of a last symbol), messages associated with two symbol (selection of one symbol and pre-selection of a next symbol), and messages associated with only one symbol (upon pre-selection of the one symbol).

It should be understood that symbol preview of the actual stored message, and/or any of symbol preview for categories or themes, can be turned on or off as a mode or option. Thus, they can be used separately or in any combination thereof.

With regard to the categories, themes and messages discussed previously, these are merely exemplary and should not be considered limitative of the various embodiments of the invention. Further, the use of the words "category", "theme", "message" should not be considered limitative of the embodiments of the invention as these are merely identifiers used for description purposes. To further illustrate, in an exemplary format, other examples of symbol sequences and associated categories, themes, and messages, a table is provided hereafter. The table includes, but is not limited to, three types of messages stored in association with each sequence. The table may be stored in a memory such as ROM 134 of FIG. 2 for example, in the manner previously described regarding FIG. 2; further it can be stored any similar memory of a mobile phone of FIG. 12, of a computer of FIG. 13, etc.; but it is not limited thereto. It can be stored in any manner known to one of ordinary skill in the art, wherein an associated message can be accessed via input of a corresponding associated symbol sequence.

With three type of messages stored in association with a sequence, a user can, if desired, select one type of message to be used including normal, formal, and spicy. Selection of a type of message can be done by any known method including an initial selection of all types of messages desired; a selection of message type on a message by message basis; a key input; the use of a preliminary symbol (prior to inputting the rest of the symbol sequence) to indicate either normal, formal or spicy).

In one embodiment, the first set of messages stored in association with the symbol sequences (normal) correspond to the regular or default mode, where no further selection need made. Thus, if a symbol sequence is entered and no other action is taken, the "normal" message will be output. To access the other stored messages, the normal mode can be switched to the formal mode by selecting the "TOPHAT" (Formal) symbol, for example; or switched to the spicy mode by selecting the "SPICY" symbol, for example. Thus, when the TOPHAT symbol is selected, and a symbol sequence is then selected, the formal message stored in association with the sequence will be output. The database used to store the associated symbol sequences and multiple associated messages may be a multi-item database, accessible by a modifier button or without the modifier button, for example.

Alternatively, instead of initially selecting another symbol such as the TOPHAT symbol, for example, there may be a learning mode, a tutorial mode, an event driven mode, etc. to provide access to the different messages for display in Icon Preview. Any type of mode selection can be applied.

Further, the table listed below is merely exemplary, both in content and in format. There may be more or less than three messages (commands, computer applications) stored in association with each sequence (there may be only one message, or example, or there may be more than three). Also, there need not be the same number of messages stored in association with each sequence as the system my merely default to the normal mode message if a formal or spicy message is not present, for example). Still further, the list below is not fully inclusive of all sequences or messages and is only exemplary. Any number of symbols, categories, themes, and/or messages can be changed and programmed into the device in any manner (noting that the symbols may also be varied, as desired, when creating a device). The list includes, for example, categories (roman numerals), themes (letters), messages (numbers) and symbols/sequences corresponding thereto.

|   |   | Normal | Formal | Spicy | Symbol(s) |
|---|---|---|---|---|---|
| I. |   | Category - INTER-ACTIVE COMMUNICATION |   |   | EYE |
| A. |   | Theme - Greetings: |   |   | Eye/Flags |
|   | 1. | Hello | Good day to you | Yo! | Flags |
|   | 2. | Back at keypad | I have returned | Back at ya! | Keypad |
|   | 3. | What's up? | What news have you? | 's up? | Up |
|   | 4. | Hey! How's it going? | How do you do? | How's it hangin'? | Magnify |
|   | 5. | User defined | User defined | User defined | User defined |
| B. |   | Theme - Signoffs: |   |   | Eye/Stop |
|   | 1. | Goodbye | Ta-Ta! | Kiss Kiss! | Stop |
|   | 2. | Away from keypad | I am indisposed. | Hold your position. | Keypad |
|   | 3. | See you later | Parting is such sweet sorrow. | Later, baby | Skull |
|   | 4. | Be right back | I shall return. | Keep your pants on. | Right |
|   | 5. | User defined | User defined | User defined | User defined |
| C. |   | Theme - Politeness: |   |   | Eye/Right |
|   | 1. | Thank you | Oh, thank you so much. | 'preciate it. | Money |
|   | 2. | You're welcome | You are most welcome, I'm sure. | Don't mention it. | Globe |
|   | 3. | Please | I beg of you. | Paaaleeze! | Up |
|   | 4. | Excuse me | Please accept my humble apology. | I'm on my knees. | Down |
|   | 5. | User defined | User defined | User defined | User defined |
| D. |   | Theme -Criticize: |   |   | Eye/Down |
|   | 1. | Shut up! | Please bring your lips together and hum! | Shut your trap! | File |
|   | 2. | Don't talk to me | I'm not available for conversation at this time | Sit on it | Skull |

-continued

| | | Normal | Formal | Spicy | Symbol(s) |
|---|---|---|---|---|---|
| | | 3. Stop it! | Cease and desist! | Lose it | Stop |
| | | 4. User defined | User defined | User defined | User defined |
| E. | | Theme -Flirt: | | | Eye/Left |
| | | 1. You look good today | Oh, I say, you are most pleasing to the eye. | Lookin' good! | Eye |
| | | 2. Hug(s) | A fond embrace | Squeeze ya! | Yin-Yang |
| | | 3. Kiss(es) | A peck on the cheek to one well deserving | A wet one | Flags |
| | | 4. User defined | User defined | User defined | User defined |
| F. | | Theme -Praising: | | | Eye/Up |
| | | 1. Way to go | Very good, old chap | I love it! | Globe |
| | | 2. Sweet | Well done, indeed | Schweeeet! | Money |
| | | 3. Tight | Most excellent | Bad to da bone | Right |
| | | 4. User defined | User defined | User defined | User defined |
| G. | | Theme -Personal information: | | | Eye/File |
| | | 1. Age, sex, location? | Age, sex, location? | Age, sex, location? | Globe |
| | | 2. Name | Name | Name | User Defined |
| | | 3. Male | Male | Male | Draftsman |
| | | 4. Female | Female | Female | Eye |
| | | 5. City | City | City | File |
| | | 6. User defined | User defined | User defined | User defined |
| H. | | Theme -Basic responses: | | | Eye/Eye |
| | | 1. Yes | Why, certainly | Heck yes! | Up |
| | | 2. No | Out of the question | Heck no! | Down |
| | | 3. Okay | Okay | Sure thing. | Yin-Yang |
| | | 4. Pretty good | Not bad. | Hot dam! | Eye |
| | | 5. Alright | Alright | Alright | Right |
| | | 6. User defined | User defined | User defined | User defined |
| II. | | Category - TIME & QUESTIONS | | | SUNDIAL |
| A. | | Theme -Days of the Week: | | | Sundial/Money |
| | | 1. Monday | | | Draftsman |
| | | 2. Tuesday | | | Money |
| | | 3. Wednesday | | | Cards |
| | | 4. Thursday | | | Keypad |
| | | 5. Friday | | | Control |
| | | 6. Saturday | | | Skull |
| | | 7. Sunday | | | Stop |
| | | 8. Last | | | Left |
| | | 9. Next | | | Right |
| B. | | Theme -Clock Time: | | | Sundial/Sundial |
| | | 1. Second(s) | | | File |
| | | 2. Minute(s) | | | Magnify |
| | | 3. Hour(s) | | | Flags |
| | | 4. Day(s) | | | Yin-Yang |
| | | 5. o'clock | | | Sundial |
| | | 7. User defined | User defined | User defined | User defined |
| C. | | Theme -When going out: | | | Sundial/File |
| | | 1. Who's included? | Who may, per chance, join us? | Who's on the "A" list? | Draftsman |
| | | 2. What are we going to do? | What might be the agenda? | What's 'da plan? | Money |
| | | 3. When do you mean? | When is tea time? | When's it happenin'? | Sundial |
| | | 4. Where, exactly? | Where is the rendezvous? | Your place or mine? | Globe |
| | | 5. Which car? | Which chauffeur? | Which ride? | Flags |
| | | 6. User defined | User defined | User defined | User defined |
| III. | | Category - PEOPLE | | | DRAFTSMAN |
| A. | | Theme -Business people: | | | Draftsman/File |
| | | 1. Boss | Commander in Chief | Head Honcho | Skull |
| | | 2. User defined | User defined | User defined | User defined |
| B. | | Theme -Personal friends: | | | Draftman/Eye |
| | | 1. User defined | User defined | User defined | User defined |
| C. | | Theme -Family members: | | | Draftsman/Magnify |
| | | 1. Mom | Mother dearest | The old lady | Yin-Yang |
| | | 2. Dad | Father dearest | The old man | Draftsman |
| | | 3. User defined | User defined | User defined | User defined |
| IV. | | Category - PLACES | | | GLOBE |
| A. | | Theme -Local Places: | | | Globe/Magnify |
| | | 1. Home | Humble abode | Pad | Magnify |
| | | 2. School | Place of higher learning | Snake pit | File |
| | | 3. Just out | Just out | Just out | Money |
| | | 4. The Game | The Game | The Game | Flags |
| | | 5. Work | Work | Sweatshop | Draftsman |
| | | 6. User defined | User defined | User defined | User defined |
| B. | | Theme -Distant Places (cities, countries): | | | Globe/Eye |
| | | 1. User defined | User defined | User defined | User defined |
| V. | | Category - THINGS/DOING THINGS | | | CARDS |
| A. | | Theme -Personal things: | | | Cards/Draftsman |
| | | 1. User defined | User defined | User defined | User defined |

-continued

| | Normal | Formal | Spicy | Symbol(s) |
|---|---|---|---|---|
| B. | Theme -User defined things: | | | Cards/Eye |
| | 1. User defined | User defined | User defined | User defined |
| C. | Theme -Any | | | Cards/Magnify |
| | 1. anybody | | | File |
| | 2. anyone | | | Magnify |
| | 3. anything | | | Flags |
| | 4. anyway | | | Yin-Yang |
| | 5. anytime | | | Sundial |
| | 6. anywhere | | | Globe |
| D. | Theme -Every | | | Cards/Skull |
| | 1. everybody | | | File |
| | 2. everyone | | | Magnify |
| | 3. everything | | | Flags |
| | 4. every way | | | Yin-Yang |
| | 5. every time | | | Sundial |
| | 6. everywhere | | | Globe |
| E. | Theme -Some | | | Cards/File |
| | 1. somebody | | | File |
| | 2. someone | | | Magnify |
| | 3. something | | | Flags |
| | 4. someway | | | Yin-Yang |
| | 5. sometime | | | Sundial |
| | 6. somewhere | | | Globe |
| F. | Theme -No | | | Cards/Yin-Yang |
| | 1. nobody | | | File |
| | 2. no one | | | Magnify |
| | 3. nothing | | | Flags |
| | 4. no way | | | Yin-Yang |
| | 5. no time | | | Sundial |
| | 6. nowhere | | | Globe |
| G. | Theme -let's | | | Cards/Flags |
| | 1. let's go | | | Flags |
| | 2. let's come | | | Magnify |
| | 3. let's meet | | | Yin-Yang |
| | 4. let's eat | | | Skull |
| | 5. let's see | | | Eye |
| | 6. let's talk | | | Keypad |
| | 7. let's buy | | | Money |
| H. | Theme -want to | | | Cards/Money |
| | 1. want to go | | | Flags |
| | 2. want to come | | | Magnify |
| | 3. want to meet | | | Yin-Yang |
| | 4. want to eat | | | Skull |
| | 5. want to see | | | Eye |
| | 6. want to talk | | | Keypad |
| | 7. want to buy | | | Money |
| I. | Theme -can you | | | Cards/Cards |
| | 1. can you go | | | Flags |
| | 2. can you come | | | Magnify |
| | 3. can you meet | | | Yin-Yang |
| | 4. can you eat | | | Skull |
| | 5. can you see | | | Eye |
| | 6. can you talk | | | Keypad |
| | 7. can you buy | | | Money |
| J. | Theme -gotta | | | Cards/Up |
| | 1. gotta go | | | Flags |
| | 2. gotta come | | | Magnify |
| | 3. gotta meet | | | Yin-Yang |
| | 4. gotta eat | | | Skull |
| | 5. gotta see | | | Eye |
| | 6. gotta talk | | | Keypad |
| | 7. gotta buy | | | Money |
| K. | Theme -did | | | Cards/Control |
| | 1. did go | | | Flags |
| | 2. did come | | | Magnify |
| | 3. did meet | | | Yin-Yang |
| | 4. did eat | | | Skull |
| | 5. did see | | | Eye |
| | 6. did talk | | | Keypad |
| | 7. did buy | | | Money |
| L. | Theme -Negatives: | | | Cards/Down |
| | 1. let's not | | | Flags |
| | 2. don't wanna | | | Money |
| | 3. can't | | | Cards |
| | 4. don't gotta | | | Up |
| | 5. didn't | | | Control |

-continued

| | | Normal | Formal | Spicy | Symbol(s) |
|---|---|---|---|---|---|
| VI. | | Category - EMOTIONS | | | YIN-YANG |
| A. | | Theme -Happy: | | | Yin-Yang/Up |
| | 1. | Feeling happy | Just elated | Feelin' groovy | Up |
| | 2. | Laughing out loud | Guffaws and chuckles | What a gas! | Skull |
| | 3. | User defined | User defined | User defined | User defined |
| B. | | Theme -Sad: | | | Yin-Yang/Down |
| | 1. | Feeling sad | Sooo dispirited | Bummed out | Down |
| | 2. | Crying out loud | Weeping and wailing | Tears on my pillow | Eye |
| | 3. | User defined | User defined | User defined | User defined |
| VII. | | Category - LINKS | | | FLAGS |
| A. | | Theme -Linking words: | | | Flags/Flags |
| | 1. | and | | | Flags |
| | 2. | but | | | Draftsman |
| | 3. | or | | | Yin-Yang |
| | 4. | User defined | | | User defined |
| B. | | Theme -Time & place links: | | | Flags/Sundial |
| | 1. | before | | | Left |
| | 2. | after | | | Right |
| | 3. | here | | | Down |
| | 4. | there | | | Up |
| | 5. | User defined | | | User defined |
| C. | | Theme -Personal Favorites | | | Flags/Draftsman |
| | 1. | Harry Potter | | | Skull |
| | 2. | User defined | | | User defined |

Figure 16:
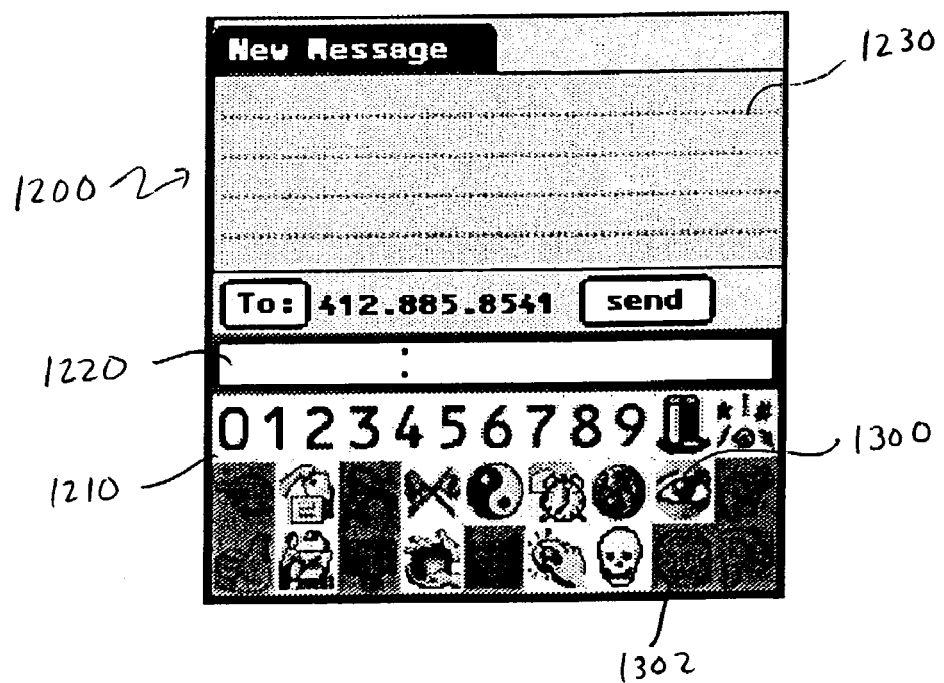
FIG. 16 illustrates an example of a generic computer device with a default sample system startup including symbol prediction.

An example of Symbol Preview, in operation, is as follows. An exemplary display 1200 (such s a touch screen, for example) is shown in FIG. 16, wherein the display can be arranged to display text and/or graphics and can be a display of any computer and electronic device contemplated throughout the present application, including but not limited to portable digital assistants (PDAs), mobile telephones, personal computers, etc. The display may include, for example, an input portion 1210 including various symbols (and possibly numbers 0-9 as well); a dedicated input tray 1220 for displaying pre-selected and/or selected symbols and corresponding feedback information such as categories, themes, messages; and a message portion or text field 1230 for displaying messages corresponding to selected symbol sequences. Of course, it should be understood that the feedback can be provided in any way, audibly and/or visually, and that the display can be arranged in any manner desired to display all or part of the information. In addition, the virtual keyboard can be located on any portion of the display and/or on a separate display portion.

When the system/device is started or turned on, the symbols may be displayed as a virtual keyboard 1210 on a display screen 1200, wherein symbol prediction is preferably used to differentiate symbols that are valid first symbols of stored symbol sequences from invalid symbols. This is shown in virtual keyboard 1210, wherein the invalid symbols are grayed out, for illustrative purposes, as being unavailable for sequence selection. As examples:

The "EYE" symbol 1300 is an example of a valid available symbol and the "STOP SIGN" symbol 1302 is an example of an invalid unavailable symbol.

Figure 17:
FIG. 17 illustrates an example of the generic computer device including symbol prediction.

If desired, the Symbol Preview function can be enabled and disabled. When the first symbol of a valid symbol sequence is pre-selected by being clicked and held down (for example) without Symbol Preview enabled, the symbol may include a selection box around it, but no preview text will be displayed either in the text field 1230 or the dedicated input tray 1220 as shown in FIG. 17.

Figure 18:
FIG. 18 illustrates an example of a selected symbol.
Figure 19:
FIG. 19 illustrates an example of symbol preview.

Then when the symbol is selected by lifting the mouse or pointer up for example, as shown in FIG. 18, the EYE symbol may be displayed in the dedicated input tray 1220 and symbol prediction may then display valid available second or "next" symbols as a second symbol in a sequence.

This is an example of a first symbol selection of a three-symbol sequence. Hereafter the discussion will focus on the system with Symbol Preview being turned on. It should be noted that if Symbol Preview were initially turned on with system turn on, and the "EYE" symbol were pre-selected as described above, then the corresponding category of INTERACTIVE COMMUNICATION could have been displayed. However, the following example skips the step of display of a corresponding category of a pre-selected symbol and focuses on a two symbol "theme".

Now, with Symbol Preview turned on, the second FLAGS symbol my be pre-selected, by being clicked and held down for example. As shown in FIG. 18, the dedicated input tray 1220 now may display the second symbol (the "FLAGS") along with the first EYE symbol. Further, as the EYE and FLAGS symbol are stored in association with the them "greetings", the dedicated input tray 1220 (or alternatively some other portion of the display and/or an audible feedback device) may then feed information back to the user via a display of the "theme" associated with the sequence of the EYE and the FLAGS. Thus, as shown in FIG. 18, the text "Greetings" is displayed in the input tray 1220.

Thereafter, if the user releases the clicked symbol (such as a mouse or pointer for example) after having decided this is the theme desired, then the symbol FLAGS is selected. Thereafter, symbol prediction will highlight or otherwise differentiate those symbols that are valid and available third symbol in the theme called "Greetings", form those which are invalid. This is shown in FIG. 20 for example, wherein the first and second symbol of this sequence (the EYE and FLAGS symbol) are displayed with the theme "Greetings" in the input tray.

Figure 21:
FIG. 21 illustrates an example of an invalid symbol.
Figure 22:
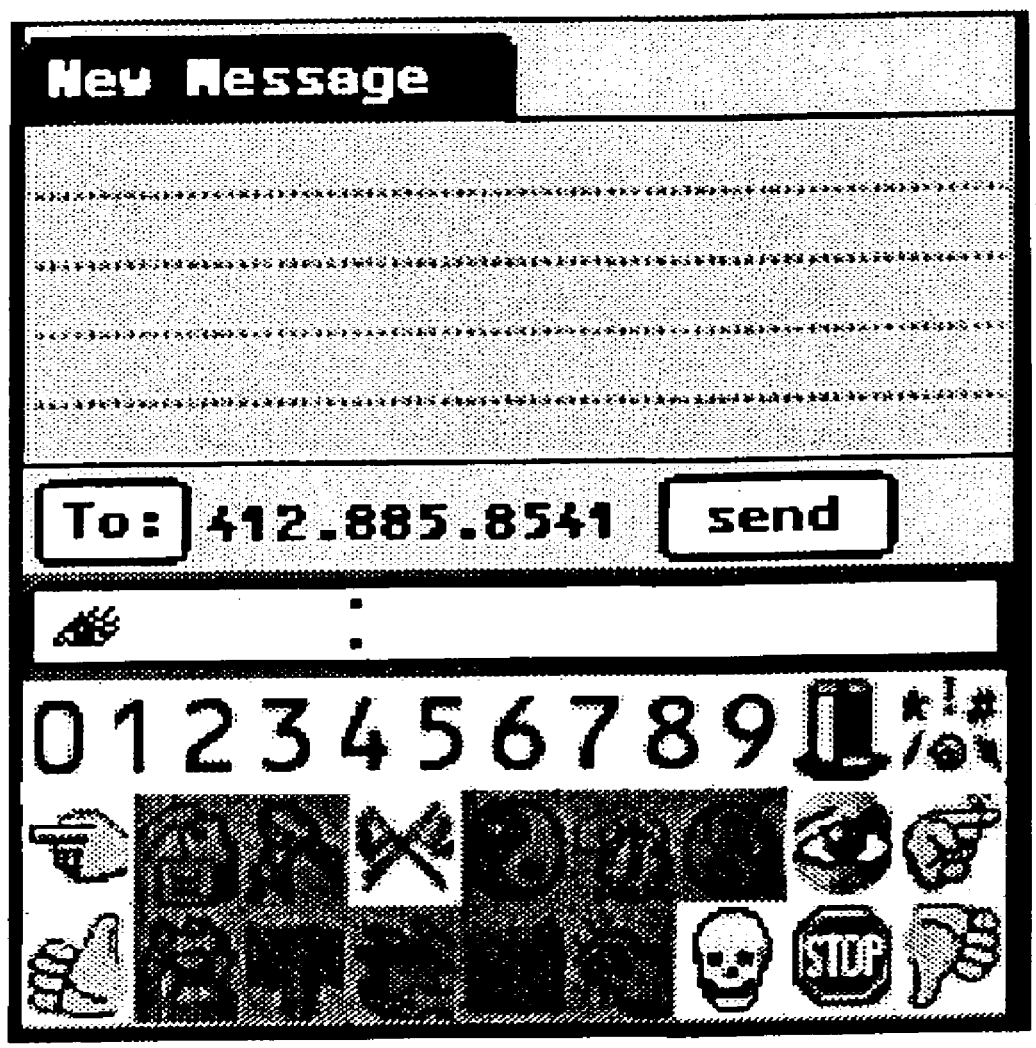
FIG. 22 illustrates an example of the invalid symbol being selected to return to a previous state.

If the user decided that they did not want to go to the "Greetings" Theme, then they can move the mouse or pointer over one of the unavailable symbols (see FIG. 21) and then release the button over an invalid symbol, as one way to negate the selection and Symbol Preview of the selection. After releasing the button over an unavailable symbol, the system can then reset to its previous state, displaying just the EYE symbol in the current example as shown in FIG. 22.

Figure 20:
FIG. 20 illustrates an example of a theme of symbol selected and displayed.
Figure 23:
FIG. 23 illustrates an example of symbol preview of a final symbol in a sequence, wherein a symbol sequence and a corresponding message are displayed.

After two of the three symbols in the three symbol sequence are chosen as in FIG. 20, a third symbol may be pre-selected (by being clicked and held for example) from the available choices in the "Greetings" theme. By the FLAGS symbol being pre-selected, the three symbols EYE:FLAGS: FLAGS in the symbol sequence may be displayed in the input tray 1220, along with the associated message "Hello". This is shown in FIG. 23. This permits the user to preview the message, if desired. Of course, the Symbol Preview need not include any type of message previewing.

Figure 24:
FIG. 24 illustrates an example of the final symbol being selected and the message being output.

If "Hello" is the desired message, then the user may release the button over the chosen FLAGS symbol and select the chosen FLAGS symbol. As such, the sequenced message is accessed and can be displayed, for example, in area 1230 as shown in FIG. 24. The symbols may then reset to a default state and the input tray 1220 may display the three symbols of the sequence and the Theme of the message (if desired) so as to reinforce the sequence in the mind of the user. The text "Hello" may be added to the end of the message in the text field, if there is already one present. If not, then it will be placed at the beginning of the text field as shown in FIG. 24.

Figure 25:
FIG. 25 illustrates an example of the device being reset to a previous state.

If the EYE:FLAGS:FLAGS sequenced message of "Hello" in the Theme "Greetings" is not desired, then the user can move the mouse or pointer over an unavailable symbol to negate this choice. The system may then reset to the previous state as shown in FIG. 25.

Figure 26:
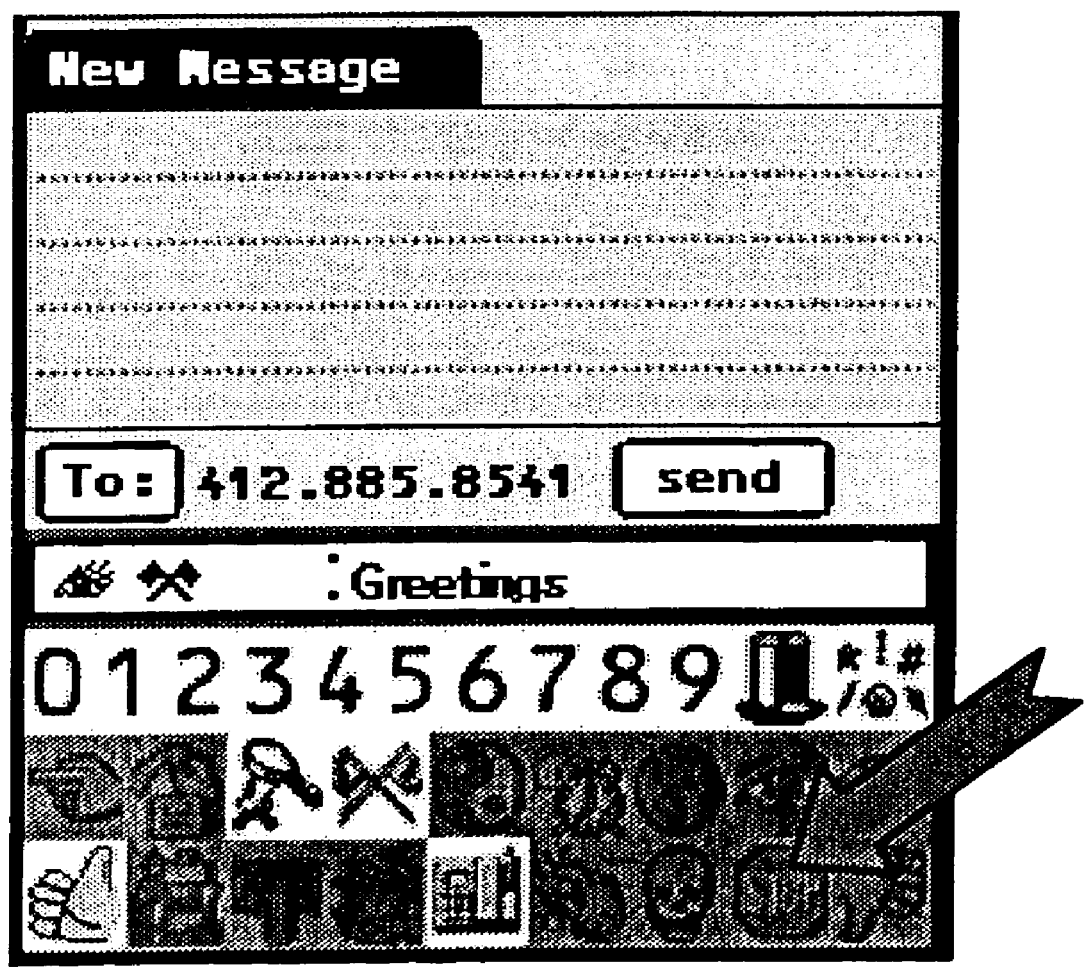
FIG. 26 illustrates an example of an invalid symbol.
Figure 27:
FIG. 27 illustrates an example of the invalid symbol being selected to negate the previous symbol preview.

If the user has not selected the final symbol in the three symbol sequence and decides that the sequence or message is not desired, the user can start over. The user can, after releasing the mouse or pointer over an unavailable symbol to negate the symbol preview of that symbol, select an unavailable symbol as shown in FIG. 26, for example, to reset to the default state to start over with a new symbol selection of another first symbol of a sequence as shown in FIG. 27.

As previously explained, Symbol Preview can be set up to provide different pieces of information when different symbols are pre-selected. In the above example, the first symbol chosen was the EYE. This symbol could have triggered display of the name of the Category associated with this symbol, namely "Personal Communications". So the sequence EYE: FLAGS:FLAGS, which represents the message "Hello", is in the theme "Greetings" and is in the Category "Personal Communications".

There are a number of way to determine what content will be displayed when using Symbol Preview. There are also a number of ways to determine how and when that content will be displayed. For example, Symbol Preview can preferably be turned on or off independently for each symbol. It can also be turned on or off based on events that have taken place previously in the system.

In another embodiment, Symbol preview can be set to display information while each of the three symbols in a sequence are being chosen and highlighted, or any grouping of symbols in the sequence based upon it's position in the sequence. Referring to the previous example, in the sequence EYE:FLAGS:FLAGS, the EYE symbol is in the first position. In one example, Symbol Preview can be instructed not to display any information when the first symbol is targeted or to display content that is appropriate to that symbol in that position. The second symbol FLAGS is in second position and is also used in the third position; thus it can be set to display different content when targeted in a second or third position.

The system can be set to display or not display content for each symbol based upon its position in a sequence. Below is an exemplary list of the possible combinations for showing and or not showing content, based upon an symbols position in a sequence:

| Symbol Sequence Position | |
|---|---|
| Display Symbol Preview | Don't Display Symbol Preview |
| 0 | 1, 2, 3 |
| 1 | 2, 3 |
| 1, 2 | 3 |
| 1, 2, 3 | 0 |
| 1, 3 | 2 |
| 2 | 1, 3 |
| 2, 3 | 1 |
| 3 | 2, 3 |

There are many types of content that can be displayed using Symbol Preview. This content can contain text, graphics or any combination of text and graphics. Unicode type characters or two byte characters and other encoding types can be used in Symbol Preview for Chinese characters, for example, and for other languages, if the device itself supports Unicode type characters. Thus, the present application should not be considered to be limited to English.

Some different types of content to display may include, but are not limited to, Tutorial or Teaching, Event Driven, Category and Theme based content. These are explained below.

In a tutorial mode, the system can be set to provide a series of tutorials and learning systems that can be accessed with Symbol Preview. A new user may want to go through a self-guided tutorial that will provide directions on system usage and symbol behavior usage. Tutorials may include small learning sessions or teaching methods for how to access and operate symbols and symbols in sequences. A tutorial can be fully interactive, allowing the user to select a symbol in response to predetermined request or self running material, for example.

The system can provide content based upon a Help mode, for example, that monitors the users activities while using the software and provides feedback based upon frequency of use or other criteria. For example, if a user continually types a certain header for sending messages, the system can monitor this and can offer the user the chance to store this header in a pre-stored sequence for future ease of use. Other favorite items may be stored in short cuts within the system, for example, by giving the user the chance to store them as well.

In another embodiment, the system can further provide error correction, if desired, through feedback and suggestions on symbol usage and system usage. For instance, if a user enters an incorrect symbol sequence twice in a row, the systems error mode can provide assistance in selecting the correct sequence or in accessing an alternative sequence. Events can be monitored and responded to with Symbol Preview and can provide pertinent messages based upon the how the system is being used correctly, and also when the system is being used in an incorrect manner. This provides a level of interactivity for Symbol Preview that is more than a static feedback. By both monitoring the user behavior and catching user errors, Symbol Preview can become an important part of the way the user interacts with the system. This can provide a better path of Human to Computer and Computer to Human Interaction.

Each symbol key may be part of a category or theme. Symbol Preview may provide content based upon a symbol itself, and/or its position in an symbol sequence. Thus, each symbol can have content supplied when it is used as a first selection and then have different content supplied when it is used as the second symbol in a sequence, and further different content again when it is the third symbol in a sequence. In a text messaging system, the first symbol is typically used as the main category pertaining to a message. For example, the message "Hello" is in the "Personal Communications" Category. The second symbol in a sequence is typically used as the theme or sub-category of the main category. For example the message "Hello" in the "Personal Communications" Category is in the sub-category or theme "Greetings". The third symbol typically represents the message to be retrieved in this example it is "Hello".

Thus, if Symbol Preview is used in a text messaging application, then the first symbol selected can provide the content "Personal Communications". The second symbol selected can provide the content "Greetings". And the third symbol selected can provide the content of the message to be retrieved, which is "Hello".

The method of navigation of a system using Symbol Preview can vary largely, and thus Symbol Preview is not limited to any particular type of navigation method. The method of navigation is mainly determined by the limitations of and the navigational methods available on the hardware of the device or system. A device may have more than one navigation system available to the system.

For example, a touch screen device usually offers a nib or stylus to select more accurate areas of the screen, but may also work by using any implement including a finger or thumbnail. A touch screen system will usually also offer a scroll wheel, button or multiple buttons for scrolling up, down, left and right. A non-touch screen device usually offers a scroll wheel, button or multiple buttons for scrolling up, down, left and right. A non-touch screen device will also usually offer a button for selection purposes and one for negating selections. These buttons may be dedicated to just selecting and negating, or may be context specific, which is then determined by certain events. These devices usually also offer a series of number buttons that can be used to navigate a device by associating the number or letter imprinted thereon with an item on the screen either in a list or from a set of choices.

Some devices offer voice recognition as a method of navigation as a way to select items on the screen of the device, as described previously. Symbol Preview may be used in conjunction with voice navigation.

Voice navigation can be used to select an item by using voice recognition of a predefined name for that item. For example, a user may say "Select the Eye symbol" or may use navigational terms such as "Left", "Right", "Up", "Down", "Select", "Preview", "OK", "Cancel", etc. In one example, "Right" may move an onscreen highlight to the next available symbol thereby selecting a new symbol that can display Symbol Preview content through the use of a pre-timed event, with a termination command such as "Preview", with a selection command like "Select", etc. Voice recognition can also be used along with any other navigational methods available in a system. Thus, voice recognition can be used to highlight a symbol and then another method of navigation can be used to display the Symbol Preview Content or to commit the target so that it is then selected and the appropriate action takes place.

Symbol Preview may be set to display or otherwise feedback content based upon a pre-timed event. Thus by just pre-selecting a symbol with a navigational method, by highlighting, holding down a button without releasing it, or otherwise pre-selecting a symbol, the system may count down based upon the pre-timed event of the navigational method of selecting that symbol and then provide the appropriate content for Symbol Preview upon the event being timed out. For example, if the stored or "pre-timing" corresponds to a three second trigger, then highlighting, holding a button down or otherwise pre-selecting a symbol for three seconds would trigger Symbol Preview. This thereby allows an event to process both Symbol Preview (when pre-selected upon a button being depressed and held for three seconds for example) and symbol selection (upon subsequently releasing the button and selecting the symbol).

In one aspect or embodiment of the present application, Symbol Preview can be used in conjunction with a default mode. This mode, as any other mode, can be turned on as a user preference, through accessing a corresponding sequence, through a menu, etc. Further, as the default mode involves a time period expiring, the time period can be a default time such as three seconds (or any default time programmed into the system) for example, or can be selected and set as a preference (three seconds set by one user, four seconds set by a different user, etc.). Once turned on, the default mode can operate to actually select or pre-select (either can be set) a third symbol in a sequence as a default, upon the first two symbols (in a three symbol sequence, for example) being selected and upon the default time (set by the user or pre-set) expiring. This will be explained in an exemplary way, as follows.

For the category "personal communications" the EYE symbol is preferably used as one make "eye contact" when communicating. For the theme "greetings" within the category, the EYE, FLAGS symbol sequence is preferably used as the FLAG is a racing flag used to "start" a race (a greeting is the start of a personal communication). For the theme "sign-offs" with the same category, the "EYE, STOP" symbol sequence is preferably used as the STOP symbol signifies the end or sign-off of a communication. The most common or most used message within a theme, such as the theme of greetings and/or sign-offs for example, can then be set as a default such that when the two symbols of the theme are selected, and a default time expires, a third symbol is automatically selected or pre-selected (without the user selecting anything) and the corresponding message is automatically output or previewed. Even more preferably, such a default can be for a sequence which includes, as a third symbol in the sequence, the symbol which is the same as the second symbol in the sequence (in the "EYE, FLAGS" greetings theme, the "EYE, FLAGS, FLAGS" sequence stored in association with HELLO may be the default; and in the "EYE, STOP" sign-offs theme, the "EYE, STOP, STOP" sequence stored in association with GOODBYE may be the default). Thus, if the default time is three seconds for example, and the EYE, FLAGS theme has been selected and three seconds have passed, then the FLAGS symbol will automatically be pre-selected or selected and the message "HELLO" will automatically be displayed in Symbol Preview or output.

Symbol preview is also applicable to two symbol sequences and single symbol sequences, wherein a theme and/or message, or just a message may be previewed. The content can be pre-determined based upon what the symbol is, and how the symbol is being used in each instance, as well the symbol sequence position.

Any combination of the methods for selecting a symbol for Symbol Preview can be used simultaneously with any content to be displayed and with any methods for displaying that content. The system allows for any of these to be used or to be turned off at any given moment, before and/or during usage of the system and based upon any event, either pre-determined or spontaneously generated while the system is in use.

Further, Symbol Preview can be used in conjunction with symbol sequences stored in association with commands and/or applications programs previously described, instead of or in addition to messages. It can also be used in any type of computer device including but not limited to a PDA, mobile phone, personal computer, etc. previously described.

When used in accessing commands in an application, Symbol Preview can provide content based upon the category, sub-category or theme, and command for the symbol sequence being used to execute that command. In such a case, the content of the first symbol selected could be "Shortcut" or "Move" or some other main category of commands found with in each application. The content for the second symbol in a sequence can include a sub category or theme such as "All" for example, and the third symbol can correspond to a command such as "UP", for example. In this case "Move" is the main category, "All" is the sub category or theme and "Up" is the command. Thus, symbol preview can be equally applicable to any type of messages, commands, application programs, etc. stored in association with symbol sequences.

Other uses of Symbol Preview can provide, for example, content based upon pre-selection of a symbol for a corresponding category and/or selection of a symbol and pre-selection of a next symbol for a sub-category (or theme) of a symbol sequence stored in association with an application program, while navigating the available software on a device. When the third symbol in this navigation scheme is pre-selected, it can display the name of the actual application itself.

Other methods of navigation are continually being developed and made available on small screen devices. Symbol Preview can be used and adapted for use with any of these methods since it is inherently reliant upon the symbols themselves, their position, and the ability to select an symbol. Thus, as a symbol can be selected in any number of ways, Symbol Preview can be implemented using that same method.

There are multiple methods of allowing information to be displayed on the displays of small screen devices. This information may be text based, graphic or any combination thereof. Most device operating systems permit a text field to be displayed on a screen and this text field may be targeted for the input of information. Further, it may display both text and graphic information. The Symbol Preview device may include, for example, a dedicated feedback field that can display both text and graphics to provide feedback to the user based upon user actions. This dedicated feedback field can also be used for the input of information as well as if and when it is needed. Of course, feedback also may, alternatively or in addition thereto, occur audibly.

The device or method may also be adapted to permit a text pop up field that pops up proximate to a selection when a pre-selection is made (such as when a symbol key is or corresponding mouse button is held down or highlighted over a specified target symbol). For instance when a touch screen pen is used to pre-select a symbol, it can be held on that portion of the screen corresponding to the symbol (on a corresponding tough panel key area) and a pop up text field may be displayed proximate thereto, providing Symbol Preview information to the user. That information may include text and/or graphics. If a non-touch screen system uses arrow keys for navigation for example, then when a symbol is pre-selected by pushing a corresponding arrow key, a timer may count down if the symbol is still pre-selected after a predetermined time frame. Once the timer counts down, then a pop up text field may be displayed proximate to the corresponding symbol for conveying onscreen information to the user. Alternatively, this pop up field may be displayed so as to partially cover the displayed symbol, such as in the middle of the symbol.

A more advanced method of pop of menus, encompassed within the present application, is the use of Contextual Menu Modules (CMM). A CMM is a contextual pop up menu of frequently used commands based on a particular action. A CMM can also be used to provide onscreen information to the user based upon a particular action that is specific to the context in which the CMM is called upon. A CMM pops up onscreen, proximate to the selection made, and is considered to be associated with each particular selection.

Some devices offer synthesized speech as a way of providing feedback to the user. Symbol Preview can be used to provide synthesized speech feedback of specific content in addition to or separate from a visual display of the appropriate content for a pre-selected or selected symbol or event. Symbol Preview can also be used to display visual content which is different from simultaneously provided alternate content, provided by synthesized speech feedback.

Some methods of displaying Symbol Preview include, but are not limited to, Target Text Entry Field, Dedicated Feedback Field, Text Pop-Up Field and/or Contextual Menu Module. Some methods of specifying content for Symbol Preview include but are not limited to Symbol Sequence Position including First Selection, Second Selection and Third Selection; Tutorial Mode including Pre-Determined Learning Sessions or Tutorial Sessions; Event Driven including Help Mode or Error Mode; and/or Theme and Category including Each Key being associated with a category or theme. Some methods of Highlighting a Selection include but are not limited to Mouse State including Mouse Down and Mouse Within; Pointer State including Pointer Down and Pointer Within; Arrow Key State including Current Key being Highlighted either by default or when made to highlight a symbol with the arrow key. Some Methods of Holding a Selection include but are not limited to Mouse State including Mouse Down for a Pre-Timed Event, Mouse Within for a Pre-Timed Event, Mouse Still Down and/or Mouse Still Within; Pointer State including Pointer Down for a Pre-Timed Event, Pointer Within for a Pre-Timed Event, Pointer Still Down, and/or Pointer Still Within; Arrow Key State including Current Key being Highlighted either by default or when made to highlight a symbol with the arrow key and/or a Pre-Timed Event. Some methods of Completing a Selection include but are not limited to Mouse Up Over Target, Pointer Up Over Target, Selection Key While Target Highlighted and/or Pre-Timed Event Timed out.

As yet another alternative embodiment, symbol preview (taken alone or in combination with symbol prediction) may be utilized in conjunction with a remote control device, such as that for a television, stereo, VCR, DVD player, CD player, etc., or any universal type remote control device of any combination thereof. For example, for televisions, the remote control device could include a symbol keyboard as shown in any of FIGS. 2, 16, etc., wherein the symbol keyboard can include numerical digits as shown in FIG. 16, and/or be part of the keyboard of the remote control device, and/or be the only keyboard of the remote control device. Of course, the symbols may be the same as that shown in any of FIGS. 2-27, or can include some or all different symbols.

In the environment of a television remote control device, for example, symbols sequences can be established for symbol preview channel categories such as sports, drama, comedy, home improvement, etc. As such, one symbol may be stored in association with the category sports, another with the category home improvement, etc. Further, within a category, a them may be permanently stored in association with a symbol sequence including the category symbol, such as the theme ESPN channels for sports and the theme HGTV channels for home improvement. Then, each particular ESPN and/or home improvement channel may be stored in association with a single three symbol sequence including the two symbol theme sequence. Such channels may be stored in association with a designated symbol sequence in a memory device of the remote control and/or some or other (or even all) of the symbol sequences could be interactively gathered and associated with categories, themes, etc. on a weekly, monthly, yearly basis based on television programming, for example.

Thus, when a user pre-selects the sports category symbol such as the "FLAGS" (racing flags standing for a sport), for example, the category sports may be displayed and/or otherwise fed back. As the user selects the FLAGS symbol and pre-selects the GLOBE for example, the theme ESPN may be displayed and/or otherwise fed back. Thereafter, when the GLOBE is selected and the GLOBE is again pre-selected (either manually or automatically timed out for example), the main ESPN channel (as opposed to ESPN2 for example) may be displayed and/or otherwise fed back. As such, if ESPN is the desired channel, then the GLOBE can be selected and the remote can set the TV to the corresponding ESPN channel.

Further, in the environment of a universal remote control device for controlling various electronic devices, each piece of equipment may be programmed to correspond to a category. Thus, the DVD could be remotely operated in association with symbol sequences, including a one symbol category "DVD", the CD player could be remotely operated in association with symbol sequences, including a one symbol category "CD", the VCR could be remotely operated in association with symbol sequences, including a one symbol category "VCR", etc. The operations could include symbol sequences for normal operations as one theme, and special operations as another theme, with each specific operation being stored in association with a three symbol sequence to permit remote control of any device, inclusive or exclusive of the TV. The feedback information of a category, theme or message/tv channel/operation could then be fed back to the user in any manner such as audibly, visually on the TV, the remote control device itself or another device, etc., in association with symbol preview and/or symbol prediction. As such, the use of a remote control device can use any and all aspects of symbol prediction and symbol preview previously discussed herein.

Thus, as can be seen, although symbol preview has been described in an exemplary format with regard to a PDA, mobile phone or any other computer device, it is equally applicable to other devices using some type of keyboard input such as, for example, remote control devices. Further, it should be understood, that although the device and method have been described with regard to preferred methods of feedback including certain types of displays with designated display areas for displaying symbols and/or feedback information such as categories, themes, and/or messages, the device and method are not limited as such. Any method of feedback may be used, and any method of display may be used. For example, on a small mobile phone, there may not be enough room for any separate display area and thus a single display area may be used to display, for example, a pre-selected symbol in association with, or in a sequential manner with an associated category.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a system for providing at least one of a message, command, and program in response to a selection of an associated symbol sequence, a method comprising:
   receiving an indication of selection by a user of the system, of one of a plurality of displayed symbols;
   receiving an indication of pre-selection by a user of the system, of one of the plurality of displayed symbols corresponding to a next symbol in at least two symbol sequences including the selected symbol and the pre-selected symbol, at least one of the selected and pre-selected symbols being polysemous; and
   providing, in response to receiving the indication of pre-selection, at least newly displayed feedback to the user corresponding to a theme related to the at least two symbol sequences.

2. The method of claim 1, wherein at least the pre-selected and selected symbols are polysemous.

3. The method of claim 1, wherein the feedback includes audible feedback.

4. The method of claim 1, wherein the feedback includes display of the theme, stored in association with the at least two symbol sequences.

5. The method of claim 4, wherein the theme is displayed in a designated display area.

6. The method of claim 4, wherein the theme is displayed proximate to the pre-selected symbol.

7. The method of claim 1, wherein the feedback includes display of the theme, relating at least two messages, commands or programs respectively stored in association with the at least two symbol sequences.

8. The method of claim 7, wherein the theme is displayed in a designated display area.

9. The method of claim 7, wherein the theme is displayed proximate to the pre-selected symbol.

10. The method of claim 1, wherein the feedback includes display of the theme, the selected symbol and the pre-selected symbol.

11. The method of claim 10, wherein the theme, the selected symbol and the pre-selected symbol are displayed in a designated display area.

12. The method of claim 10, wherein the theme is displayed proximate to the pre-selected symbol.

13. The method of claim 1, wherein the pre-selecting includes highlighting the symbol.

14. The method of claim 1, wherein valid symbols for selection and pre-selection are differentiated from invalid symbols.

15. The method of claim 14, wherein, upon receiving an indication of selection of an invalid symbol, the feedback is negated.

16. In a system for providing at least one of a message, command and program in response to a selection of an associated symbol sequence, a method comprising:
   receiving an indication of pre-selection by a user of the system, of a first symbol, from a plurality of displayed symbols, of at least two symbol sequences; and
   providing at least newly displayed feedback to the user corresponding to a category related to the at least two symbol sequences, the first symbol being polysemous.

17. The method of claim 16, wherein at least two of the symbols of the two symbol sequences are polysemous.

18. The method of claim 16, wherein the feedback includes audible feedback.

19. The method of claim 16, wherein the feedback includes display of the category, stored in association with the at least two symbol sequences.

20. The method of claim 19, wherein the category is displayed in a designated display area.

21. The method of claim 19, wherein the category is displayed proximate to the pre-selected symbol.

22. The method of claim 16, wherein the feedback includes display of the category, relating at least two messages, commands or programs respectively stored in association with the at least two symbol sequences.

23. The method of claim 22, wherein the category is displayed in a designated display area.

24. The method of claim 22, wherein the category is displayed proximate to the pre-selected symbol.

25. The method of claim 16, wherein the feedback includes display of the category and the pre-selected symbol.

26. The method of claim 25, wherein the category and the pre-selected symbol are displayed in a designated display area.

27. The method of claim 25, wherein the category is displayed proximate to the pre-selected symbol.

28. The method of claim 16, wherein the pre-selecting includes highlighting the symbol.

29. The method of claim 16, wherein valid symbols for at least one of selection and pre-selection are differentiated from invalid symbols.

30. The method of claim 29, wherein, upon subsequently receiving an indication of selection of an invalid symbol, the feedback is negated.

31. In a system for providing at least one of a message, command and program in response to a selection of an associated symbol sequence, a method comprising:
  receiving an indication of pre-selection by a user of the system, of a last symbol, from a plurality of displayed symbols, of a symbol sequence sequentially including zero or more selected symbols and the pre-selected symbol; and
  providing, in response to receiving the indication of pre-selection, at least newly displayed feedback to the user corresponding to at least one of a message, command and program stored in association with symbol sequences sequentially including the zero or more selected symbols and the pre-selected last symbol, the pre-selected last symbol being polysemous.

32. The method of claim 31, wherein at least two symbols in the symbol sequences are polysemous.

33. The method of claim 32, wherein the feedback includes display of the display of the at least one of the message, command and program stored in association with the symbol sequence.

34. The method of claim 33, wherein the at least one of the message, command and program is displayed in a designated display area.

35. The method of claim 33, wherein the at least one of the message, command and program is displayed proximate to the pre-selected symbol.

36. The method of claim 31, wherein the feedback includes audible feedback.

37. The method of claim 31, wherein the feedback includes display of the at least one of the message, command and program stored in association with the symbol sequence.

38. The method of claim 37, wherein the at least one of the message, command and program is displayed in a designated display area.

39. The method of claim 37, wherein the at least one of the message, command and program is displayed proximate to the pre-selected symbol.

40. The method of claim 31, wherein the pre-selecting includes highlighting the symbol.

41. The method of claim 31, wherein valid symbols for selection and pre-selection are differentiated from invalid symbols.

42. The method of claim 41, wherein, upon receiving an indication of selection of an invalid symbol, the feedback is negated.

43. The method of claim 31, wherein the at least one of the message, command and program; the selected symbols; and the pre-selected symbol are displayed in a designated display area.

44. The method of claim 31, wherein the at least one of the message, command and program is displayed proximate to the pre-selected symbol.

45. A device for providing at least one of a message, command and program in response to a selection of an associated symbol sequence, comprising:
  an input device, to permit selection by a user of the device, of a symbol from a plurality of displayed symbols, and to permit pre-selection by a user of the device, of a symbol from the plurality of displayed symbols, corresponding to a next symbol in at least two symbol sequences including a selected symbol and a pre-selected symbol; and
  a feedback device, to provide, in response to pre-selection by the user, at least newly displayed feedback to the user corresponding to a theme related to the at least two symbol sequences, at least one of the selected and pre-selected symbols being polysemous.

46. The device of claim 45, wherein at least the selected and pre-selected symbols are polysemous.

47. The device of claim 45, wherein the feedback device includes a display.

48. The device of claim 47, wherein the feedback includes display of the theme, relating at least two messages, commands or programs respectively stored in association with the at least two symbol sequences.

49. The device of claim 48, wherein the theme is displayed in a designated display area.

50. The device of claim 48, wherein the theme is displayed proximate to the pre-selected symbol.

51. The device of claim 47, wherein the feedback includes display of the theme, the selected symbol and the pre-selected symbol.

52. The device of claim 51, wherein the theme, the selected symbol and the pre-selected symbol are displayed in a designated display area.

53. The device of claim 51, wherein the theme is displayed proximate to the pre-selected symbol.

54. The device of claim 47, wherein the input device and feedback device include an integrated input and display.

55. The device of claim 47, wherein the input device includes a touch panel display.

56. The device of claim 47, wherein the input device includes a mouse.

57. The device of claim 47, wherein the pre-selecting includes highlighting the symbol.

58. The device of claim 47, wherein valid symbols for selection and pre-selection are differentiated from invalid symbols on the input device.

59. The device of claim 58, wherein, upon selection an invalid symbol, the feedback is negated.

60. The device of claim 47, wherein the theme is displayed in a designated display area.

61. The device of claim 47, wherein the theme is displayed proximate to the pre-selected symbol.

62. The device of claim 47, wherein the device is a personal digital assistant.

63. The device of claim 47, wherein the device is a mobile phone.

64. The device of claim 47, wherein the device is a remote control device.

65. The device of claim 47, wherein the device is a remote control device for remotely controlling an electronic device.

66. The device of claim 47, wherein the device is a remote control device for controlling, at least in part, a television.

67. The device of claim 47, wherein the input device is further useable to permit selection, by a user, of a second symbol and to permit pre-selection of a third symbol, by a user, of a symbol sequence sequentially including the first, second and third symbol and wherein the feedback device is further useable to provide feedback corresponding to at least one of a message, program and command stored in association with the symbol sequence sequentially including the first, second and third symbol.

68. The device of claim 67, wherein the device is a personal digital assistant.

69. The device of claim 67, wherein the device is a mobile phone.

70. The device of claim 67, wherein the device is a remote control device.

71. The device of claim 67, wherein the device is a remote control device for remotely controlling an electronic device.

72. The device of claim 67, wherein the device is a remote control device for controlling, at least in part, a television.

73. The device of claim 67, wherein the pre-selecting includes highlighting the symbol.

74. The device of claim 67, wherein at least two of the symbols are polysemous.

75. The device of claim 47, wherein the feedback device is further to, in response to pre-selection of a first symbol of at least two symbol sequences via the input device, provide feedback corresponding to a category related to the at least two symbol sequences.

76. The device of claim 75, wherein the device is a personal digital assistant.

77. The device of claim 75, wherein the device is a mobile phone.

78. The device of claim 75, wherein the pre-selecting includes highlighting the symbol.

79. The device of claim 75, wherein at least two of the symbols are polysemous.

80. The device of claim 45, wherein the feedback device includes a device for providing audible feedback.

81. A device for providing at least one of a message, command and program in response to a selection of an associated symbol sequence, comprising:
    means for selecting, by a user of the device, a symbol from a plurality of displayed symbols and for pre-selecting from the plurality of displayed symbols, by a user of the device, a symbol corresponding to a next symbol in at least two symbol sequences including the selected symbol, at least one of the selected and pre-selected symbols being polysemous; and
    means for providing, in response to pre-selecting by the user, at least newly displayed feedback to the user corresponding to a theme related to the at least two symbol sequences.

82. The device of claim 81, wherein at least the selected and pre-selected symbols are polysemous.

83. The device of claim 81, wherein the pre-selecting includes highlighting the symbol.

84. The device of claim 81, wherein the device is a personal digital assistant.

85. The device of claim 81, wherein the device is a mobile phone.

86. The device of claim 81, wherein the device is a remote control device.

87. The device of claim 81, wherein the device is a remote control device for remotely controlling an electronic device.

88. The device of claim 81, wherein the device is a remote control device for controlling, at least in part, a television.

89. The device of claim 81, wherein the means for selecting a symbol is further for selecting a second symbol from the plurality of displayed symbols and for pre-selecting, from the plurality of displayed symbols, a third symbol of a symbol sequence sequentially including the first, second and third symbol and wherein the means for providing at least displayed feedback is further for providing at least displayed feedback corresponding to at least one of a message, command and program stored in association with the symbol sequence sequentially including the first, second and third symbol.

90. The device of claim 89, wherein the device is a personal digital assistant.

91. The device of claim 89, wherein the device is a mobile phone.

92. The device of claim 89, wherein the device is a remote control device.

93. The device of claim 89, wherein the device is a remote control device for remotely controlling an electronic device.

94. The device of claim 89, wherein the device is a remote control device for controlling, at least in part, a television.

95. The device of claim 89, wherein at least two of the symbols are polysemous.

96. The device of claim 89, wherein the pre-selecting includes highlighting the symbol.

97. The device of claim 81, wherein the means for providing at least displayed feedback is further for, in response to pre-selecting of a first symbol of at least two symbol sequences via the means for selecting a symbol and for pre-selecting a symbol, providing at least displayed feedback corresponding to a category related to the at least two symbol sequences.

98. The device of claim 97, wherein the device is a personal digital assistant.

99. The device of claim 97, wherein the device is a mobile phone.

100. The device of claim 97, wherein the device is a remote control device.

101. The device of claim 97 wherein the device is a remote control device for remotely controlling an electronic device.

102. The device of claim 97, wherein the device is a remote control device for controlling, at least in part, a television.

103. The device of claim 97, wherein at least one two of the symbols are polysemous.

104. The device of claim 97, wherein the pre-selecting includes highlighting the symbol.

105. The device of claim 81, wherein invalid symbols are differentiated from valid symbols and wherein, upon selection an invalid symbol, the feedback is negated.

106. A device for providing at least one of a message, command and program in response to a selection of an associated symbol sequence, comprising:
an input device, to permit pre-selection by a user of the device, of a symbol, from a plurality of displayed symbols, corresponding to a last symbol in a symbol sequence sequentially including zero or more selected symbols and a pre-selected symbol, the pre-selected symbol being polysemous; and
a feedback device to provide, in response to pre-selection by the user, at least newly displayed feedback to the user corresponding to the at least one of a message, command and program stored in association with the symbol sequence sequentially including the zero or more selected symbols and the pre-selected last symbol.

107. The device of claim 106, wherein at least one two of the symbols are polysemous.

108. The device of claim 106, wherein the pre-selecting includes highlighting the symbol.

109. The device of claim 106, wherein the device is a personal digital assistant.

110. The device of claim 106, wherein the device is a mobile phone.

111. The device of claim 106, wherein the device is a remote control device.

112. The device of claim 106, wherein the device is a remote control device for remotely controlling an electronic device.

113. The device of claim 106, wherein the device is a remote control device for controlling, at least in part, a television.

114. The device of claim 106, wherein the input device is further o select the zero or more symbols.

115. The device of claim 106, wherein invalid symbols are differentiated from valid symbols and wherein, upon selection of an invalid symbol, the feedback is negated.

116. A device for providing at least one of a message, command and program in response to a selection of an associated symbol sequence, comprising:
means for pre-selecting, by a user of the device, a symbol, from a plurality of displayed symbols, corresponding to a last symbol in a symbol sequence sequentially including zero or more selected symbols and a pre-selected symbol, the pre-selected symbol being polysemous; and
means for providing, in response to pre-selecting by the user, at least newly displayed feedback to the user corresponding to the at least one of the message, command, and program stored in association with the symbol sequence sequentially including the zero or more selected symbols and the pre-selected last symbol.

117. The device of claim 116, wherein at least one other symbol, is polysemous.

118. The device of claim 116, wherein the pre-selecting includes highlighting the symbol.

119. The device of claim 116, wherein the device is a personal digital assistant.

120. The device of claim 116, wherein the device is a mobile phone.

121. The device of claim 116, wherein the device is a remote control device.

122. The device of claim 116, wherein the device is a remote control device for remotely controlling an electronic device.

123. The device of claim 116, wherein the device is a remote control device for controlling, at least in part, a television.

124. The device of claim 116, wherein the means for pre-selecting a symbol is further for selecting the zero or more symbols.

125. The device of claim 116, wherein invalid symbols are differentiated from valid symbols and wherein, upon selection of an invalid symbol, the feedback is negated.

126. A device for providing at least one of a message, command and program in response to a selection of an associated symbol sequence, comprising:
means for automatically pre-selecting a last symbol in a symbol sequence sequentially including at least one symbol, selected by a user of the device from a plurality of displayed symbols, and the automatically pre-selected symbol upon selecting the at least one symbol, setting a default selection mode and a time expiring, at least one of the pre-selected and selected symbols being polysemous; and
means for providing, in response to the pre-selecting, at least newly displayed feedback to the user corresponding to the at least one of a message, command and program stored in association with the symbol sequence sequentially including the at least one selected symbol and the pre-selected last symbol.

127. The device of claim 126, wherein the time for expiration is settable.

128. The device of claim 126, wherein the time for expiration is predetermined.

129. The device of claim 126, wherein the time for expiration is a default time.

130. The device of claim 126, wherein at least two symbols are selected and wherein the pre-selected symbol is identical to the last selected symbol.

131. The device of claim 130, wherein the at least two selected symbols correspond to an associated theme.

132. The device of claim 126, wherein at least the pre-selected and selected symbols are polysemous.

133. The device of claim 126, wherein the pre-selecting includes highlighting the symbol.

134. The device of claim 126, wherein the device is a personal digital assistant.

135. The device of claim 126, wherein the device is a mobile phone.

136. The device of claim 126, wherein the device is a remote control device.

137. The device of claim 126, wherein the device is a remote control device for remotely controlling an electronic device.

138. The device of claim 126, wherein the device is a remote control device for controlling, at least in part, a television.

139. The device of claim 126, wherein the means for pre-selecting a symbol is further for selecting the at least one symbol.

140. In a device for providing at least one of a message, command and program in response to a selection of an associated symbol sequence, a method comprising:
setting a default selection mode;
receiving an indication of selection, by a user of the device, of at least one symbol from a plurality of displayed symbols;
automatically pre-selecting a last symbol in a symbol sequence sequentially including the at least one selected symbol and the automatically pre-selected symbol, upon a time expiring, at least one of the selected and pre-selected symbols being polysemous; and
providing, in response to the pre-selecting, at least newly displayed feedback to the user corresponding to the at least one of a message, command and program stored in association with the symbol sequence sequentially including the at least one selected symbol and the automatically pre-selected last symbol.

141. The method of claim 140, wherein the time for expiration is settable.

142. The method of claim 140, wherein the time for expiration is predetermined.

143. The method of claim 140, wherein the time for expiration is a default time.

144. The method of claim 140, wherein at least two symbols are selected and wherein the pre-selected symbol is identical to the last selected symbol.

145. The method of claim 144, wherein the at least two selected symbols correspond to an associated theme.

146. The method of claim 140, wherein at least the selected and pre-selected symbols are polysemous.

147. The method of claim 140, wherein the pre-selecting includes highlighting the symbol.

148. The method of claim 140, wherein the device is a personal digital assistant.

149. The method of claim 140, wherein the device is a mobile phone.

150. The method of claim 140, wherein the device is a remote control device.

151. The method of claim 150, wherein the feedback includes display of the message, stored in association with the symbol sequence.

152. The method of claim 140, wherein the device is a remote control device for remotely controlling an electronic device.

153. The method of claim 140, wherein the device is a remote control device for controlling, at least in part, a television.

154. The method of claim 153, wherein the message is displayed in a designated display area.

155. The method of claim 153, wherein the message, the selected symbols and the pre-selected symbol are displayed in a designated display area.

156. The method of claim 153, wherein the message is displayed proximate to the pre-selected symbol.

157. The method of claim 140, wherein the feedback includes audible feedback.

158. The method of claim 140, wherein valid symbols for selection and pre-selection are differentiated from invalid symbols.

159. The method of claim 140, wherein, upon selecting an invalid symbol, the feedback is negated.

160. A device for providing at least one of a message, command and program in response to a selection of an associated symbol sequence, comprising:
an input device, to permit pre-selection by a user of the device, of a first symbol, from a plurality of displayed symbols, of at least two symbol sequences; and
a feedback device, to provide, in response to pre-selection by the user, at least newly displayed feedback to the user corresponding to a category related to the at least two symbol sequences, the first symbol being polysemous.

161. The device of claim 160, wherein the feedback includes display of the category, stored in association with the at least two symbol sequences.

162. The device of claim 160, wherein the feedback includes display of the category, relating at least two messages; commands or programs respectively stored in association with the at least two symbol sequences.

163. The device of claim 160, wherein the feedback includes display of the category and the pre-selected symbol.

164. The device of claim 160, wherein the pre-selecting includes highlighting the symbol.

165. The device of claim 160, wherein valid symbols for at least one of selection and pre-selection are differentiated from invalid symbols.

166. The device of claim 160, wherein the device is a personal digital assistant.

167. The device of claim 160, wherein the device is a mobile phone.

168. The device of claim 160, wherein the device is a remote control device.

169. The device of claim 160, wherein the device is a remote control device for remotely controlling an electronic device.

170. The device of claim 160, wherein the device is a remote control device for controlling, at least in part, a television.

171. A device for providing at least one of a message, command and program in response to a selection of an associated symbol sequence, comprising:
means for pre-selecting, by a user of the device, a first symbol, from a plurality of displayed symbols, of at least two symbol sequences; and
means for providing, in response to pre-selecting by the user, at least newly displayed feedback to the user corresponding to a category related to the at least two symbol sequences, the first symbol being polysemous.

172. The device of claim 171, wherein the feedback includes display of the category, stored in association with the at least two symbol sequences.

173. The device of claim 171, wherein the feedback includes display of the category, relating at least two messages, commands or programs respectively stored in association with the at least two symbol sequences.

174. The device of claim 171, wherein the feedback includes display of the category and the pre-selected symbol.

175. The device of claim 171, wherein the pre-selecting includes highlighting the symbol.

176. The device of claim 171, wherein valid symbols for at least one of selection and pre-selection are differentiated from invalid symbols.

177. The device of claim 171, wherein the device is a personal digital assistant.

178. The device of claim 171, wherein the device is a mobile phone.

179. The device of claim 171, wherein the device is a remote control device.

180. The device of claim 171, wherein the device is a remote control device for remotely controlling an electronic device.

181. The device of claim 171, wherein the device is a remote control device for controlling, at least in part, a television.

* * * * *